US010015321B2

(12) United States Patent
Hunt et al.

(10) Patent No.: US 10,015,321 B2
(45) Date of Patent: Jul. 3, 2018

(54) EVENT TRIGGERS FOR PERFORMING MULTIPLE SERVICES FROM A SINGLE ACTION

(71) Applicant: Zilkr Cloud Technologies, LLC, Houston, TX (US)

(72) Inventors: Evin A. Hunt, Austin, TX (US); Omar Paul, Austin, TX (US)

(73) Assignee: Zilkr Cloud Technologies LLC, Austin, TX (US)

( * ) Notice: Subject to any disclaimer, the term of this patent is extended or adjusted under 35 U.S.C. 154(b) by 0 days.

(21) Appl. No.: 15/094,917

(22) Filed: Apr. 8, 2016

(65) Prior Publication Data

US 2016/0227031 A1 Aug. 4, 2016

Related U.S. Application Data

(63) Continuation of application No. PCT/US2014/059959, filed on Oct. 9, 2014, which is
(Continued)

(51) Int. Cl.
*H04L 29/06* (2006.01)
*H04M 15/00* (2006.01)
(Continued)

(52) U.S. Cl.
CPC .......... *H04M 15/49* (2013.01); *H04L 61/106* (2013.01); *H04L 65/1006* (2013.01);
(Continued)

(58) Field of Classification Search
USPC .................................................... 379/142.01
See application file for complete search history.

(56) References Cited

U.S. PATENT DOCUMENTS 5,771,282 A 6/1998 Friedes
8,509,226 B1 8/2013 Murphy et al.
(Continued)

FOREIGN PATENT DOCUMENTS

WO WO2015054531 A1 4/2015

OTHER PUBLICATIONS

Office Action dated May 18, 2015, U.S. Appl. No. 14/087,768, filed Nov. 22, 2013.
(Continued)

*Primary Examiner* — Maria El-Zoobi

(57) ABSTRACT

A method of provisioning a plurality of applications from different application developer systems to a network provider system comprises establishing a plurality of service accounts for a corresponding plurality of application service provider systems, receiving a plurality of API interfaces from the plurality of application service provider systems, integrating, by the processor system, each of the plurality of API interfaces with a unified services platform API interface, receiving a provider API interfaces for a network provider system, and integrating the provider API interface with the unified services platform API interface. The plurality of application service provider systems provide services for use in association with a telephone number of a subscriber of telecommunication services. At least two of the API interfaces are different, and at least one of the plurality of API interfaces from the plurality of application service provider systems is not compatible with the provider API interface.

19 Claims, 22 Drawing Sheets

Related U.S. Application Data a continuation of application No. 14/087,768, filed on Nov. 22, 2013, now Pat. No. 9,210,254.

(60) Provisional application No. 61/888,856, filed on Oct. 9, 2013.

(51) Int. Cl.
*H04M 3/22* (2006.01)
*H04M 3/42* (2006.01)
*H04M 7/00* (2006.01)
*H04L 29/12* (2006.01)
*H04M 1/247* (2006.01)

(52) U.S. Cl.
CPC ....... *H04M 1/2473* (2013.01); *H04M 3/2209* (2013.01); *H04M 3/42263* (2013.01); *H04M 3/42297* (2013.01); *H04M 7/0021* (2013.01); *H04M 7/0024* (2013.01); *H04M 15/44* (2013.01); *H04M 15/62* (2013.01); *H04M 15/68* (2013.01); *H04M 15/765* (2013.01); *H04M 2203/4509* (2013.01); *H04M 2203/557* (2013.01)

(56) References Cited

U.S. PATENT DOCUMENTS

| | | | |
|---|---|---|---|
| 9,025,753 B2* | 5/2015 | Moore | H04L 29/06 379/142.07 |
| 9,210,254 B2 | 12/2015 | Hunt | |
| 9,210,276 B2 | 12/2015 | Hunt et al. | |
| 9,742,926 B2 | 8/2017 | Hunt | |
| 2002/0101858 A1 | 8/2002 | Stuart et al. | |
| 2002/0141420 A1 | 10/2002 | Sugiarto | |
| 2002/0154755 A1 | 10/2002 | Gourraud | |
| 2005/0135576 A1 | 6/2005 | Gilles et al. | |
| 2005/0213567 A1 | 9/2005 | Mullins et al. | |
| 2006/0015467 A1 | 1/2006 | Morken et al. | |
| 2006/0050686 A1 | 3/2006 | Velez-Rivera et al. | |
| 2006/0050688 A1 | 3/2006 | Panagopoulos et al. | |
| 2008/0004972 A1 | 1/2008 | Ghanma | |
| 2008/0304644 A1 | 12/2008 | Mishra et al. | |
| 2009/0125409 A1 | 5/2009 | Barton | |
| 2010/0158230 A1 | 6/2010 | Dhawan et al. | |
| 2011/0130168 A1 | 6/2011 | Vendrow et al. | |
| 2011/0179176 A1 | 7/2011 | Ravichandran et al. | |
| 2012/0099571 A1 | 4/2012 | Staykoff | |
| 2015/0052009 A1* | 2/2015 | Ketchell, III | G06Q 30/0633 705/26.8 |
| 2016/0065730 A1 | 3/2016 | Hunt | |
| 2016/0227032 A1 | 8/2016 | Paul et al. | |
| 2016/0227043 A1 | 8/2016 | Hunt et al. | |
| 2016/0227045 A1 | 8/2016 | Hunt et al. | |

OTHER PUBLICATIONS

Notice of Allowance dated Aug. 4, 2015, U.S. Appl. No. 14/087,768, filed Nov. 22, 2013.
Notice of Allowance dated Jun. 14, 2013, U.S. Appl. No. 13/600,844, filed Aug. 31, 2012.
Notice of Allowance dated Aug. 11, 2015, U.S. Appl. No. 13/964,496, filed Aug. 12, 2013.
Foreign Communication from a Related Counterpart—International Search Report and Written Opinion, dated Mar. 19, 2015, PCT/US14/59959, filed on Oct. 9, 2014.
Foreign Communication from a Related Counterpart Application, International Preliminary Report on Patentability dated Apr. 21, 2016, PCT/US14/59959, filed on Oct. 9, 2014.
Hunt, Evin, "Unified Services Platform Using a Telephone Number as the Common Subscriber Identifier," filed Oct. 9, 2013, U.S. Appl. No. 61/888,856.
Hunt, Evin, et al., "Unified Services Platform Using a Telephone Number as a Common Subscriber Identifier," filed Apr. 8, 2016, U.S. Appl. No. 15/094,433.
Hunt, Evin, et al., "Multiple Service Group Interactions and Authorizations," filed on Apr. 8, 2016, U.S. Appl. No. 15/094,920.
Omar, Paul, et al., "Providing Individual Service Functionality Using Specific Actions," filed on Apr. 8, 2016, U.S. Appl. No. 15/094,924.
Final Office Action dated Feb. 9, 2017, U.S. Appl. No. 14/931,644, filed Nov. 3, 2015.
Notice of Allowance dated Apr. 18, 2017, U.S. Appl. No. 14/931,644, filed Nov. 3, 2015.
Restriction Requirement dated Apr. 21, 2017, U.S. Appl. No. 15/094,433, filed Apr. 8, 2016.
Restriction Requirement dated May 5, 2017, U.S. Appl. No. 15/094,920, filed Apr. 8, 2016.
Office Action dated Apr. 17, 2017, U.S. Appl. No. 15/094,924, filed Apr. 8, 2016.
FAIPP Pre-Interview Communication dated Nov. 18, 2016, U.S. Appl. No. 14/931,644, filed Nov. 3, 2015.
Office Action dated Jul. 27, 2017, U.S. Appl. No. 15/094,433, filed Apr. 8, 2016.
Notice of Allowance dated Oct. 2, 2017, U.S. Appl. No. 15/094,920, filed Apr. 8, 2016.
Notice of Allowance dated Oct. 11, 2017, U.S. Appl. No. 15/094,924, filed Apr. 8, 2016.

* cited by examiner

EVENT TRIGGERS FOR PERFORMING MULTIPLE SERVICES FROM A SINGLE ACTION

CROSS-REFERENCE TO RELATED APPLICATIONS

The present application is a continuation under 35 U.S.C. 120 of International Application No. PCT/US2014/059959 entitled "Unified Services Platform Using a Telephone Number as a Common Subscriber Identifier" filed in the United States Receiving Office on Oct. 9, 2014, which claims priority to U.S. Non-Provisional application Ser. No. 14/087,768 entitled "Unified Services Platform Using a Telephone Number as a Common Subscriber Identifier" filed in the United States on Nov. 22, 2013 and Provisional Application No. 61/888,856 filed in the United States on Oct. 9, 2013, each of which are incorporated herein in their entirety for all purposes.

BACKGROUND

Even with the explosive growth in new communications technologies and service offerings, telecommunications service providers still have large numbers of customers with traditional analog telephone service. For these customers, the telephone number remains the universal identifier (ID) for communicating with the outside world. For the remaining customers, the telephone number remains a valuable identifier for providing telephone services.

As the availability of new technologies has spread, increasing numbers of customers wish to add services and applications to their existing telephone service. However, many services and applications are supplied by third-party providers in different ecosystems. These third-party ecosystems often use different types of IDs and have different rules and policies for managing and activating their services and applications.

In view of the above, new techniques for integrating advanced services and applications with legacy telephone service are desired.

SUMMARY

In an embodiment, a method of provisioning a plurality of applications from different application developer systems to a network provider system through a unified services platform comprises establishing a plurality of service accounts for a corresponding plurality of application service provider systems, receiving, by a processor system, a plurality of API interfaces from the plurality of application service provider systems, integrating, by the processor system, each of the plurality of API interfaces with a unified services platform API interface, receiving a provider API interfaces for a network provider system, and integrating the provider API interface with the unified services platform API interface. The plurality of application service provider systems provide services for use in association with a telephone number of a subscriber of telecommunication services. At least two of the API interfaces are different, and at least one of the plurality of API interfaces from the plurality of application service provider systems is not compatible with the provider API interface.

In an embodiment, a method of invoking a third party service during a communication event comprises receiving, by a policy and rules engine executing on a processor system, a first indication of an incoming communication for a telephone number, identifying, by the policy and rules engine, a first triggering event associated with the incoming communication for the telephone number based on the first indication, invoking, by the policy and rules engine, a first service associated with the telephone number in response to the first triggering event, performing, in response to invoking the first service, a first action based on the first triggering event, receiving, by the policy and rules engine, a second indication of a second incoming communication for the telephone number, identifying, by the policy and rules engine, a second triggering event associated with the second incoming communication for the telephone number based on the second indication, invoking, by the policy and rules engine, a second service associated with the telephone number in response to the second triggering event, wherein the second service is provided by a second third party application service provider system, performing, in response to invoking the second service, a second action based on the second triggering event, and handling the communication using the telephone number. The first service is provided by a first third party application service provider system, and the first action is performed by the first third party application service provider system. The second third party application service provider system is different than the first third party application service provider system, and the second action is performed by the second third party application service provider system.

In an embodiment, a method of billing a customer for a third party service performed during a communication event comprises receiving, by a unified services platform system, an indication of an incoming communication for a telephone number from a network provider system, identifying, by a processor system, a triggering event associated with the incoming communication for the telephone number, invoking, by the processor system, a service associated with the telephone number in response to the triggering event, performing, in response to invoking the service, an action associated with the service based on the triggering event, receiving a billing message from the third party application service provider system, and routing the billing message to the network provider system. The service is associated with a third party application service provider system, and the action is performed by the third party application service provider system. The billing message comprises chargeable event data, and the network provider system bills a subscriber associated with the telephone number for the service performed by the third party application service provider system.

In an embodiment, a method of creating a plurality of service actions in response to a communication event comprises receiving, by a processor system, an indication of an incoming communication for a telephone number, identifying, by the processor system, a triggering event associated with the incoming communication for the telephone number, invoking a first service of the plurality of services in response to the triggering event, sending incoming communication information to the first service, routing the first service data to a second service of the plurality of services, and invoking the second service of the plurality of services in response to routing the first service data to the second service. The telephone number is provided by a network provider system, and a plurality of services associated with a plurality of third party service systems are associated with the telephone number. The plurality of services is invoked by at least one triggering event associated with the telephone number. The incoming communication information comprises at least a portion of the information associated with the incoming communication, and the first service generates first service data in response to the incoming communication information. The second service generates second service data.

In an embodiment, a method of creating a plurality of service actions in response to a communication event comprises receiving, by a processor system, an indication of an communication for a telephone number, identifying, by the processor system, a triggering event associated with the communication for the telephone number, invoking two or more services of the plurality of services in response to the triggering event, sending communication information to each of the two or more services, receiving first service data from a first service of the two or more services, receiving second service data from a second service of the two or more services, and handling the communication. The telephone number is provided by a network provider system, and a plurality of service provided by a plurality of third party service systems are associated with the telephone number. One or more of the plurality of services are invoked by at least one triggering event associated with the telephone number, and the communication information comprises at least a portion of the information associated with the communication.

In an embodiment, a method of using a policy store to generate multiple events comprises generating, by a processor system, a policy store comprising a plurality of rules for invoking a plurality of services associated with a telephone number, receiving an indication of a first triggering event based on a communication event associated with the telephone number, matching, by the processor system, the first triggering event with one or more actions in the policy store, identifying, by the processor system, two or more services of the plurality of services based on the matching, generating routing information for each of the two or more services identified based on the matching, and routing communication event information to each of the two or more services of the plurality of services using the routing information. The rules define a relationship between a triggering event and one or more actions to be performed by a service, and the plurality of services are provided by third party application service provider systems. The triggering event is based on a communication event provided by a network provider system, and the policy store is generated by a unified services platform system in communication with the network provider system and the third party application service provider systems.

In an embodiment, a method of provisioning a service for use with a group plan comprises receiving, by a unified services platform system, a subscription request for a service for a group plan, sending, by the unified services platform system, an activation request for the group plan to the third party application service provider system, receiving an activation response from the third party application service provider system, associating the service with each telephone number of the plurality of telephone numbers, providing access to the service for each telephone number based on the associating, receiving, by the unified services platform system, a subscription request for a second service from a subscriber associated with a first telephone number of the plurality of telephone numbers, sending, by the unified services platform system, a second activation request for the service to the second third party application service provider system, receiving a second activation response from the second third party application service provider system, associating the second service with the first telephone number, and providing access to the second service for the first telephone number based on the associating. The group plan comprises a plurality of telephone numbers, and each telephone number of the plurality of telephone numbers is associated with a subscriber. The service is provided by a third party application service provider system, and the second service is provided by a second third party application service provider system.

In an embodiment, a method of billing for a service provided to the members of a group comprises receiving, by a unified services platform system, a subscription request for a service associated with a group, wherein the group comprises a plurality of telephone numbers, associating the service with each telephone number of the plurality of telephone numbers, receiving billing and settlement information from the third party application service provider system for each telephone number, generating billing routing information based on the billing and settlement information, associating the billing routing information for the service with each telephone number of the plurality of telephone number, generating chargeable event data in response to a use of the service by one or more of the subscribers, forwarding the chargeable event data to the group administrator based on the billing routing information, associating a second service with a first telephone number of the plurality of telephone numbers, routing billing charges for the second service to a first subscriber associated with the first telephone number. Each telephone number of the plurality of telephone numbers is associated with a subscriber, and the telephone number is provided by a network provider system. The service is provided by a third party application service provider system, and the routing information forwards billing charges for the services associated with the service to a group administrator. The second service is not associated with the group, and the second service is provided by a second third party application service provider system.

In an embodiment, a method of using a rules engine to allocate usage of a service between personal and group accounts comprises receiving, by a unified services platform system, a subscription request for a service associated with a group, associating the service with each telephone number of the plurality of telephone numbers, receiving billing and settlement information from the third party application service provider system for each telephone number, generating a billing policy store comprising a plurality of rules for charging for the service, generating billing routing information based on the billing and settlement information and the billing policy store, generating a charge for the service in response to a use of the service under usage conditions by one or more of the subscribers, and routing the charges to at least one of the subscriber or the group using the billing routing information. The group comprises a plurality of telephone numbers, and each telephone number of the plurality of telephone numbers is associated with a subscriber. The service is provided by a third party application service provider system, and the telephone numbers are provided by a network provider system. The billing routing information forwards billing charges for the usage associated with the service to at least one of the subscriber or the group based on the usage conditions, and the rules define a relationship between a usage conditions of the service and payment by at least one of the subscriber or the group.

In an embodiment, a method of combining partial functionality across a plurality of applications to create a new service comprises receiving, by a unified services platform system, a definition of a service for each of a plurality of application service provider systems, receiving one or more definitions of actions for each service for each of the plurality of application service provider systems, testing each triggering event and corresponding action in a test environment to generate a response, storing an indication of the triggering event, the corresponding action, and the response, identifying individual actions associated with each of the services associated with the plurality of application service provider systems, combining two or more individual actions from different services provided by different application service provider systems, and forming a new service based on the combining. The actions comprise responses to triggering events occurring for a telephone number.

In an embodiment, a method of identifying actions within services provided by a third party application service providers comprises establishing, on a unified services platform system, a plurality of service accounts for a corresponding plurality of application service providers, receiving a definition of a service for each of the plurality of application service providers, receiving one or more definitions of the one or more actions for each service for each of the plurality of application service provider systems, testing each triggering event and corresponding action in a test environment to generate a response, storing an indication of the triggering event, the corresponding action, and the response, identifying individual actions associated with each of the services associated with the plurality of application service provider systems. The service comprises one or more actions, and the actions comprise responses to triggering events occurring for a telephone number.

In an embodiment, a method of developing and testing a new application service through a unified services platform comprises establishing a plurality of service accounts for a corresponding plurality of application service provider systems, receiving a plurality of API interfaces from the plurality of application service provider systems, integrating each of the plurality of API interfaces with a unified services platform system API interface, receiving a definition of a service for each of the plurality of application service provider systems, receiving one or more definitions of actions for each service for each of the plurality of application service provider systems, testing each triggering event and corresponding action for each service in a test environment to generate a response, and providing access to each service within a working environment after performing the testing. At least two of the API interfaces are different, and the actions comprise responses to triggering events occurring for a telephone number These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
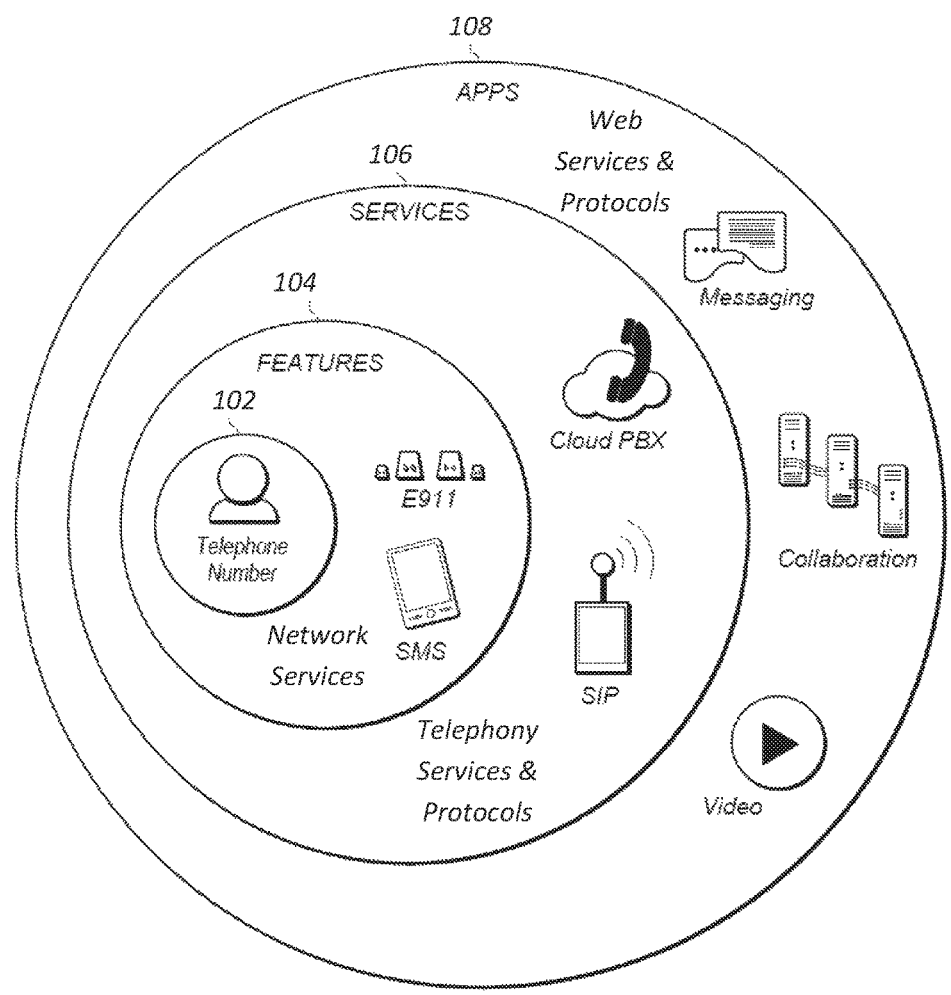
FIG. 1 schematically illustrates a diagram of an embodiment of utilizing a telephone number as the common subscriber ID across a plurality of services.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The telephone number is one of the most universal communication identities in use. It is the core communication, reach, and location based identity a person may currently obtain. The telephone number is thus one of most valuable assets a network provider has. The telephone number is portable, which allows subscribers to take the telephone number with them from provider to provider.

Even more than the quality and power of the provider network, the manner in which the provider's capabilities are made available to a subscriber is important in improving services for subscribers. A subscriber should be able to personalize their functional experience via the capabilities of their network service that are identifiable to them via their telephone number in the manner and way that suits their needs. This becomes possible when the capabilities of the network, anchored by the telephone number, are abstracted into a set of triggers and then connected in a one-to-many fashion into the apps and services users already have, apps and services that exist within or without that network service provider, and/or apps and services that exist globally. An ecosystem of apps and services, anchored by the telephone number as the unifying thread, weaves these together in a chain.

An application or service developer, on the other side of this global equation, once interconnected in a network agnostic way to a telephone number, may now take advantage of the network effect of becoming instantly available to an increasing number of users as more network providers come online. In the global equation of a network provider capability interconnected to a service, or indeed a discrete sliver of a service in an agnostic way, the user of the telephone number and the application or service have a plurality of choices available that exponentially increase. An application developer can connect just once, similar to a network provider, into this platform. As a result, the one-to-many aspect of integration (both provisioning and action) positively benefits each party.

A global, hosted platform transforms a network provider by enabling a single point of integration between its various systems and the global ecosystem of onboarded services. A service joining the platform in Canada can become available to a South East Asian provider's subscribers. That service's communication function may be fulfilled in a separate geography via the provider, allowing rapid time to market. Innovation across the globe becomes available to a provider's regional customers. The ability to integrate into the unified platform once and become available everywhere thus greatly increases the value to the service, the network provider, and/or the user.

From the application side, an application developer may describe multiple pieces of behavior, each defined as an action, driven by telephone number activity. As a user, an event on a telephone number can be used to trigger a plethora of actions across discrete services and applications. These actions may target the entire service, or just a piece of functionality provided within that service. These actions, made available to the user of this application or service, are agnostic to the network provider, identified only by their telephone number. These actions can now be triggered in a simultaneous and/or sequential, precedence-driven approach via a policy & rules engine that operates neutrally across network providers and application developers.

To a user, whether in control of one or more telephone numbers, or managing a group of numbers, either in a household or as part of a department in a company, the capability now exists to attach a set of actions as part of a profile. This profile allows for a single subscriber to control these actions across multiple telephone numbers. As the association of the plurality of services and apps exists with the a telephone number, not a subscriber, it is the association of the user to that telephone number that enables a subscriber to play multiple roles in how they drive use of these action sets. In these roles, the provisioning, action, and billing relationship may all drive to different places in different ways, yet anchored again by that common telephone number.

Using the systems and methods described herein, the telephone number can become free of a specific device or set of devices. When communication activity is delivered via of these action sets into apps or slivers of a service, the need for a specific device to perceive this communication activity becomes federated across all mediums and platforms where these apps and services function. It now becomes possible for a phone to be unavailable yet the telephone number continue as a viable communication identity. The integration of these applications and services into network providers thus allows the telephone number to elevate from the telephone.

In summary, a single telephone number anchoring multiple sets of actions, each action triggering either a complete service or a discrete piece of functionality within that service, whether serially, in parallel or via some other intelligent invocation manner, allows for numerous unique patterns of new service creation. Service creation thus becomes the manner in which a communication activity event triggers an application or service, thus delivering a piece of functionality that exists purely because of the linkage of the trigger to the service. The plurality of these actions, driven by a multitude of network providers and application developers on either side of a global ecosystem bridges both together, with the telephone number being the common, worldwide identifier anchoring it together.

In some current systems, the ecosystem developed around a telephone number may be limited by the number of services provided through a telecommunications provider. Services can be offered to the subscribers as either native services and applications developed by the telecommunications provider or through the integration of third party services into the telecommunication provider system. In order for a third party service to be integrated into the telecommunication provider system, the third party service must be adapted to work with the APIs of the telecommunication provider system. If the third party service wants to integrate the service with multiple telecommunication provider systems, the service must be adapted to multiple APIs as most telecommunication provider systems do not use the same APIs or communication protocols. The resulting development and maintenance responsibilities may be difficult for some third party service providers to maintain, which may limit the number of third party service provider willing to provide services to the telecommunication providers.

In order to address this difficulty, the present description provides for the use of a unified services platform. The unified services platform provides a common interface for each third party service as well as a common interface for the telecommunication provider. This may allow the unified services platform to act as a translation service for the third party services. Each third party service can then maintain a single service product while having the service available for multiple telecommunication providers.

The use of the unified services platform may also allow the telecommunication providers to present the third party services as their own. This may increase the satisfaction of the subscribers with the telecommunication providers as well as increase revenues. The third party services may receive more customers by having their services presented to an existing subscriber base.

The ability to offer multiple services through a single telephone number and unified services platform may present the opportunity for the individual services to be combined in new and unanticipated ways. For example, the subscriber may activate multiple services and can define rules to control the routing of the information through the services. In some cases, the information can be routed serially through a plurality of services and in others the information can be routed in parallel. The use of serial routing of information may allow the results of one service to be used by the next, in essence creating a new customized service. Similarly, parallel routing of information for the services may allow the desired set of features to be obtained for a subscriber. In some cases, individualized features related to one or more services can be selected and used by the provider or subscriber to create a customized service. For example, selected features from a plurality of services can be grouped to provide a service desired by a subscriber.

Further, use of the unified services platform to mediate third party services may allow the services to be billed to the customer on a single bill. For example, the third party services can bill through the telecommunication provider directly to the subscriber rather than having to submit individual bills and deal with recovering payment from the subscriber. Thus, the systems and methods described herein may simplify the interaction of application service providers with telecommunication providers to enhance the services available for subscribers.

As described herein, the telephone number of a subscriber can be used to link any number of services. For example, a diagram of an embodiment of utilizing a telephone number as the common subscriber ID across a plurality of services is shown in FIG. 1. The telephone number 102 may be the central ID which is associated with all of the features 104, services 106, and apps 108 which are provided to the subscriber. As shown in FIG. 1, the features 104 may include enhanced 911 (E911) to link the telephone number 102 to the appropriate public resources, short message service (SMS) to provide text messaging for the telephone number 102, and network services. The services 106 may include cloud PBX services for enabling an enterprise private telephone network, session initiation protocol (SIP) for controlling sessions over IP networks, and telephony services and protocols to provider telephone service to a subscriber. The applications 108 may include messaging, collaboration, and video, web services and protocols, as well as any number of other applications not shown. These features are only exemplary and numerous other services can be provided and linked through the use of the telephone number such as telephone number bridging network based services, web based services and applications, and the like.

The diagram of FIG. 1 illustrates the aggregation of the features 104, services 106, and apps 108 around the telephone number 102. The diagram represents an ecosystem that has been built around the telephone number 102 and includes legacy services combined with IP and data related services not traditionally associated with voice service over the PSTN. The ecosystem may be associated with the telephone number 102 and the subscriber may use the telephone number 102 as the login or username to access a storefront for managing all of the supporting services and applications to which they subscribe. The services and applications may be provided by multiple providers in multiple different ecosystems, but these services and applications may be unified around the telephone number 102 and appear to the user as existing in a single ecosystem.

Figure 2:
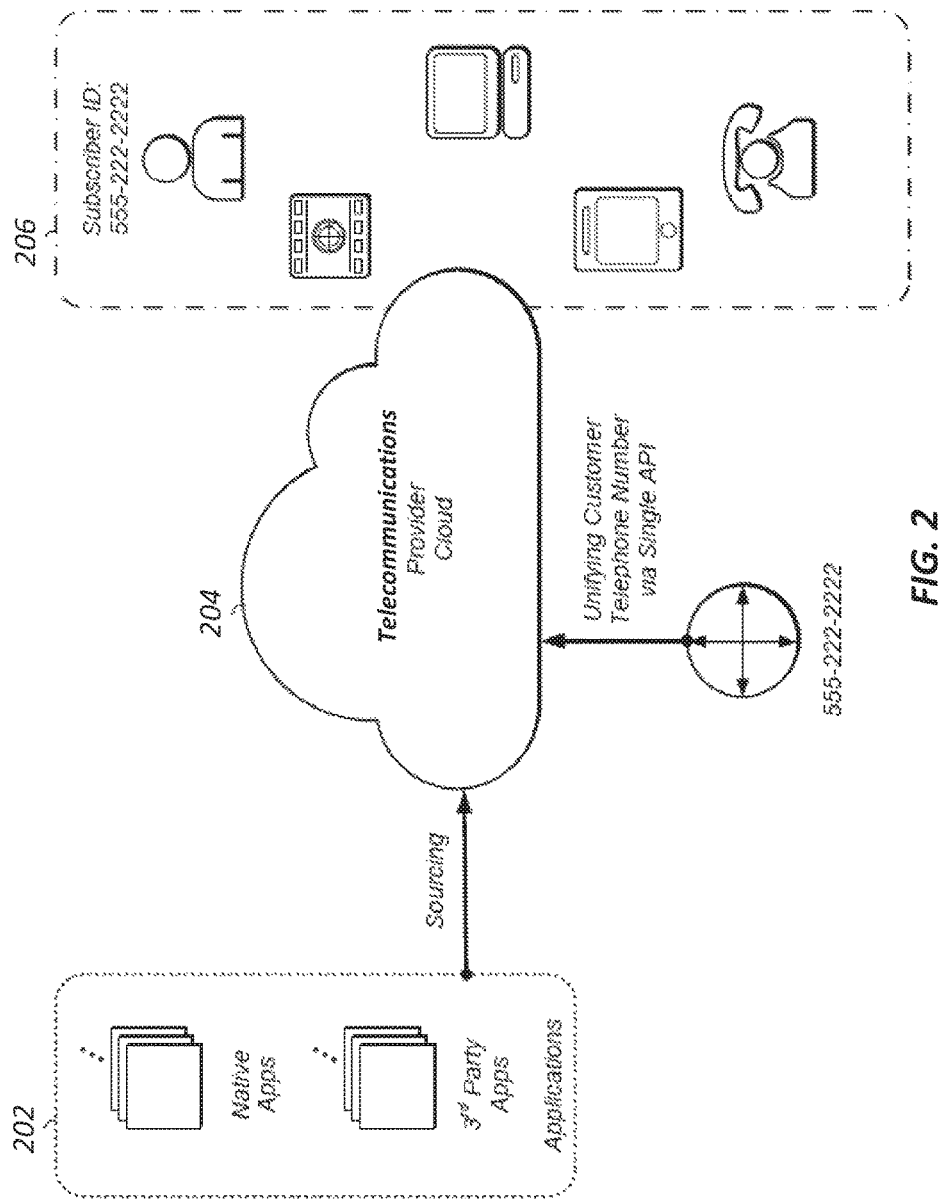
FIG. 2 schematically illustrates an embodiment of a telecommunications provider cloud.

As an example of a system described herein, a block diagram of one embodiment of a telecommunications provider cloud is shown in FIG. 2. The telecommunications provider cloud 204 may allow a telecommunications provider to add third-party applications to its various service offerings and white-brand and sell those third-party applications as if they were their own. In an embodiment, the telecommunications provider cloud 204 may include a unified services platform, which can be provided as software as a service (SaaS), and the unified services platform SaaS may be configured to combine large numbers of applications and provide them in a single offering to end users. The block 202 represents third-party applications combined with native applications that may be sourced by the telecommunications provider represented by cloud 204.

As shown in FIG. 2, all of the applications in block 202 that are used by a given subscriber may be unified around the subscriber's telephone number. Block 206 is representative of a single subscriber with a telephone number of 555-222-2222. The applications that are unified around this telephone number in block 206 may be associated with multiple different devices for the single subscriber. The subscriber may access the applications using a computer, tablet, mobile phone, smartphone, e-reader, landline phone, and/or any other suitable electronic device.

Figure 3:
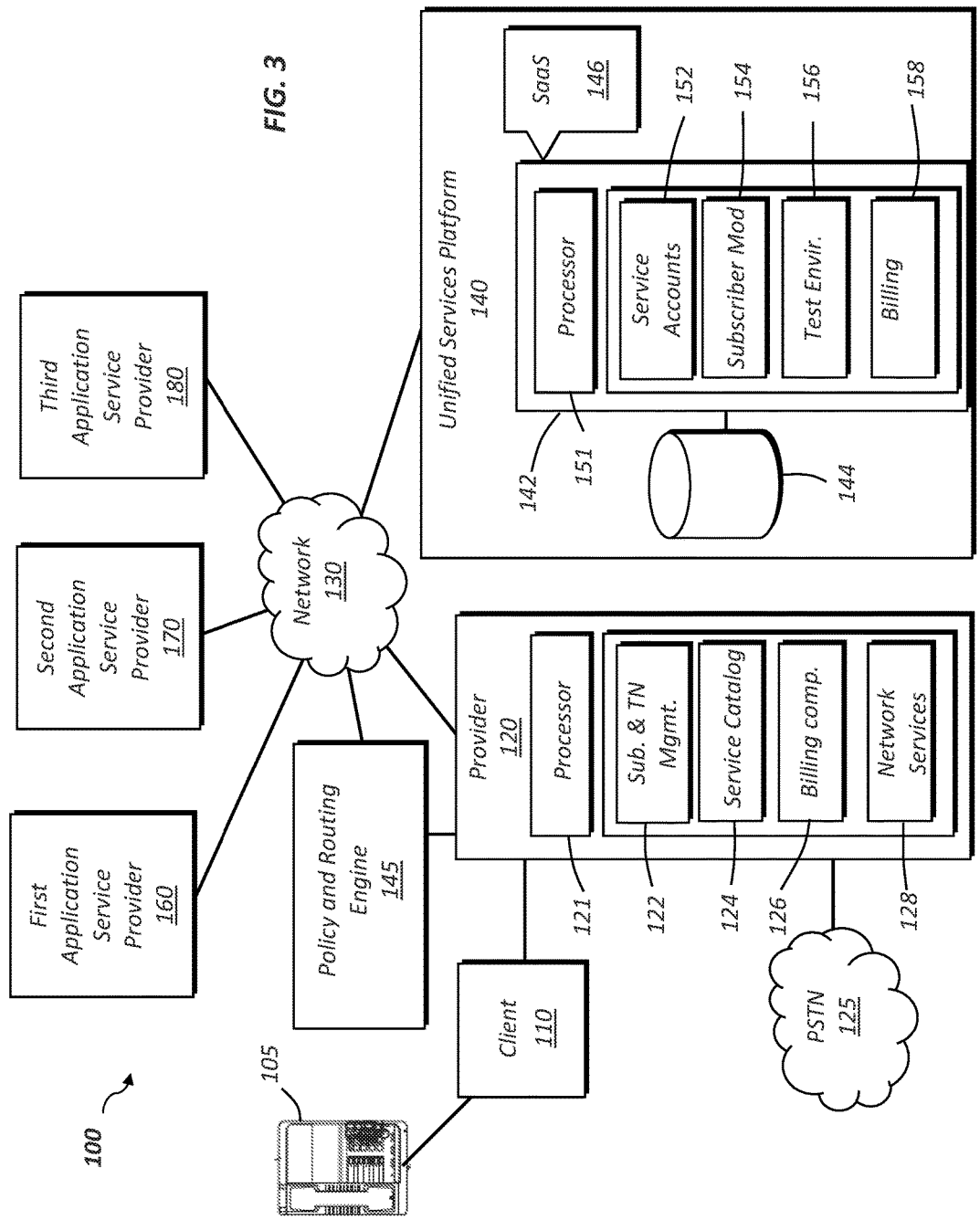
FIG. 3 schematically illustrates an embodiment of a system for providing a unified services platform.

Referring now to FIG. 3, a system 100 for providing a unified services platform is schematically illustrated. The system 100 generally comprises a device 110, a provider 120, a unified services platform 140, a policy and routing engine 145, a network 130, and a plurality of application service providers 160, 170, 180. The network 130 may communicatively couple the various components of the system including the provider, the unified services platform 140, the policy and routing engine 145, and the plurality of application service providers 160, 170, 180. The network 130 may be a public communication network, a private communication network, or a combination thereof, and the network 130 may provide wired or wireless communications through a number of protocols between the components of the system 100.

The client or device 110 comprises a device or system associated with a telephone number that can be used by a subscriber. The device 110 may comprise a telephone or mobile device assigned to the telephone number that receives telephone services based on the telephone number. However, the device 110 may include a device that is associated with the telephone number as an identifier. For example, the device 110 may receive network service based on the telephone number without also receiving telephone service. In an embodiment, the device can include a mobile phone, a tablet, a PDA, a laptop, a computer, or any other type of device capable of receiving telephone and/or network services.

The device 110 may subscribe to a standard telephone service provided by the provider 120, and the telephone service may be associated with telephone number 105. Depending on the embodiment, the telephone service may or may not be bundled with other types of services (e.g., TV, internet). The device 110 is representative of any number and type (e.g., residential, business) of customers of the provider 120. The provider may comprise a telecommunications service provider. In some embodiments, the provider 120 may be another type of provider such as a mobile carrier, a cable services provider, a network provider, an enterprise operating a business and providing network service to subscribers (e.g., employees, customers, contractors, etc.), or the like. Also, in other embodiments, device 110 may subscribe to multiple telephone services and have multiple telephone numbers. While only a single device 110 is illustrated, any number of devices may be present in the system 100. Further, in some embodiments, the device 110 may represent a group of users or devices, each of which may have a separate identifier such as the telephone number 105.

In an embodiment, the device 110 may be connected to the provider 120 via a wired connection (e.g., copper, fiber). In some embodiment, the device 110 may be connected to the provider 120 via a wireless connection. For example, the device 110 may use a wireless communication link to the provider 120 and/or the network 130 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless communication protocol. In some embodiments, the device 110 may comprise a device that is coupled to the provider 120 and/or the network 130 through a wireless access point. The wireless access point or other wireless local area network (WLAN) access point may comprise any number of devices such as a router, and may use a number of wireless communication protocols including, but not limited to, WiFi, Bluetooth®, and the like. The provider 120 may also be connected to a public switched telephone network (PSTN) 125. The provider 120 may include any number of telephone systems and may also be connected to other devices and other networks.

In an embodiment, the device 110 may subscribe to services and applications in addition to the telephone service provided by the provider 120. As described in more detail herein, the services and applications can include, but are not limited to, video conferencing, text messaging, interactive texting, hosted private branch exchange (PBX) seats, voice mail systems, and other services and applications. These services may be provided by the first application service provider 160, the second application service provider 170, and/or the third application service provider 180. While three application service providers are illustrated in FIG. 1, any number of application service providers may be in communication with the unified services platform 140 and/or the provider 120. The provider 120 may also provide native services and application that can be purchased directly from the provider 120 by the device 110.

The provider 120 may operate any number of systems suitable for providing the telephone and network services to the device 110. In general, the provider 120 is a communication service provider that provides telephone numbers associated services to the device 110. In an embodiment, the provider 120 may operate a system comprising a processor and memory. The memory may comprise one or more storage devices such as databases and the like. The various components making up a suitable system for providing the telephone and network services are described in more detail below. The provider 120 may comprise a number of applications stored in the memory and capable of being executed by the processor including a subscriber management component 122, a service catalog component 124, a billing component 126, and a network services and communication component 128.

The subscriber management component 122 may be stored in the memory and executed on the processor to manage the device 110 information. The device 110 information or any portion thereof may be provided to an application service provider 160, 170, 180 through the unified services platform 140 during provisioning of the application service provider services. The subscriber management component 122 may store the customer or device 110 information as well as control the formatting and communication of the information to the other systems. In an embodiment, the subscriber management component 122 may maintain the subscriber identity (e.g., a unique identifier, etc.), subscriber authentication data, the device 110 telephone number, the subscriber contact information (e.g., name, address, email, etc.), service plan information (e.g., telephone service plan information, application service provider plan information, etc.), and the like.

The service catalog component 124 may maintain the services and applications offered by the provider 120, including those offered by the application service providers 160, 170, 180 through the unified services platform 140 as well as any internal services provided directly by the provider. The service catalog component 124 may execute on the processor and provide the service information through a portal where devices 110 can select the desired services. The service catalog component 124 may contain filters to allow the provider 120 to select the information illustrated in the catalog displayed in the portal. As described in more detail herein, the catalog may display less than all of the information provided by an application service provider 160, 170, 180. The service catalog component 124 may also control the communications with the unified services platform 140 and/or one or more of the application service providers 160, 170, 180 during the service provisioning and/or activation process.

The billing component 126 may contain the billing information for each device 110 based on the services that the device 110 selects. When a subscriber uses the portal to activate a desired service, the billing information for the selected service may be added to the billing component 126. The billing component 126 may execute on the processor to allow chargeable services data to be sent to the unified services platform 140 and/or an application service provider 160, 170, 180 when the service is provided by the provider 120. When the service is provided directly by an application service provider 160, 170, 180, the billing component 126 may be configured to receive the chargeable service data, add the notification information to a customer billing account, and route the appropriate payment or information back to the application service provider 160, 170 180 when the payment is received from the device. The chargeable services data can include information related to the use of a service such as a use indicator, an amount of the services used, a type of the service used, event data (time, location, etc.), and the like. The chargeable services data may not contain an actual amount to be billed. Rather, the amount billed can be returned to the provider 120 from the application service providers 160, 170, 180 based on the chargeable services data.

The network services and communication component may be configured to allow the provider 120 to communicate with the device 110, the unified services platform 140, and/or one or more application service providers 160, 170, 180. In an embodiment, the network services and communication component may communicate policy and rule information with the unified services platform 140, provide signaling and execution information with the unified services platform 140, provide content and data to the unified services platform 140 for use with the application service providers 160, 170, 180, and/or provide content, data, and/or signaling information directly with the application service providers 160, 170, 180.

The application service providers 160, 170, 180 can provide services to a subscriber through a device 110. The first application service provider 160 may be part of a first ecosystem with a first identifier (ID) for each user and use a first application programming interface (API) for selecting and activating apps. In addition, the second application service provider 170 may be part of a second ecosystem with a second ID for each user and use a second API for selecting and activating apps. Similarly, the third application service provider 180 may be part of a third ecosystem with a third ID for each user and use a third API for selecting and activating apps. The first ID used by first application service provider 160 may or may not be different than the second ID used by second application service provider 170 and/or the third ID used by the third application service provider 180. The first API used by first application service provider 160 may or may not be different than the second API used by the second application service provider 170 and/or the third API used by the third application service provider 180. In other words, the first, second, and third ecosystems may not be compatible, may require separate IDs (for the same customer), and may have different types of rules and APIs for accessing, provisioning, and using their various services.

The application service providers 160, 170, 180 may establish communication pathways with the unified services platform 140 and/or the provider 120. In an embodiment, all of the communications between the application service providers 160, 170, 180 and the provider 120 may pass through the unified services platform 140. In some embodiments, some or all of the communications between the application service providers 160, 170, 180 and the provider 120 may occur directly between the application service providers 160, 170, 180 and the provider 120. In this embodiment, context information may be provided back to the unified services platform 140 to provide the necessary information to allow the services to be provided to the device 110.

The provider 120 may also be coupled to the unified services platform 140 via the network 130. The unified services platform 140 may be configured to provide a common interface between the application service providers 160, 170, 180, when each may have different APIs. The unified services platform 140 may unify all of the available services and applications in a single platform and associate the services and applications with a single ID to identify the device 110. Rather than using an identifier such as an email address or a completely separate identifier, the unified services platform 140 may associate the various services and applications provided to the device 110 with the telephone number 105. In an embodiment, the provider 120 may use a single API for generating requests that are sent to unified services platform 140, and the unified services platform 140 may aggregate a plurality of APIs for a plurality of providers (e.g., first application service provider 160, second application service provider 170, third application service provider 180, etc.) within different ecosystems. Each separate application service provider may have a different API, which may each be different than the API used by the provider 120. In order to allow the different services to be used by the device 110 through the provider 120, the unified services platform 140 may activate services using the appropriate API for the provider 120 and each application service provider 160, 170, 180 to deliver the requested service.

The unified services platform 140 may include software and/or hardware for performing the various tasks to configure and provision a variety of services and applications and associate them with the telephone number 105. In an embodiment, the unified services platform 140 may be a Software as a Service (SaaS), and the unified services platform 140 may reside in the cloud. In an embodiment, the unified services platform 140 may include the server 142 and the database 144 for hosting the SaaS 146 and storing corresponding data. The server 142 and the database 144 are representative of any number of servers and databases. In some embodiments, the computing resources of the unified services platform may be spread out in multiple locations in the cloud and be accessed via the network 130. Although the unified services platform 140 is shown as being separate from the provider 120, in some embodiments, portions of the platform 140 or the entirety of the platform 140 may be integrated within the provider 120.

The server 142 may comprise a processor and the database 144 or another memory may comprise one or more components for performing the various tasks. In an embodiment, the unified services platform 140 may comprise an application service provider account component 152, a subscriber component 154, a test environment component 156, and a billing component 158. While some components are illustrated in FIG. 3, any number of additional components may be included and executed by the unified services platform 140.

The service provider account component 152 may serve as an account for the application service providers 160, 170, 180. The service provider account component 152 may comprise information including the communication information, API definitions, service descriptions, catalog information, branding information, and the like. The service provider account component 152 may also comprise the data and/or definitions used to allow the services to be provided to the device 110. For example, the service provider account component 152 can comprise the configuration web uniform resource locator (URL) for executing the services, the configuration message format and payload, support information, and the like. When the service is selected by a provider 120, the information provided in the catalog may be provided from the service provider account component 152.

The subscriber component 154 may contain the subscriber information provided by the provider 120. In an embodiment, the subscriber component 154 of the unified services platform 140 may comprise the subscriber identity, authentication information, subscriber data, and the telephone number 105. When the different application service providers 160, 170, 180 use unique identifications, the subscriber component 154 may also comprise the mapping information to correlate the application service provider identification with the telephone number of the device 110. This information may be used during provisioning, activation, deactivation, and activation of the service(s).

In some embodiments, the subscriber component 154 may comprise policy information and rules for a subscriber. The policy information may include information related to the actions associated with the requested services. For example, the policy information may identify what actions should be taken in response to receiving a voice call. The rules may define specific actions and logic within the policy. The subscriber component 154 may execute to provide a subscriber portal for setting and/or modifying the policies and rules associated with each service. This may allow the services to be customized through the unified services platform 140.

The test environment component 156 may be provided by the unified services platform 140 to allow one or more application service providers 160, 170, 180 to develop the services and test the interaction of the services with the unified services platform 140. The test environment component 156 may respond in a manner that is the same or similar to the live implementation of the unified services platform 140 without allow the interactions to be released. The development application is described in more detail herein.

The billing component 158 may comprise routing and event data for the billing events and chargeable services data exchanged between the application service providers 160, 170, 180 and the provider 120. The billing component 158 may be configured to interact with the billing component 126 within the provider 120 to provide the information to allow the use of the services to be billed to the device 110 account.

The system 100 may also comprise a policy and routing engine 145, which may reside within the unified services platform 140 and/or within a server associated with the provider 120. In an embodiment, the policy and routing engine 145 may be a part of the server 142. The policy and routing engine may execute the policies selected for the services provided to a subscriber. The policy and routing engine may respond to an event or trigger, apply a policy and select the appropriate information to route the appropriate service. For example, a subscriber may subscribe to a contact list lookup service that can provide contact information upon receiving a voice call. The appropriate policy may be selected by the subscriber and stored in the subscriber module within the unified services platform 140. When a voice call is received, the receipt of the voice call may serve as a trigger, and the policy engine may apply the selected policy of invoking the contact list lookup service. When the policy is executed, the appropriate routing information for the incoming call data is obtained and the call data can be forwarded, using the routing information, to the contact list lookup service. The results of the lookup can then be returned to the subscriber through the device 110.

The services offered by an application service provide may first be provisioned to the unified services platform 140. In some contexts, the process of defining and integrating the services with the unified services platform 140 may be referred to as provisioning and/or onboarding. In general, a service can be provisioned into the unified services platform 140 by defining the services, plans, and actions used with the service. The services can be tested for use with the unified services platform, and once verified, published for selection by a provider 120.

Figure 4:
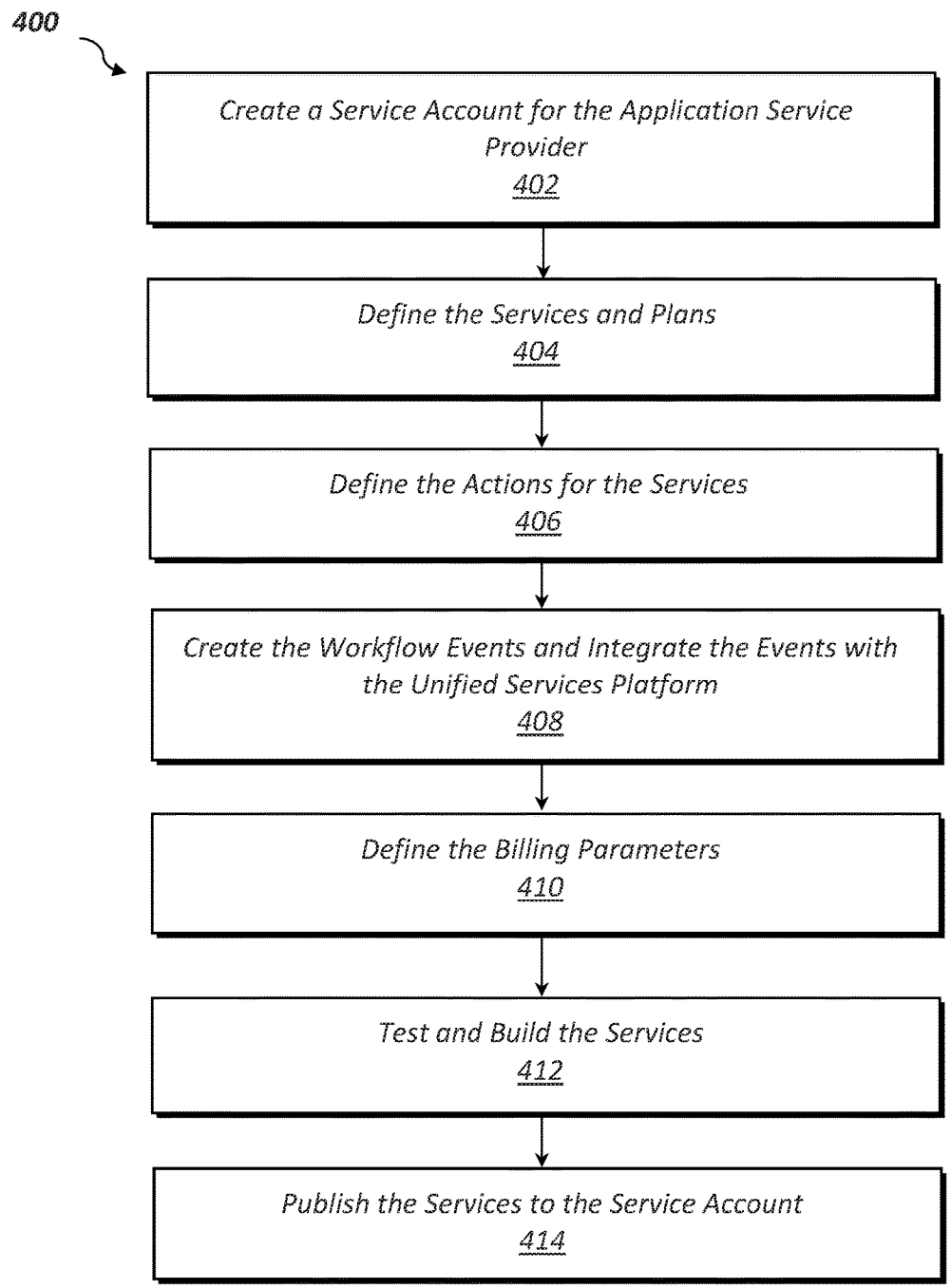
FIG. 4 illustrates an embodiment of a method for provisioning a service from an application service provider to a unified service platform.

Referring to FIGS. 3 and 4, a method 400 for provisioning a service from an application service provider 160 to the unified service platform 140 can be described. In step 402, the application service provider 160 can establish a service account with the unified service platform 140. The service account can be created and store information about the application service provider and the service. In an embodiment, the service account can store the information in the service account component 152 in the unified service platform 140. As part of the service account, the application service provider 160 can provide application service provider information such as the service name, the application service provider name, a logo, demonstration examples, and the like. The service account may then be used to maintain the information for the service and/or the application service provider while the services are offered through the unified services platform 140.

At step 404, the application service provider 160 may define the plans and services offered through the unified service provider. The services may define the availability and types of activities that the application service provider can provide with their products. The services can be defined through the use of catalog data such as a service name, associated website, description, category, availability, and the like. The service may also be defined using technical information including a configuration description, support information, and event notification information. The information may be provided as a link to URL, a message, or a messaging format for use with the service. The plans comprise information regarding pricing, features, and/or service limits associated with the service offered by the application service provider 160. The definitions and information for the services and plans can be stored in the unified services platform 140.

As step 406, the application service provider 160 can define the actions for the services and plans. Actions relate to the work performed by the service based on an input or trigger associated with the device 110. In an embodiment, the action relates to activities related to the telephone number of the device 110. The actions can be defined in terms of the trigger and the resulting activity with the trigger is performed. Various actions can be performed when the service is invoked, for example based on a trigger. Actions can include transferring messages, images, documents, postings, notifications, or the like among various software services. For example, an action can include posting an incoming message to a social media set for the subscriber or posting the message to a messaging storage log. Actions can also include obtaining information such as contact information for a caller, customer information for a calling customer, or the like. In some embodiments, the actions can include any of those associated with various types of software, applications, or media such as social media postings, customer relationship management software, call and message translations (e.g., language translations, voice to text translations, text to voice translations, etc.), file sharing software, file management software, contact management software, voicemail, messaging applications, call recording software, contact matching software (e.g., caller ID, etc.), messaging storage software, call notification software, and any other software available for integration. While some actions are listed as examples, the actions can include any type of work performed by a service.

A trigger can include any type of action performed on the device 110, such as an event associated with the telephone number 105 of the device 110. In an embodiment, a trigger can include a request by a subscriber to use the service. In some embodiments, the triggers can be tied to activities including messaging service activities (e.g., short message service (SMS) text messaging, etc.), call events, call control events, location events, time based events, and the like. The triggers can be associated with Representational State Transfers (REST) actions associated with various services. Applicable messaging service triggers can include, but are not limited to, REST upon sending a message and/or REST upon receiving a message. Similarly, call event triggers can include, but are not limited to, REST before making a call, REST after making a call, REST before receiving a call, and/or REST after receiving a call. Activities related to call controls can include, but are not limited to, Session Initiation Protocols (SIP) actions such as SIP on receiving a call and/or SIP on making a call. Location based events can include REST upon changing a location, REST upon entering a predefined area, REST upon leaving a predefined area, or the like. Time based events can include REST before a specified time, REST after a specified time, and the like. While described in terms of messaging, calls, call control events, location events, and time based event, various other triggers can also be defined. In an embodiment, events associated with specific connections, and the like can be defined. For example, the connection based triggers can include loosing network service, restoring network service, connecting a specific network interface, connecting to a specific type of network interface (e.g., WiFi router vs. cellular communication services, etc.), and the like may also be used as triggers. The application service provider 160 can define the triggers used to initiate the actions associated with the particular services.

In addition to the triggers that initiate the actions, the application service provider 160 can define or allow rules and policies that apply upon the triggering event. The rules can be stored in the service account. The rules may generally define what actions, routing, or services are performed upon receiving a triggering event. The rules may be customized by a subscriber and executed by the policy and routing engine 145 during use of the device 110.

At step 408, the application service provider 160 may create workflow events to provide the integration with the unified services platform 140. The workflow events define the API interfaces to allow the service offered by the application service provider 160 to integrate with the unified services platform 140. Any number of API workflow events can be defined to allow for the full integration of the service with the unified services platform 140. In an embodiment, workflow events can be defined for service events, subscriber events, and the like. For example, workflow events for service changes can be defined to provide notification(s) of a service activation, a service deactivation, or a service modification. Similarly, workflow events for subscriber changes can be defined to provide notifications of a subscriber suspension, termination, and/or resumption.

The workflow events may be sent out as standardized data notifications in a programmatic format containing the information, such as JavaScript Object Notation (JSON) or Extensible Markup Language (XML), to a web uniform resource locator (URL) specific to the application service provider 160. The application service provider 160 may then intercept the information and translate the information into appropriate systems, databases, and/or other internally relevant systems to respond to the workflow event. Likewise, the workflow even notifications from the application service provider 160 are sent in a standardized format to a web URL configured for the application service provider 160 in the unified services platform 140. The notifications may comprise information sufficient to identify the subscriber account, the service, and the type of workflow event. In an embodiment, the notification may comprise a subscriber identification (e.g., the telephone number 105), subscriber information (e.g., name, contact information, etc.), a provider identification, a service name, a plan name, the type of event, and any additional information needed to carry out the workflow event.

In an embodiment, the billing information, model, and routing information can be defined in step 410. The billing information may be provided based on the plans defined by the application service provider 160. In general, the billing for the services provided by an application service provider may be billed to the device 110 through the provider 120. This may provide a single bill to the subscriber, which may enhance customer satisfaction with the provider and the services. The billing information may be used to define the chargeable services data format and routing. When the services are used by the device 110, the chargeable services data can be generated by the provider 120, the unified services platform 140, and/or the application service provider 160 and routed to the provider 120 for billing to the customer. The location of the generation of the chargeable services data may depend on the communication between the device 110 and the application service provider 160 when the services are used. The billing information defined during provisioning can also be used to provide payment for the service from the provider 120 to the application service provider 160 upon payment by the subscriber to the provider 120.

Once the service has been defined in the unified services platform 140, the service can be tested and built in step 412. In an embodiment, the testing component 156 within the unified services platform 140 can be used to fully test the services, functionality, and compatibility of the application service provider 160 with the unified services platform 140. Testing can include executing a number of test cases to fully establish the functionality of the service. For example, each trigger can be executed along with the use of one or more rules or policies to allow the communication with the unified services platform 140 to be verified. Billing scenarios including invoicing and returning payment can also be tested using the test system. Once the service is tested, it can be completed and published to the unified services platform 140 in step 414. The same process can be used to provision any number of services from a given application service provider 160, and/or for each service provided by different application service providers 160, 170, 180.

Once the service from the application service provider 160 is provisioned into the unified services platform 140, the service may be discoverable by the provider 120. In an embodiment, the unified services platform 140 may maintain a list or catalog of provisioned services that can be selected by the provider 120. The catalog may allow the provider 120 to browse the available services and select one or more services to be added to the provider's 120 catalog of services that are visible and available to the device 110.

Figure 5:
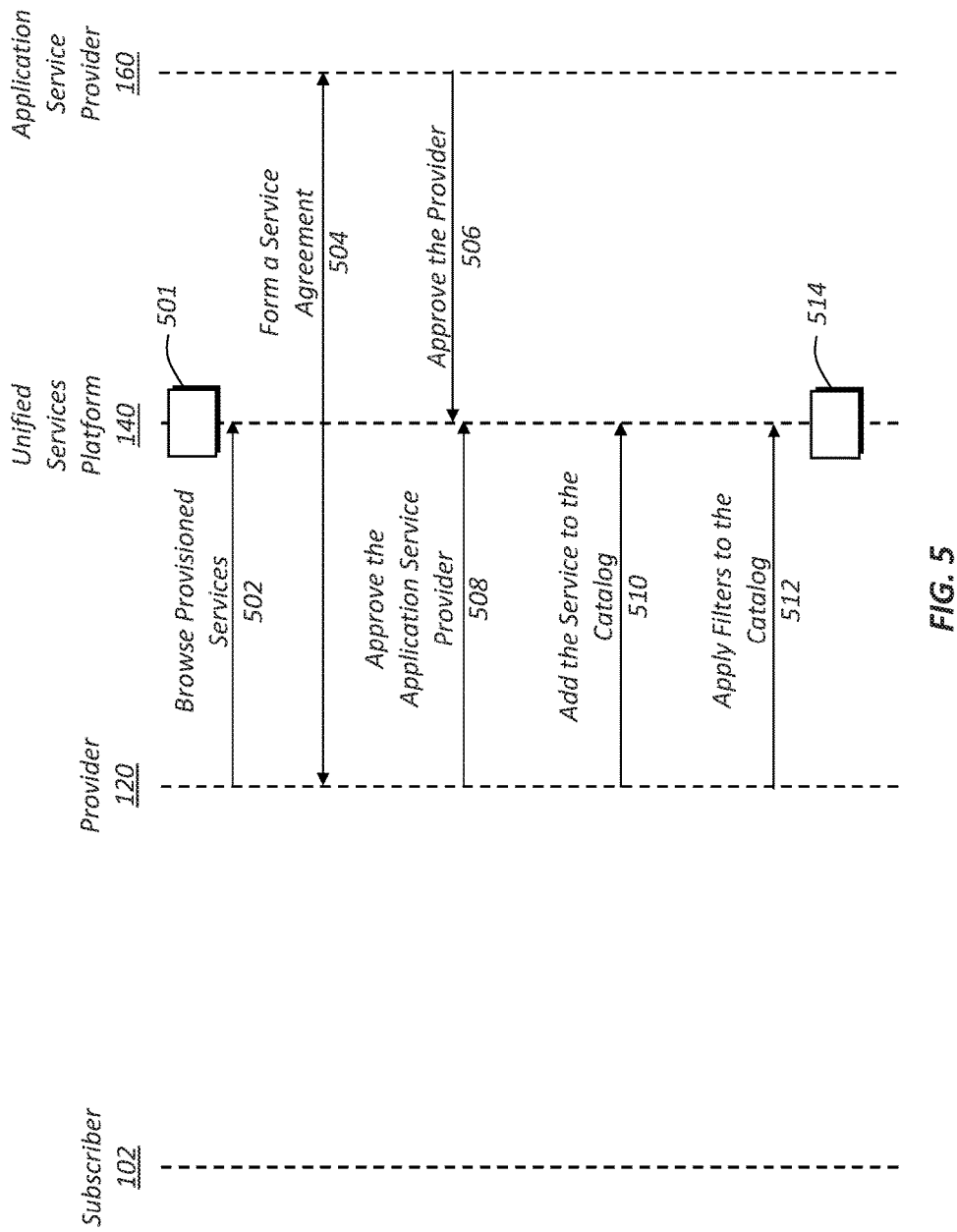
FIG. 5 illustrates a messaging diagram showing an embodiment of a process for selecting a service for addition to a provider's catalog.

A messaging diagram illustrating an embodiment of a process for selecting a service for addition to the provider's 120 catalog is illustrated in FIG. 5. In the context of FIG. 5, it can be assumed that the provider 120 has already been integrated with the unified services platform 140 through the appropriate integration of the system APIs. Once the service from an application service provider (e.g., application service provider 160) has been provisioned into the unified services platform 140, the service may be added to a service catalog or other service store as shown as element 501 in FIG. 5. The unified services platform 140 may provide a portal for the provider 120 to view the available services in the catalog. The information provided by the application service provider 160 may be available to view such as the description, the service and plan definitions, the action definitions, screenshots, samples of the functionality, links to the application service provider's website, and the like. In this sense, the portal may act as a storefront for the provider 120 to select services provisioned to the unified services platform 140.

The provider 120 may log in and browse the provisioned services in the catalog 501 by establishing a connection with the unified services platform 140 in step 502. Once the provider 120 selects a service to make available to their subscribers, the provider 120 and the application service provider 160 may, directly or through the unified services platform 140, communicate in one or more messages to form an agreement for providing the services through the provider 120 in step 504. The agreement may establish how the services are to be provided, how the services will be routed, the billing and payment agreements and routing, and the like.

Once the agreement has been reached, the application service provider 160 may provide a message to the unified services platform 140 approving the provider 120 in step 506. Similarly, the provider 120 may provide a message to the unified services platform 140 approving the services provided by the application service provider 160 in step 508. The messages sent in steps 506, 508 may occur in any order to long as both parties approve the services being provided. The messages sent in steps 506, 508 may comprise the information relating to the routing of information to allow the services to be provided to the device 110, billing information, and the like that can be stored in the unified services platform 140 for use when the services are invoked.

Once the service has been approved by both parties, the service may be added to the provider's 120 catalog. The provider's catalog can reside on a server at the provider 120 and/or on the unified services platform 140. When the provider's 120 catalog resides on the unified services platform 140, the provider 120 can send a message to add to the service to the provider's 120 catalog in step 510.

The provider 120 may also apply one or more filters to the services added to the provider's catalog. The ability to add a filter may allow the provider to rebrand the service as the provider's own service or present the service as being provided by the application service provider 160. In some embodiments, the provider 120 may only allow a portion of the plans or services provided by the application service provider 160, and the services that are not being presented to the device 110 can be hidden. Thus, the filters may allow the provider 120 to customize the services offered to the device 110. The filters may also limit the presentation of services that are presented to a particular device 110 to those that the device 110 can use. For example, services requiring presentation on a handset may not be presented to a device 110 having only a landline. In an embodiment, the filters can include presentation filters, service availability filters, and/or filters based on the system available at the device 110. The provider may send a message to enable the filters for use with the catalog in step 512. The provider's catalog 514 comprising the added service may then be available for viewing by a device 110.

In addition to display and use filters, the provisioning process may perform a discovery process to determine individual actions and functions that the software can perform. For example, a service offered by an application service provider service may include performing a location determination followed by a directory lookup based on the location determination. As part of the testing procedure, the location determination feature may be discovered to be separable from the remaining portions of the software. For example, an API call may return the location determination without any additional data. Alternatively, the information from the service may be routed through the unified services platform and only the location determination may be extracted from the information while the remaining portion may be discarded.

In an embodiment, the unified service platform 140 may record the information provided by the services during the testing phase of the application service provider services. The information provided by each defined action can be recorded and parsed to determine a correlation between the defined actions and the resulting data generated by the service. This information can then be used to identify separable services provided by the application service provider 160, 170, 180 services. In some embodiments, the application service provider may define specific messaging calls to perform individual functionality of the services. A catalog of individual services offered by the various application service providers can then be provided to the provider for use with various functions.

The ability to discover separable functions or services within the application service provider services may allow the unified services platform and/or the provider to identify and use individual functions for several purposes. In an embodiment, the individualized functionality may be used with the provider network to provide services to the subscribers. For example, a geolocation service that is part of one of the services may be provided to a subscriber and used as part of the functionality of a subscriber device associated with the telephone number. This may allow the provider to build in services for the subscribers without having to develop the services internally.

In an embodiment, the separable services may also be used to develop larger services by combining individual functional elements from multiple application service provider services into a single service. This is similar to the use of chaining actions, but may be more flexible in defining the type of result or functions performed. For example, a new service could be constructed from individual functionality of two or more services without using the full functionality of any of the services. The use of the unified services platform 140 may provide the interface to allow the separable functionality provided by the multiple services to work together, communicate, and route the information in a manner suitable for allowing a new service to operate.

The separable or individual services can be combined by the subscriber, the unified services platform, a provider, or and/or a third party application provider. In an embodiment, a subscriber may browse the available actions and select a plurality of actions to combine according to a provided set of rules. The rules may specify a routing (e.g., a serial routing to create a chaining flow, a parallel routing to create a multicast flow, or any combination thereof), formatting, destination addresses, and integration details for each separable action, the output of each separable action, and any accompanying communication to allow new service to be created from the combination of the separable component. For example a subscriber may request that a geolocation action be combined with a messaging service so that the geolocation service may perform a location on the device associated with the telephone number of the subscriber. When the subscriber enters a preselected geographic area, the geographic location may be forwarded to a messaging service, which may send a text message of the location to a database associated with the subscribers employer as well as one or more mobile device (e.g., to the subscriber's boss). This may allow a new geographic notification service to be created by the subscriber. New services may be created by any of the other parties in the same manner.

When a new service is created, the new services may be added to an available service catalog such as the provisioning catalog or the services catalog offered by the provider. Once the new service is published, other subscribers, providers, and/or third party application service providers can activate or use the new services. Thus, this system may allow new services to be created and used by other parties.

Figure 6:
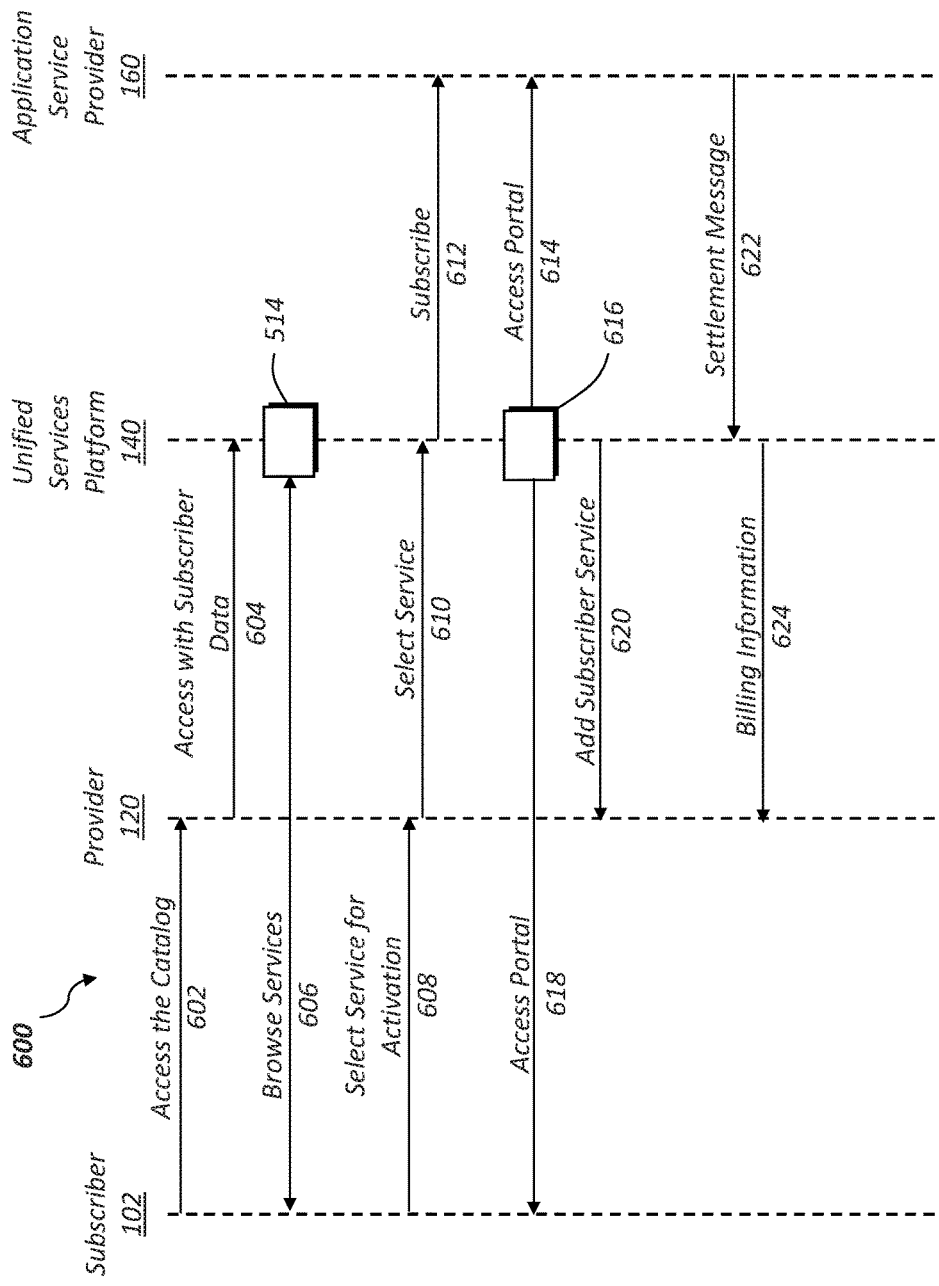
FIG. 6 illustrates another messaging diagram showing an embodiment of a process for selecting a service for addition to a subscriber account.

In order for the service to be available to a device 110, the subscriber may select the service to add to the subscriber's account. Referring to the messaging diagram illustrated in FIG. 6, this selection and addition process 600 may be referred to as activation of the service by the device 110. The device 110 may view the services offered through the provider 120 by sending an access request message to the provider 120 in step 602, which may send an access message to the unified services platform 140 along with the device 110 information in step 604. The device information may be used with the catalog 514 filters to present the services available to the particular device 110 to the subscriber. A browsing session may then be established in step 606 with a portal to allow the device 110 to browse and select a service for use with the device 110. In an embodiment, the browsing session of the catalog may comprise access a portal for the unified services platform 140 for which a catalog of available applications and services are presented.

The device 110 may add new applications and services to their accounts using their existing telephone number 105 through the portal, as well as manage existing applications and services to which device 110 has already subscribed. The cataloged applications and services may be from within the network of provider 120 and/or may be from third-party service providers 160, 170, 180. The portal may also be accessible via API in the case a user portal already exists with the provider 120 using the unified services platform 140. In this case, the provider 120 could integrate their portal into the API of the unified services platform 140 to source and managed applications and services.

When the device 110 decides to subscribe to a selected service, the device 110 may select the conferencing application from the catalog in the portal for platform 140 using a selection message in step 608, which may pass directly to the portal or pass through the provider 120 as a message in step 610. The selection message may occur within the session, but is shown as a separate message in FIG. 6 for clarity. In response to detecting this selection, the unified services platform 140 may collect the relevant data from device 110 which the service needs to function properly for the device 110. The relevant data may be provided by the provider, for example in the message provided in step 610. With the application service provider 160 configured in the network of the unified services platform 140, the unified services platform 140 may be aware of the location and relevant call routing information required to enable the network of provider 120 to properly send information and data to the application service provider 160. In response to receiving the selection of the service, the unified services platform 140 may update the subscriber data in a subscriber module, which may retain information for the subscriber regardless of the specific provider 120 providing services to the subscriber at the time the service is selected.

With the indication that the device 110 would like to add the service to the subscriber's account, the unified services platform 140 can send a subscription message to the application service provider 160 in step 612. This message may comprise a workflow event provided in a programmatic format (e.g., such as a JSON or XML message) containing the information that is sent to a web URL specific to the application service provider 160. The workflow event and messaging protocols can be established during the provisioning process between the unified services platform 140 and the application service provider 160. In this process, the application service provider 160 may intercept the device 110 and provider 120 data, including the telephone number 105, and the application service provider 160 may translate the information into its internal systems to make the telephone number 105 work with the selected service as well as accept the data needed to allow the service to operate through the provider 120.

A service portal 616, which may be the same as the portal providing the catalog 514, may be provided by the unified services platform 140 to provide a session between the application service provider 160 and the portal 616 in step 614 and a session between the device 110 and the service portal 616 in step 618. The portal may allow the device 110 to select the policies and options associated with the service. The same portal 616 may also be accessed by the device 110 at various times to enable and/or disable various functions and features (e.g., actions) associated with the service. Once the device 110 has selected the desired service and available options, a notification may be provided to the provider 120 to add the service to the device 110 account in step 620. The unified services platform 140 may send out the notification as a standardized data notification in a programmatic format (e.g., such as a JSON or XML message) containing the information to a web URL specific to the provider 120. The provider 120 may then intercept the information and translate the information into appropriate systems, databases, and/or other internally relevant systems required to allow the telephone number 105 of the device 110 to function with the selected service.

Once the application service provider 160 activates the device 110 to use its service, the unified services platform 140 receives a notification in step 622, and a billing event may be generated and sent in step 624 to a web URL configured by the provider 120 in which the provider 120 intercepts and translates the billing event containing all relevant data into its internal systems. In an embodiment, as long as the device 110 remains subscribed to the service, the application service provider 160 may bill the provider 120 and the provider 120 may bill the device 110 for the service. The unified service platform 140 may remain the database of record for all active and inactive applications and services subscribed to and/or purchased through the unified services platform 140 for all of the subscribers of the provider 120.

Any number of additional services or application can be selected by the device 110 in the same manner, allowing interworking between the provider 120 and the application service providers 160, 170, 180, all working together leveraging the telephone number 105 of device 110 as the single, universal identifier.

During the activation process, the unified services platform 140 and/or the provider 120 may check to ensure that a selected service or application satisfies any pre-requisites for the use of the service. For example, a selected service may require a subscriber to have an active account with the application service provider 160 and/or an account with a second application service provider. During the activation of the service, the unified services platform 140 may perform a lookup in the subscriber component to determine if the subscriber account is associated with an active account at the application service provider 160 and/or the second application service provider. If the pre-requisite is satisfied, then the activation process may proceed as described above. However, if the pre-requisite is not satisfied, the unified services platform 140 may initiate an activation process for the pre-requisite. For example, if an active account is not located, the unified services platform 140 may attempt to activate the account for the subscriber. The subscriber may be queried to determine if the activation of the pre-requisite service is approved. If the subscriber declines the pre-requisite service, a message may be send to the subscriber indicating that the activated service may not function. In some embodiments, the activation process may abort to prevent the selected service from being activated by the subscriber.

As an example of a device 110 activation of a selected service, a first application service provider 160 may host a third party conferencing application. In this embodiment, the application service provider 160 may operate in a standalone environment by reselling telephone numbers to customers directly through its own website. This conferencing application may be provisioned within the catalog of the unified services platform 140, and this may open up the ability for the provider 120 and its subscribers (device 110 and others) to bring their existing telephone numbers into the conferencing application, thus creating a unified experience for the customers of the provider 120.

When the device 110 decides to subscribe to this conferencing application, the device 110 may select the conferencing application from the catalog in the portal for the unified services platform 140. In response to detecting this selection, the unified services platform 140 may collect the relevant data from the device 110 which the conferencing application needs to function properly for the device 110. With first application service provider 160 configured in the network of the unified services platform 140, the unified services platform 140 may be aware of the location and relevant call routing information required to enable the network of provider 120 to properly send calls to the off-net conferencing application. The unified services platform 140 may send out the data notification to the provider 120. The provider 120 may then intercept the information and translate the information into appropriate systems, databases, and/or other internally relevant systems required to allow telephone number 105 of device 110 to function with the conferencing application. Likewise, the data collected by the unified services platform 140 from the device 110 for the conference application may be sent to a web URL configured for the provider 160 in the unified services platform 140. The application services provider 160 may intercept the device 110 and provider 120 data, including the telephone number 105, and the provider 160 may translate the information into its internal systems to make the telephone number 105 work with the conferencing application as well as accept calls from provider 120 on the behalf of device 110. Once the provider 160 activates the device 110 to use its conferencing application, the unified services platform 140 may receive a notification, and a billing event may be generated and sent to the provider 120, which the provider 120 intercepts and translates into its internal systems.

If the device 110 decides to unsubscribe from the conferencing application, then the device 110 may cancel the subscription via the same portal of the unified services platform 140 that was used to originally subscribe to the conferencing application. Similar to the way that the unified services platform 140 sent activation data to all of the relevant parties, the unified services platform 140 may send the deactivation information in the same standardized format to all of the relevant parties' configured web URLs. This includes deactivation to the web URL of the provider 120 configured for billing events.

Any number of additional services can be selected by the device 110. Various services may allow integration of activities on the device 110 with services such as social media posting, customer relationship management software, call and message translations (e.g., language translations, voice to text translations, text to voice translations, etc.), file sharing software, file management software, contact management software, voicemail, messaging applications, call recording software, contact matching software (e.g., caller ID, etc.), messaging storage software, call notification software, and any other software available for integration. Specific services and examples are provided in more detail herein.

Figure 7:
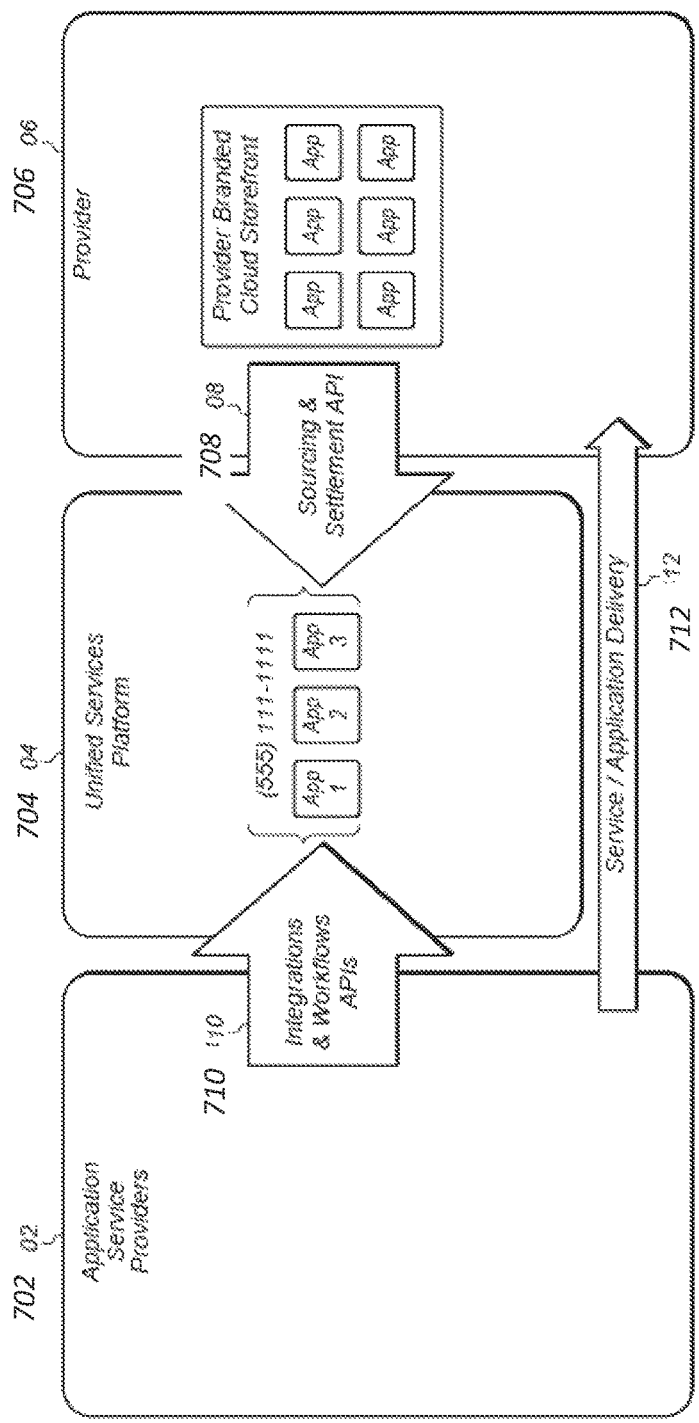
FIG. 7 schematically illustrates an embodiment of a system for activating one or more selected services.

A schematic view of a system for activating one or more selected services is illustrated in FIG. 7. As shown in FIG. 7, a block diagram of an embodiment of a unified services platform 704 is shown. The telephone number (555-111-1111) may be used as the central ID to associate services and applications that are used by the corresponding subscriber. Provider 706 may provide telephone service to the subscriber and present a storefront to the subscriber to allow the subscriber to select and add new services and applications to their existing service. The subscriber may select applications via the storefront hosted by provider 706, and then the selected applications may be activated via the unified services platform 704. As shown in unified services platform 704, the subscriber has already selected three applications (app 1, app 2, and app 3) which are associated with telephone number (555-111-1111).

When the subscriber selects a new application to add to their existing voice service, a request may be generated via sourcing and settlement API 708 to activate the new application and associate the new application with the subscriber's telephone number. The unified services platform 704 may then generate the necessary configuration data to activate the new application in accordance with the specific API 710 used by the application service provider 702 responsible for delivering the new application. In an embodiment, the unified service platform 704 may notify the corresponding application service provider 702 that the provider 706 is activating the new application in place of the subscriber. As a result, the new application may be assigned to the provider 706 and different rules may apply than if the subscriber were directly activating the new application by themselves. In an embodiment, this notification may be indicated by setting an extra configuration field bit during the activation process, and in response, the corresponding application service provider may allow the provider 706 to directly control and manage the account for the subscriber.

The unified services platform 704 may generate the appropriate workloads and manage the integration of the new application for the subscriber. The unified services platform 704 may also manage the relationships between all of the different application service providers by using the telephone number as the common identifier. After activation, the actual functionality of the new application may bypass the unified services platform 704 and instead be delivered across the actual physical connection to the subscriber (shown as arrow 712). In an embodiment, the unified services platform 704 may be provided as a SaaS. In some embodiments, the unified services platform 704 may be extended into private clouds rather than being a standalone platform.

Figure 8:
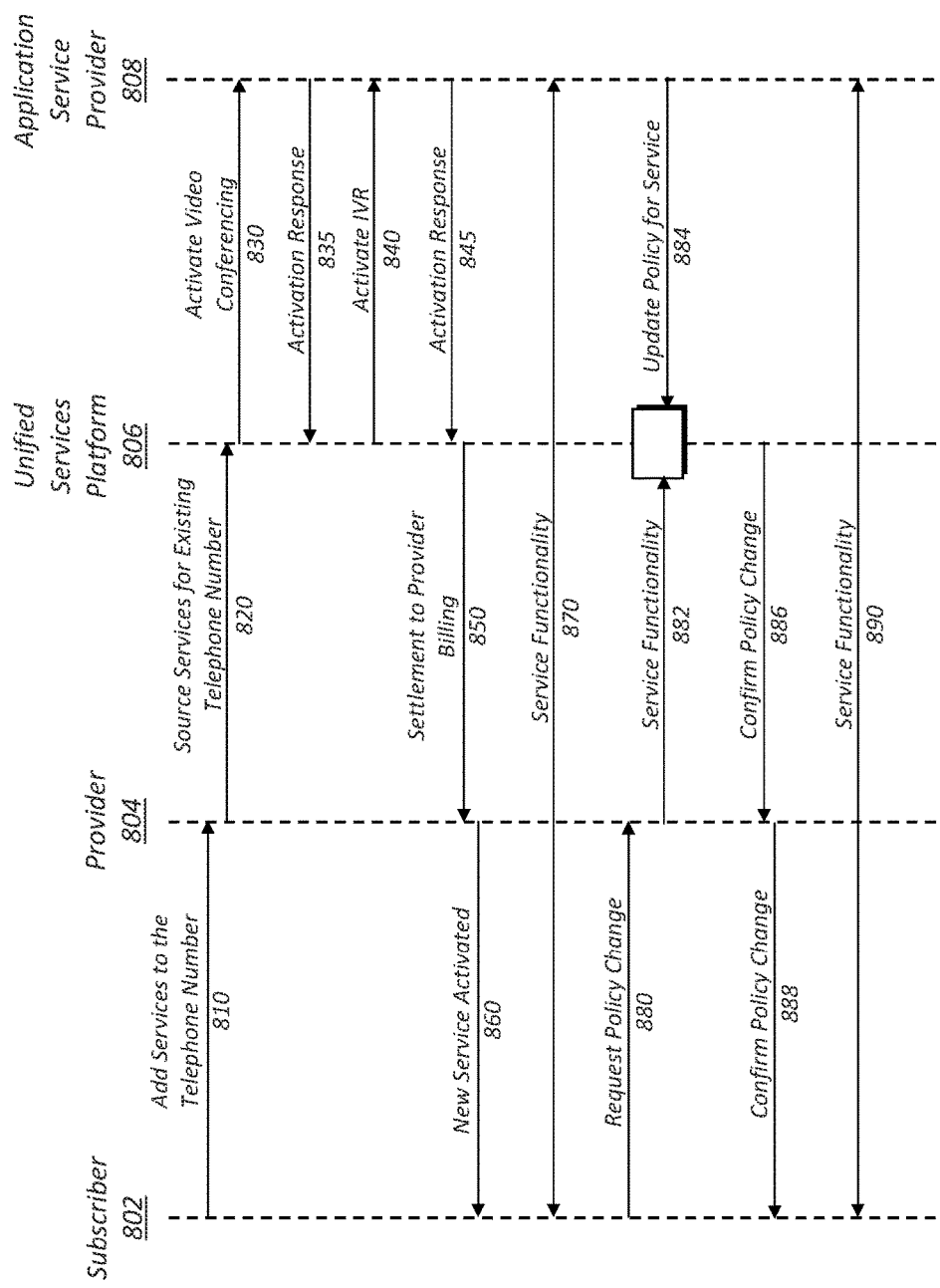
FIG. 8 illustrates a messaging diagram of another embodiment of a sequence for activating services for a subscriber.

Referring now to FIG. 8, a diagram of another embodiment of a sequence for activating services for a subscriber is shown. For the purposes of this discussion, it will be assumed that the subscriber 802 has requested new services to be associated with their subscriber telephone number. These requests may be sent to the provider 804 in step 810, and these requests may identify the specific services being requested. In this example, the services being added can include video conferencing and interactive voice response (IVR) services. The provider 804 may receive the requests in step 810, and in turn may generate and send a request in step 820 to the unified services platform 806 to source the desired services.

In response to receiving this request, the unified services platform 806 may generate the appropriate activation data to activate these requested services and associate these services with the existing telephone number of the subscriber 802. The unified services platform 806 may generate configuration data in accordance with the APIs of the application service providers 808 who are providing the requested services. Specifically, the unified services platform 806 may generate activation data in step 830 to the application service provider 808 of the video conferencing application. In an embodiment, the unified services platform 806 may translate the telephone number into a second identifier (ID) that can be used to identify the subscriber 802 in the video conferencing provider's system. For example, this second ID may be an email address, and this email address may be a real email address of the subscriber 802. Alternatively, the unified services platform 806 may generate a dummy email address to serve as this second ID.

The unified services platform 806 may also create a mapping of the telephone number to the second ID and send this mapping to the provider 804. The provider 804 may store this mapping and use the mapping when initiating sessions of the video conferencing service for the subscriber 802. The activation response corresponding to the activation of the video conferencing application may be returned from the application service provider 808 in step 835.

The unified services platform 806 may generate activation data in step 840 to the provider of the IVR application, and the activation response corresponding to the activation of the IVR application may be returned from the corresponding application service provider 808 in step 845. In an embodiment, the unified services platform 806 may translate the telephone number into a third ID that will be used to identify the subscriber 802 in the IVR application provider's system. The unified services platform 806 may also create a mapping of the telephone number to the third ID and send this mapping to the provider 804. The provider 804 may store this mapping and use the mapping when initiating sessions of the IVR application for the subscriber 802.

In step 850, the unified services platform 806 may generate settlement data including billing information and transfer this data to the provider 804. Then, in step 860, the provider 804 may activate the new services for the subscriber 802. The actual functionality of the new services may be provided directly from the host application providers 808 to the subscriber 802 in step 870.

Once the services are activated and functioning, a subscriber 802 may optionally modify the plan, policies, and/or rules associated with the service. For example, the format and availability of the video conferencing service can be modified by the subscriber 802. In order to modify the service, the subscriber may send a request to login to the service portal for the service in step 880. If the service portal is hosted at the provider 804, the subscriber 802 may interact with the portal to modify the service. In some embodiments, the service portal may be provided at the unified services platform 806. In this embodiment, the request to login to the service portal may be forwarded from the provider 804 to the unified services platform in step 882. The service portal may be initiated to allow the subscriber 802 to make any desired changes or modifications. Once the subscriber accepts the modification, the changes may be saved in the unified services platform 806, and the data may be forwarded to the application service provider 808 in step 884. Any modifications to the application service provider systems can be made based on the data provided by the unified services platform 806. A confirmation message comprising the data can be provided from the unified services platform 806 to the provider 804 in step 886. Any modifications to the provider systems can be made based on the data provided by the unified services platform 806. A confirmation message can then be provided to the subscriber in step 888 to verify that the changes to the service have been made. The service can be resumed using the modified plan, policies, and/or rules in step 870.

Figure 9:
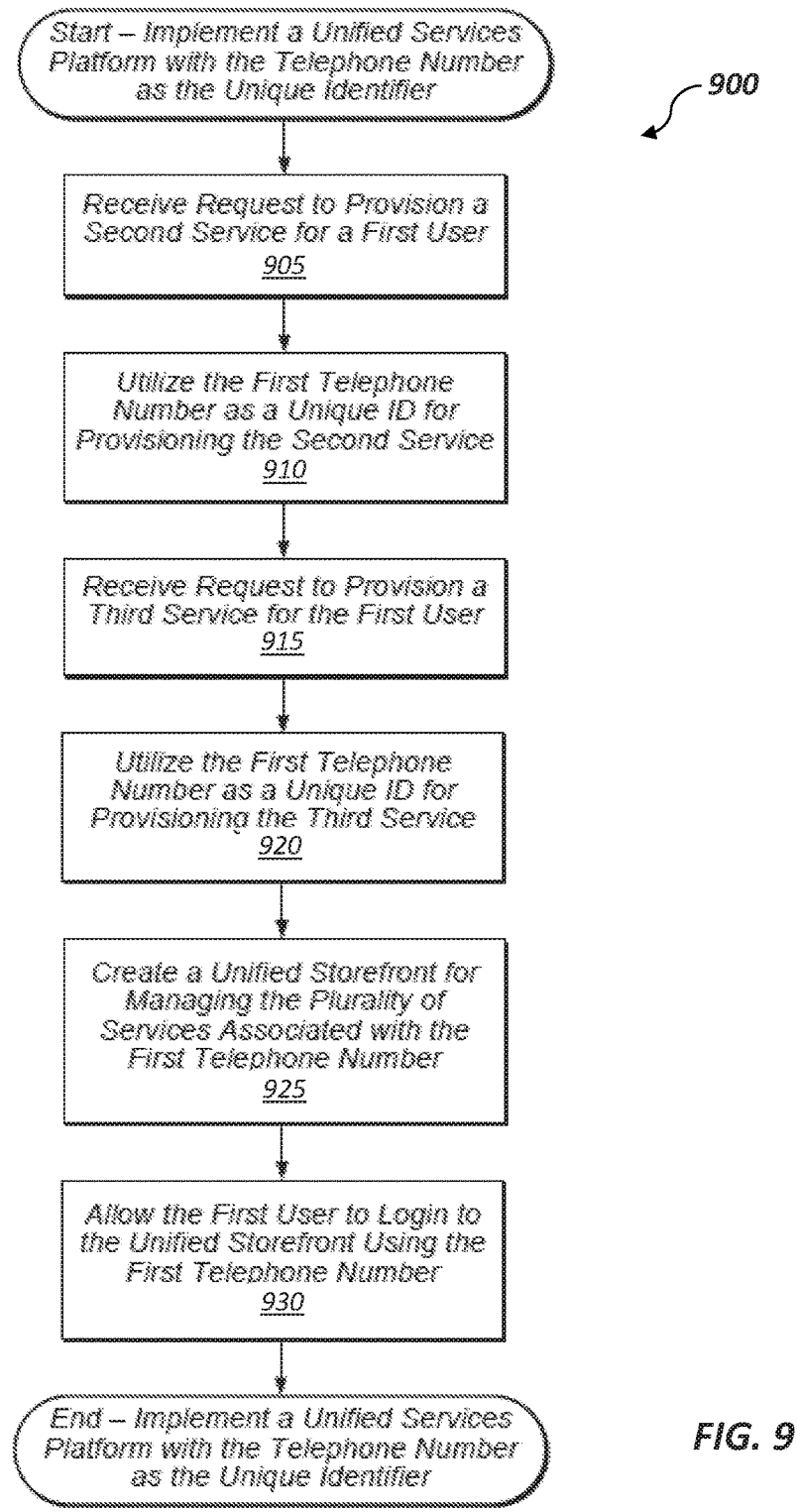
FIG. 9 illustrates an embodiment of a method for activating services through a unified services platform with the telephone number as the common identifier.

Turning now to FIG. 9, an embodiment of a method 900 for activating services through a unified services platform with the telephone number as the common identifier is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In an embodiment, a first user may be provided with a first service by a first provider. The first service may be telephone service, and the first user may have a first telephone number associated with the telephone service. In this embodiment, a request to provision a second service for the first user may be received by the first provider (block 905). In some embodiments, the first telephone number may also be associated with one or more other types of services provided by the first provider. In an embodiment, the first provider may be a telecommunications service provider. In other embodiments, the first provider may be another type of provider (e.g., mobile carrier, cable services provider, network provider). The second service requested by the first user may be any of various services or applications (including IP-related applications) and the second service may be provided by a second provider. The second provider may be part of a second ecosystem (e.g., iTunes™, Google Play™), and the second ecosystem may be different than a first ecosystem used by the first provider. In some embodiments, the second provider may use an API that is not recognized or accepted by the first provider.

In response to receiving the request, the first provider may use the first telephone number as a common ID for provisioning the second service (block 910). In an embodiment, a unified services platform may be used to provision the second service for the first user. The unified services platform may activate the second service for the first user and associate the second service with the first telephone number. In some embodiments, the first telephone number may be translated to a second ID that is used as a login ID or user name within the ecosystem of the second provider. In these embodiments, the unified services platform may store the first telephone number to second ID pairing and perform the necessary translation between the two IDs when provisioning the second service. In an embodiment, the unified services platform may be integrated within the first provider's computing resources, and the first provider may perform these functions itself.

Next, a request to provision a third service for the first user may be received by the first provider (block 915). The third service may be any of various services or applications which are provided by a third provider. The third provider may be part of a third ecosystem and the third ecosystem may be different than the first and second ecosystems. In some embodiments, the third provider may use an API that is not recognized or accepted by the first provider and/or the second provider.

In response to receiving the request, the first provider may use the first telephone number as a common ID for provisioning the third service (block 920). In an embodiment, the unified services platform may be used to provision the third service for the first user. The unified services platform may activate the third service for the first user and associate the third service with the first telephone number. In some embodiments, the first telephone number may be translated to a third ID that is used as a login ID or user name within the ecosystem of the third provider. In these embodiments, the unified services platform may store the first telephone number to third ID pairing and translate between the two IDs when provisioning the third service.

Next, the first provider may create a unified storefront (e.g., as a service portal) for managing the plurality of services which are associated with the first telephone number (block 925). The unified storefront may allow the first user to monitor their account and add new services and applications to the first telephone number. The first provider may allow the first user to login to the unified storefront using the first telephone number (block 930). By enabling this login access using the first telephone number, the first provider is able to generate a simple and easy to use storefront for the first user to manage existing services and add new services.

It is noted that the method 900 may be implemented for any number of users requesting any number of services or applications from any number of providers. It is also noted that the first provider may also provide any number of native services and applications to the first user, and these native services and applications may also be associated with the first telephone number.

Figure 10:
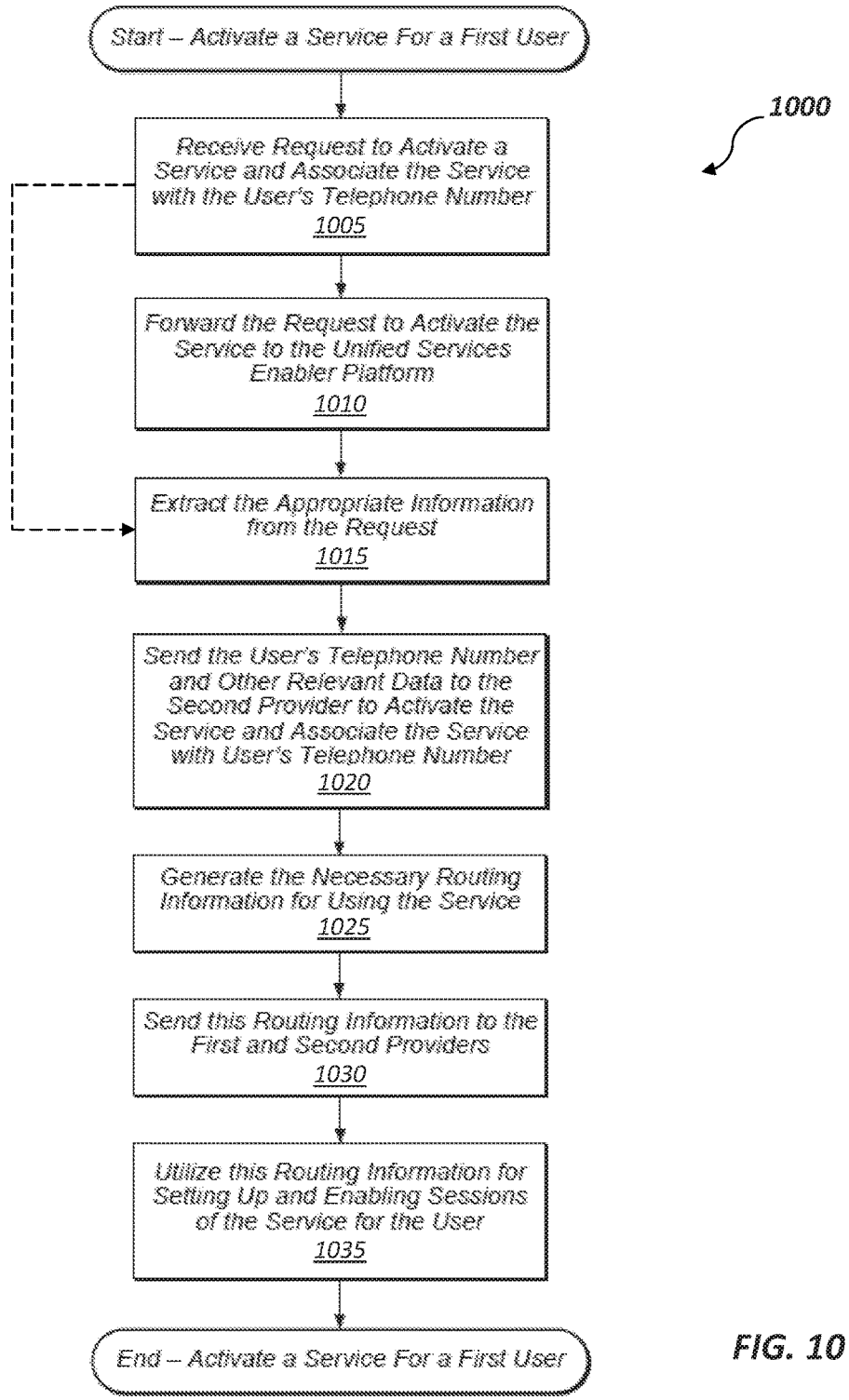
FIG. 10 illustrates an embodiment of another method for activating a service for a first subscriber.

Turning now to FIG. 10, an embodiment of another method 1000 for activating a service for a first subscriber is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A request to activate a service for a subscriber and associate the service with the subscriber's telephone number may be received by a first provider (block 1005). The service may be provided by a second provider, and the second provider may be different than the first provider. In an embodiment, the subscriber may generate the request by logging into a unified storefront. The unified storefront may bring together multiple services and applications from multiple third-party providers, and the unified storefront may allow the subscriber to select these services and applications for activation. In an embodiment, the unified storefront may be maintained by the first provider. In another embodiment, the unified storefront may be independent and maintained separately from the first provider. In an embodiment, the unified storefront may be provided as a portal that is accessible by the subscriber.

Next, the first provider may forward the request to activate the service to the unified services platform (block 1010). However, in some embodiments, the unified services platform may be integrated within the computing resources of the first provider. In these embodiments, method 1000 may skip block 1010 (as indicated in FIG. 10 by the dashed arrow). Next, the unified service platform may extract the appropriate information from the request (block 1015). The extracted information may include the subscriber's telephone number and other information needed to activate the service. Next, using the extracted information, the unified service platform may send the subscriber's telephone number and other relevant data to the second provider to activate the service and associate the service with the subscriber's telephone number (block 1020). The unified service platform may provide the subscriber's telephone number to the second provider as an ID of the subscriber. In an embodiment, traditional customers who are not connected to the unified service platform may use a first API for interfacing to the second provider when activating the service. However, the unified service platform may use a second API for activating the service from the second provider, wherein the second API is different than the first API. When a traditional customer uses the first API to activate the service, the second provider may generate a new telephone number and use this new telephone number to associate with this traditional customer. The traditional customer will then associate the service with this new telephone number, regardless of whether the traditional customer has an existing telephone number or not.

For the unified service platform using the second API, the service may be associated with the subscriber's existing telephone number. This allows the subscriber to avoid having to associate a newly created telephone number with the service. This scheme results in simplifying and enhancing the subscriber's experience and interaction with the services to which they subscribe. For example, if a subscriber activated 10 different services from 10 different providers, the existing prior art techniques would require the subscriber to use 10 different telephone numbers to activate these 10 services. Using the techniques disclosed herein, the subscriber is able to use a single telephone number to associate with these 10 different services. Additionally, the first provider may receive a plurality of bills associated with the single telephone number from a plurality of different providers, and the first provider may combine the billing information from the plurality of bills and provide a single bill to the subscriber.

After block 1020, the unified service platform may generate the necessary routing information for using the service (block 1025). Next, the unified service platform may send this routing information to the first and second providers (block 1030). The first and second providers may use this routing information for setting up and enabling sessions of the service for the subscriber (block 1035). In an embodiment, the sessions may bypass the unified service platform and work independently of the unified service platform. In another embodiment, the unified service platform may receive context data while a session is taking place, and the unified service platform may use this context data to provide enhanced services to the subscriber.

It is noted that the subscriber may activate many different services and applications from multiple different providers, and these different services may be activated and associated with the subscriber's existing telephone number using the steps of method 1000. It is also noted that in some embodiments, the subscriber's existing telephone number may not be associated with the PSTN, but rather may be independent of the PSTN.

Figure 11:
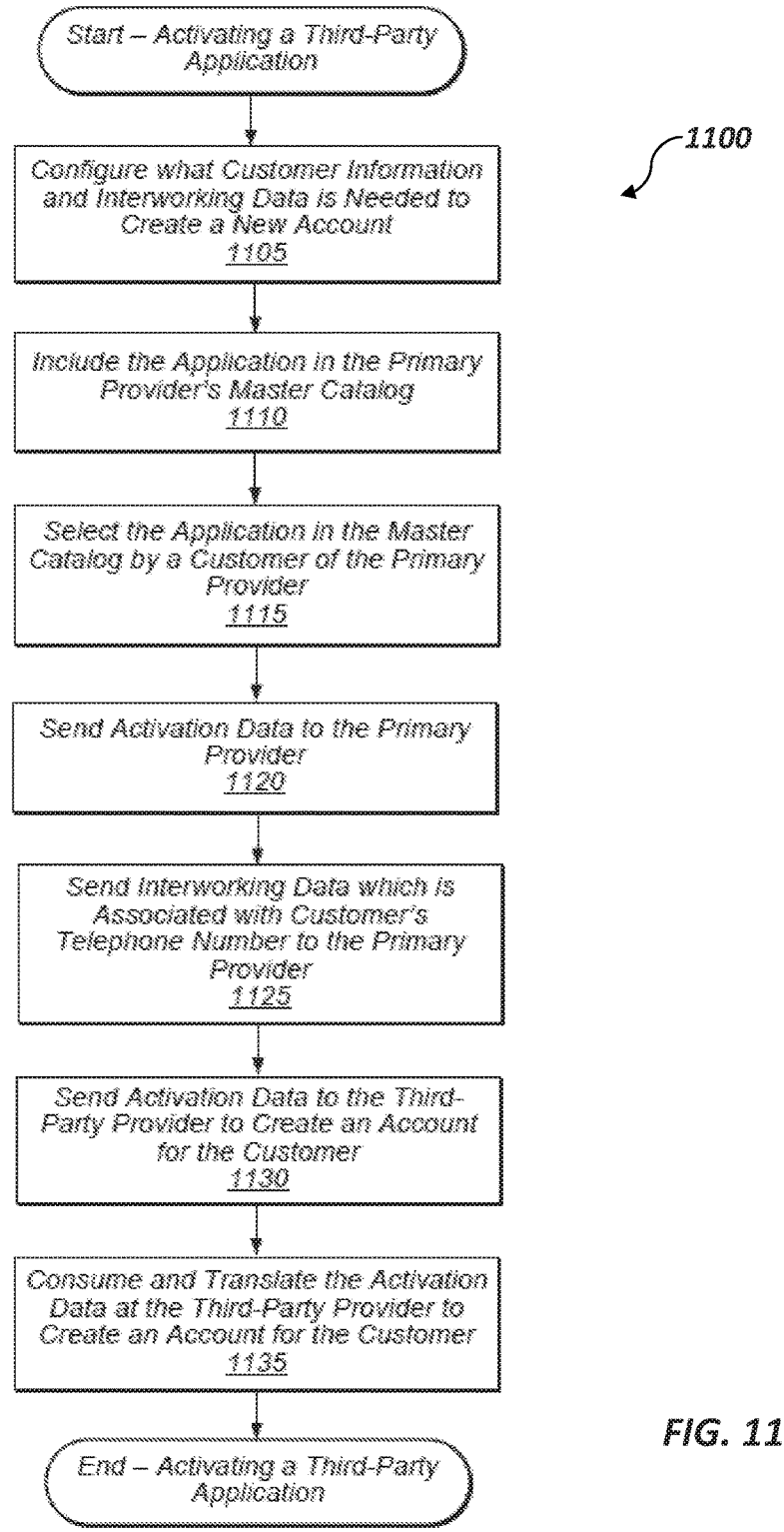
FIG. 11 illustrates an embodiment of still another method for activating a third-party application.

Referring now to FIG. 11, an embodiment of still another method 1100 for activating a third-party application is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A third-party application provider may provide a given application or service to end users. In the example described below, the given application is a short message service (SMS) text messaging application. It is to be understood that while this example is used for this discussion, in other embodiments, other types of applications may be provided by the third-party provider.

In order to offer the SMS text messaging application to customers of a given primary provider, the third-party application provider may configure what customer information and interworking data is needed to create a new account when a new customer subscribes to their SMS application with a telephone number on the given primary provider's network (block 1105). Next, the given primary provider may include this SMS application in their master catalog to offer to the given primary provider's customers (block 1110). As part of including the SMS application in their master catalog, interworking data is provided to the primary provider to enable them to make the SMS application work within their network in order to get SMS messages to the SMS application. Next, a customer of the primary provider may select the SMS application in the master catalog, indicating they wish to purchase this SMS application and associate the SMS application with their existing telephone number (block 1115). It is noted that in some embodiments, the customer's telephone number may be a mobile subscriber integrated services digital network number (MSISDN). The customer's existing telephone number may also be referred to as their "subscriber ID". In an embodiment, the term "subscriber ID" may be defined as the telephone number associated with a device used by the customer. In another embodiment, the term "subscriber ID" may be defined as a single telephone number that can be associated with multiple identifiers. In other embodiments, the term "subscriber ID" may be defined as the ID used to identify a given customer in a primary provider's network. In a further embodiment, a subscriber ID may be used by a primary provider for identifying a given user, for routing information, for accounting information, and for various other purposes within the primary provider's network and other infrastructure.

After block 1115, activation data may be sent to the primary provider informing the primary provider that this SMS application will now be accepting SMS messages on behalf of the customer (block 1120). Also, interworking data which is associated with the customer's telephone number may be sent to the primary provider (block 1125). The interworking data lets the primary provider know how to route SMS messages to the third party provider when SMS messages are sent to the customer's telephone number.

Additionally, activation data may be sent to the third party provider so that an account is created for the customer by the third party provider to use the SMS messaging application (block 1130). The activation data may include the customer's telephone number, a user ID of the customer, and the necessary interworking data which is associated with the customer's telephone number. In an embodiment, the term "user ID" may be defined as an identifier which is used for authenticating a customer for the purposes of using an account or service. In another embodiment, the term "user ID" may be defined as identifier of a customer that is associated with authentication, account creation, and verification. In some embodiments, the user ID may be an email address of the customer. In other embodiments, the user ID may be any of various other types of identifiers. It is noted that blocks 1120, 1125, and 1130 may be performed simultaneously or in any order depending on the embodiment.

Next, the third party provider may consume and translate the activation data into their own proprietary API to create an account and properly accept SMS messages from the primary provider for the user's telephone number (block 1135). After block 1135, the method 1100 may end. It is noted that the method 1100 may be performed multiple times in order to associate multiple third-party services with the telephone number of the customer. As such, the telephone number is being abstracted from the primary provider's network and becomes the unifying ID across multiple eco-systems.

The techniques for utilizing a third-party service after activating an account with the third-party provider may vary depending on the embodiment. For example, in an embodiment, after activating a SMS messaging application, when a SMS message is sent to the customer's telephone number, the SMS message may be automatically routed to the third-party provider and then to the customer's device which is associated with that telephone number. In another embodiment, a third-party conferencing application may be activated using the method 1100. After activation, the customer may use their telephone number to setup a third-party conferencing application by selecting an option for conferencing, and then entering a personal identification number (PIN) for the bridge to use the third-party conferencing application for hosting a conference. The customer may also login to a website to view details of a live conference, and the customer may use their user ID to login to this website. Therefore, in this embodiment, the telephone number of the customer may be used to access a first portion of the functionality of the conferencing application, while the user ID of the customer may be used to access a second portion of the functionality of the conferencing application. In other embodiments, other techniques may be implemented for utilizing third-party applications which are associated with the customer's telephone number.

In some embodiments, a service may be activated for an account by a business or enterprise. For example, a company may establish a service for an employee to use in the course of conducting business for the company. In this case, the enterprise administrator may be responsible for establishing a service for one or more subscribers. The service may also be activated by a group account representative. While the group account may be described in the context of an enterprise, the group may also apply to a family group (e.g., a family account), a social group, or any other group of subscribers however related. The group administrator may be a representative of the group for activation and/or billing purposes. In some embodiments, the group administrator may be a member of the group, and in other embodiments, the group administrator may not be a member of the group.

Figure 12:
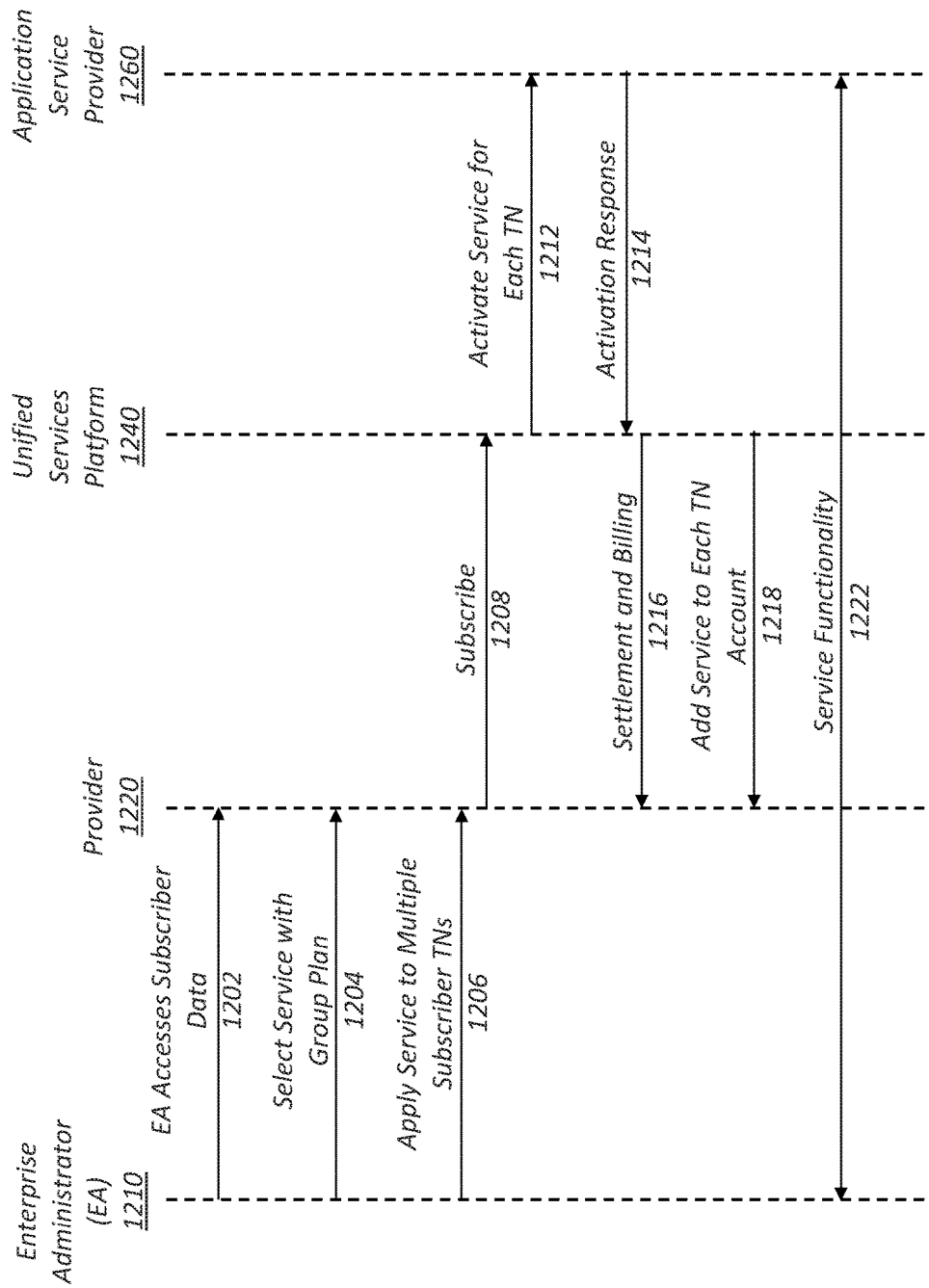
FIG. 12 illustrates an embodiment of an activation process in which an enterprise administrator is responsible for activating a service for one or more subscribers.

FIG. 12 illustrates an embodiment of an activation process in which an enterprise administrator is responsible for activating a service for one or more subscribers. For the purposes of this discussion, it will be assumed that the enterprise has selected a service to be added to the one or more subscriber accounts. The enterprise administrator 1210 may request the new service to be associated with the subscriber telephone numbers. In step 1202, the enterprise administrator 1210 may access the subscriber data for the subscribers to which the service is being added. The subscriber data may include an identification sent to the provider 1220, and the provider 1220 may or may not return additional account information to the enterprise administrator 1210. In an embodiment, the subscriber data may include the telephone numbers of the subscribers for which the service will be provided.

A request for the service or services is sent from the enterprise administrator 1210 to the provider 1220 in step 1204. The request sent to the provider 1220 may identify the specific services being requested. In addition, a group plan identifier can be included with the request to identify the services as being associated with a group request. Each subscriber identifier such as the telephone number can be associated with the group plan identifier in step 1206. The provider 1220 may receive the request and in turn may generate and send a request in step 1208 to the unified services platform 1240 to source the desired services.

In response to receiving this request, the unified services platform 1240 may generate the appropriate activation data to activate the requested service and associate the service with the existing telephone numbers of the subscribers in the group plan. The unified services platform 1240 may generate configuration data in accordance with the API of the application service provider 1260 who is providing the requested service. Specifically, the unified services platform 1240 may generate activation data in step 1212 to the application service provider 1260. In an embodiment, the unified services platform 1240 may translate the telephone number into a second identifier (ID) that can be used to identify the subscriber and/or the group plan.

The unified services platform 1240 may also create a mapping of the group plan identification and/or the telephone numbers to the second ID and send this mapping to the provider 1220. The provider 1220 may store this mapping and use the mapping when initiating sessions of the service for the subscribers in the group plan. The activation response corresponding to the activation of the service may be returned from the application service provider 1260 in step 1214.

In step 1216, the unified services platform 1240 may generate settlement data including billing information and transfer this data to the provider 1220. The billing information may include the group plan identification. The group plan identification may be used establish billing for the service through the enterprise rather than through the individual subscriber accounts.

The unified services platform 1240 may then generate the necessary configuration data to activate the new service for each subscriber in the group plan. For example, the service can be activated for the first subscriber in step 1218, a second subscriber in step 1220, and a third subscriber in step 1222. The service may then perform in step 1226. In an embodiment, the unified service platform 1240 may notify the corresponding application service provider 1260 that the provider 1220 is activating the new service in place of the subscribers in the group plan. As a result, the new service may be assigned to the enterprise and different rules may apply than if the subscribers were directly activating the new application by themselves. In an embodiment, the corresponding application service provider 1260 may allow the enterprise (e.g., through an enterprise administrator) to directly control and manage the account for the subscriber. For example, the enterprise administrator may have access to a service portal for making changes to the policy, plan, and/or rules associated with the service provided to the subscribers in the group plan.

Figure 13:
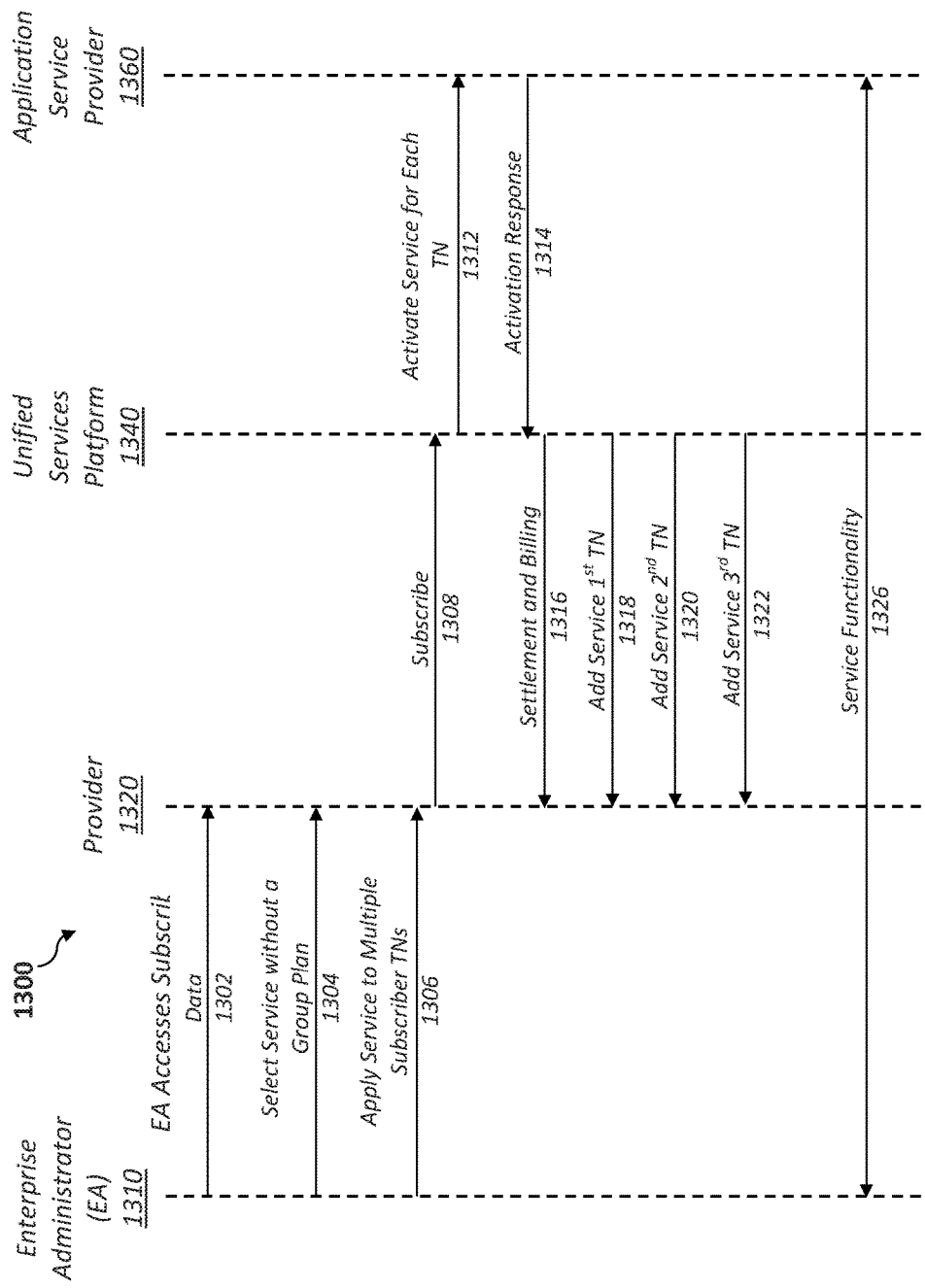
FIG. 13 illustrates an embodiment of another enterprise activation process in which a service can be activated for one or more subscribers.

FIG. 13 illustrates an embodiment of another enterprise activation process 1300 in which a service can be activated for one or more subscribers. This process 1300 illustrated in FIG. 13 is similar to the process 1200 described with respect to FIG. 12. The processes are different in that a group plan is not identified during the request to the provider 1220 and the subscribers can access the service portal. Billing differences can also occur due to the differences in the level of control afforded the subscribers. In step 1302, the enterprise administrator 1310 may access the subscriber data for the subscribers to which the service is being added. A request for the service or services is sent from the enterprise administrator 1310 to the provider 1320 in step 1304. The request sent to the provider 1320 may identify the specific services being requested. Rather than identify a group plan identifier, a request may identify each subscriber telephone number to which the service is to be provided in step 1306. The provider 1320 may receive the request and in turn may generate and send a request in step 1308 to the unified services platform 1340 to source the desired services.

In response to receiving this request, the unified services platform 1340 may generate the appropriate activation data to activate the requested service and associate the service with the existing telephone numbers of the subscribers identified in the request. The unified services platform 1340 may generate configuration data in accordance with the API of the application service provider 1360 who is providing the requested service. Configuration data can be generated for each subscriber identified by the Enterprise Administrator 1310. Specifically, the unified services platform 1340 may generate activation data in step 1312 to the application service provider 1360. The activation response corresponding to the activation of the service may be returned from the application service provider 1360 in step 1314.

In step 1316, the unified services platform 1340 may generate settlement data including billing information and transfer this data to the provider 1320. The billing information may include the telephone number for each subscriber being provided with the service.

The unified services platform 1340 may then generate the necessary configuration data to activate the new service for the first subscriber identified by the enterprise administrator 1310 in step 1318, for a second subscriber identified by the enterprise administrator in step 1320, for a third subscriber identified by the enterprise administrator in step 1322, and so forth for each subscriber identified by the enterprise administrator 1310.

In an embodiment, the corresponding application service provider 1360 may allow the subscriber to manage their own account alone or in addition to the enterprise administrator. For example, each subscriber and/or the enterprise administrator 1310 may have access to a service portal for making changes to the policy, plan, and/or rules associated with the service provided to the subscribers in the group plan.

The enterprise may handle the billing directly for the service as described above, or the subscriber may be responsible for their own billing of the service as described with respect to the subscriber activation. In some embodiments, the billing may be split between the enterprise and the subscriber. For example, the enterprise may be willing to pay for the service during normal work hours while requiring a subscriber to pay for the service when used for personal reasons. In this embodiment, the settlement information sent in step 1316 may contain the rules and policies outlining the conditions for which the billing should be sent to the enterprise or the subscriber.

The rules may include various time based restrictions such as time of day, day of the week, month of year, holiday schedules, and the like. The rules may also be based on location such as when a subscriber is at a work site. The rules may be based on specific connections such as when the subscriber is using a voice call triggered service that is connected to a client or other professional connection. Any suitable rules can be implemented to allow the unified services platform 1340 to determine when the service should be billed to the enterprise or the subscriber.

The use of the policies and rules may also determine when a service is available for use. This may allow a group or subscriber to control access to the service, and therefore usage and charges associated with the service. In the same way that the billing may be determined based on usage condition rules such as various time based restrictions location restrictions, connectivity restrictions, and the like, the ability to invoke the services may be based on the application of the rules. For example, an employee may only be able to invoke a marketing service during work hours and/or when located at a work site. As another example, an employee may be provided one group based service such as a marketing software service during the day and another version of the same service at a different time or location. For example, an employee may have access and be able to invoke a premium version of a service during the work day while being limited to a lesser version when working from home at night. Thus, the usage conditions may be used to determine billing and billing routing, usage of one or more services, a version of one or more services, and/or access to one or more actions within a service.

The use of the unified services platform may allow any billing differences to be easily addressed. When the enterprise and the subscriber are associated with the same provider, the billing routing may be sent to the appropriate party. In some embodiments, the enterprise and the subscriber may be associated with different primary providers. In this instance, splitting the bill may present difficulties under the traditional billing models. However, the billing routing may be provisioned and settled at the time the service is provisioned into the subscriber account and associated with the phone number. When an enterprise is associated with a first provider and the subscriber is associated with the second provider, the billing routing information is created at the time the service is activated within the unified services platform. When the policies and rules are applied to determine if the enterprise or subscriber is to be billed for a particular service usage or instance, the appropriate billing routing is accessed and used to forward the billing information to the appropriate provider. As a result, the use of the unified services platform may easily address the ability to split payment of a service between multiple parties such as an enterprise and a subscriber.

Figure 14:
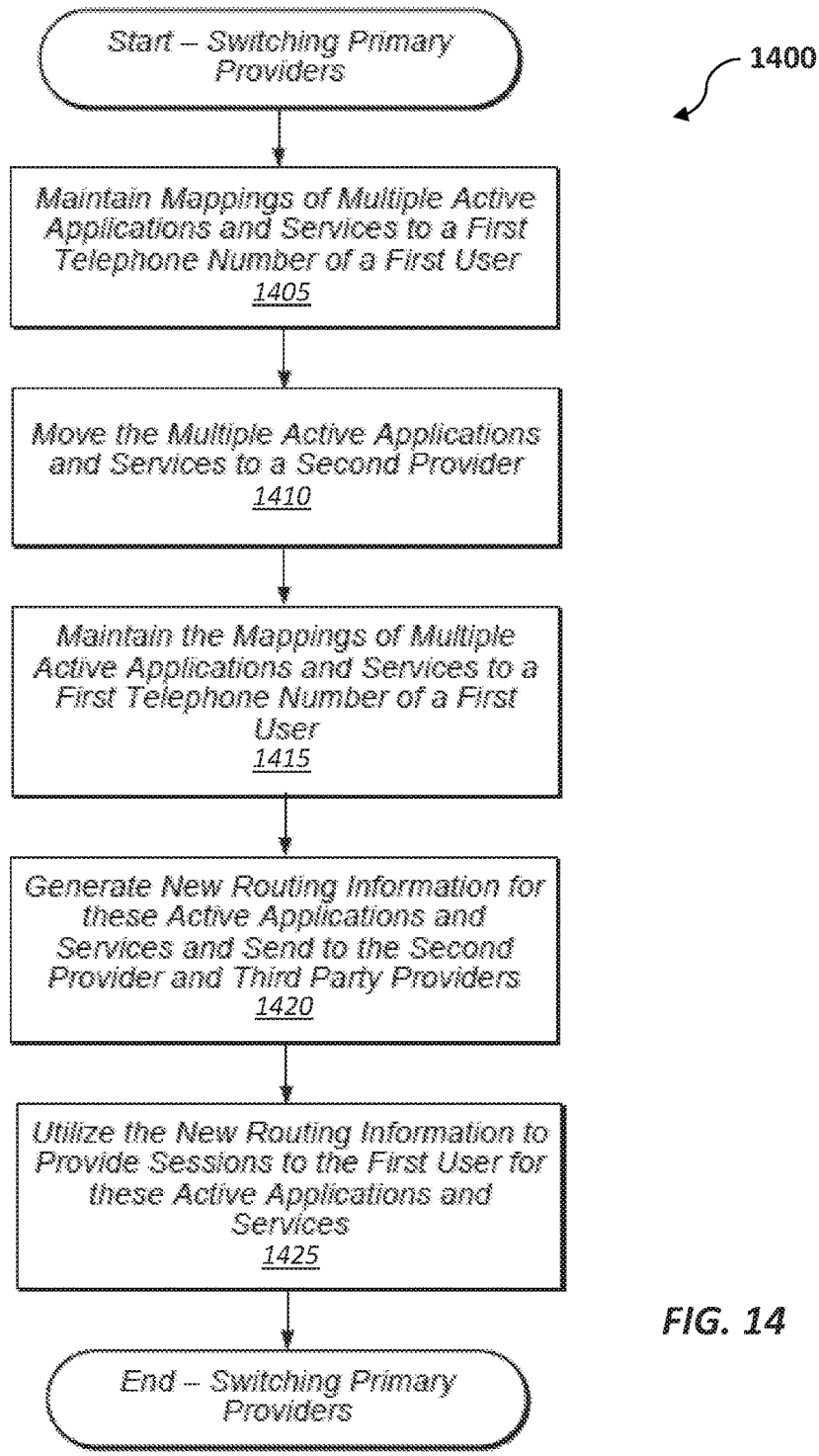
FIG. 14 illustrates an embodiment of a method for allowing a subscriber to switch primary providers.

Referring now to FIG. 14, an embodiment of a method 1400 allowing a subscriber to switch primary providers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A unified services platform may maintain mappings of multiple active applications and services to a first telephone number of a first user (block 1405). The first user may use a first provider to provide connectivity to the network, public cloud, and/or PSTN. The multiple active applications and services associated with the first telephone number may include video conferencing, text messaging, voice mail, voice attendant, and/or various other services. These multiple active applications and services may be provided to the first user by multiple third-party providers.

At a later point in time, the first user may move these multiple active applications and services to a second provider (block 1410). In other words, the first user may cancel their contract with the first provider and start a new contract with the second provider. In response to detecting the first user moving to the second provider, the unified service platform may maintain the mappings of the multiple active applications and services to the first telephone number (block 1415). This is in contrast to traditional techniques for handling a user switching primary providers, in which all services and applications associated with the user's telephone number are de-activated.

While maintaining the mapping of the multiple active applications and services to the first telephone number, the unified service platform may generate new routing information for these active applications and services and then send this new routing information to the second provider and to the third party providers of these active applications and services (block 1420). The second provider and third party providers may then use the new routing information to provide sessions to the first user for these active applications and services (block 1425). By using the above steps of method 1400, the unified service platform is able to seamlessly transition the first user to the second provider while maintaining mappings for their applications and services, thus allowing the first user to continue to use these applications and services and continue to associate them with the first telephone number.

As noted above, once the services are provisioned into the unified services platform and activated by a subscriber, the services provided to the subscriber may be device independent so that the services can be accessed on multiple devices of the subscriber. The services may also be network based so that a loss of connectivity may not result in an interruption of the services. As described herein, the services can be triggered by a subscriber request and/or a triggering event. Further, the ability to base the services on triggering events as well as using defined actions may allow one or more services to be invoked in a number of ways.

Figure 15:
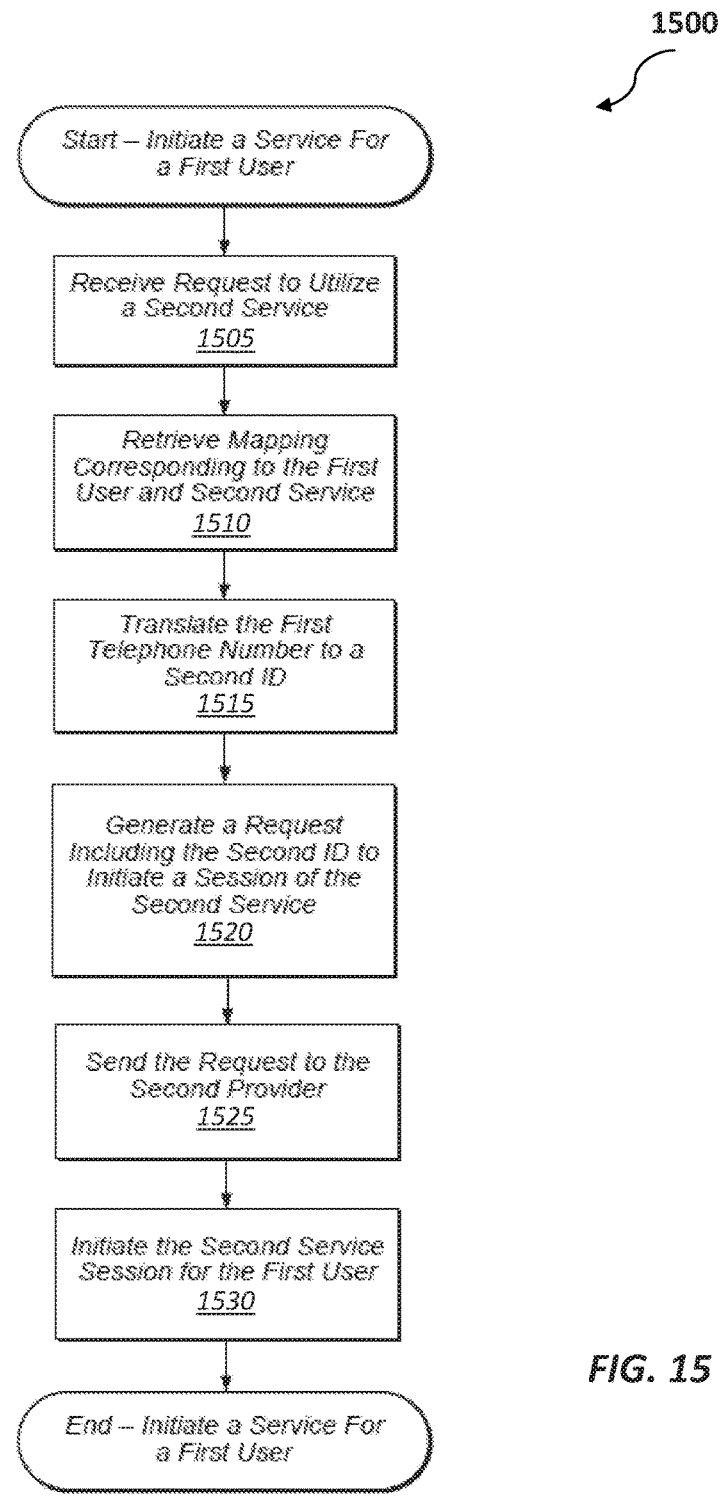
FIG. 15 illustrates an embodiment of a method for initiating a service for a first user.

In an embodiment, a service can be invoked based on a subscriber request. Referring now to FIG. 15, an embodiment of a method 1500 for initiating a service for a first user is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In an embodiment, a first user may be provided with a first service by a first provider. The first service may be telephone service, the first user may have a first telephone number associated with the telephone service, and the first provider may be a telephone service provider. In this embodiment, a request by the first user to use a second service may be received by the telephone service provider (block 1505). It may be assumed for the purposes of this discussion that the second service has already been activated by the telephone service provider for use by the first user. The second service may be provided by a second provider, and the second provider may be different than the telephone service provider. The second service may be any type of service or application described herein, depending on the embodiment.

In response to receiving the request from the first user to use the second service, the telephone service provider may retrieve a mapping corresponding to the first user and second service (block 1510). The mapping may provide a translation from the first telephone number to a second ID, and the second ID may be used by the second provider to identify the first user. Next, the telephone service provider may translate the first telephone number to the second ID using the retrieved mapping (block 1515). Then, the telephone service provider may generate a request to initiate a session of the second service, and the request may include the second ID in order to identify the first user (block 1520). Next, the telephone service provider may send the request to the second provider (block 1525). In response to receiving the request, the second provider may initiate the session of the second service for the first user (block 1530). After block 1530, the method 1500 may end. It is noted that the method 1500 may be implemented in parallel for any number of users requesting any number of services or applications.

Figure 16:
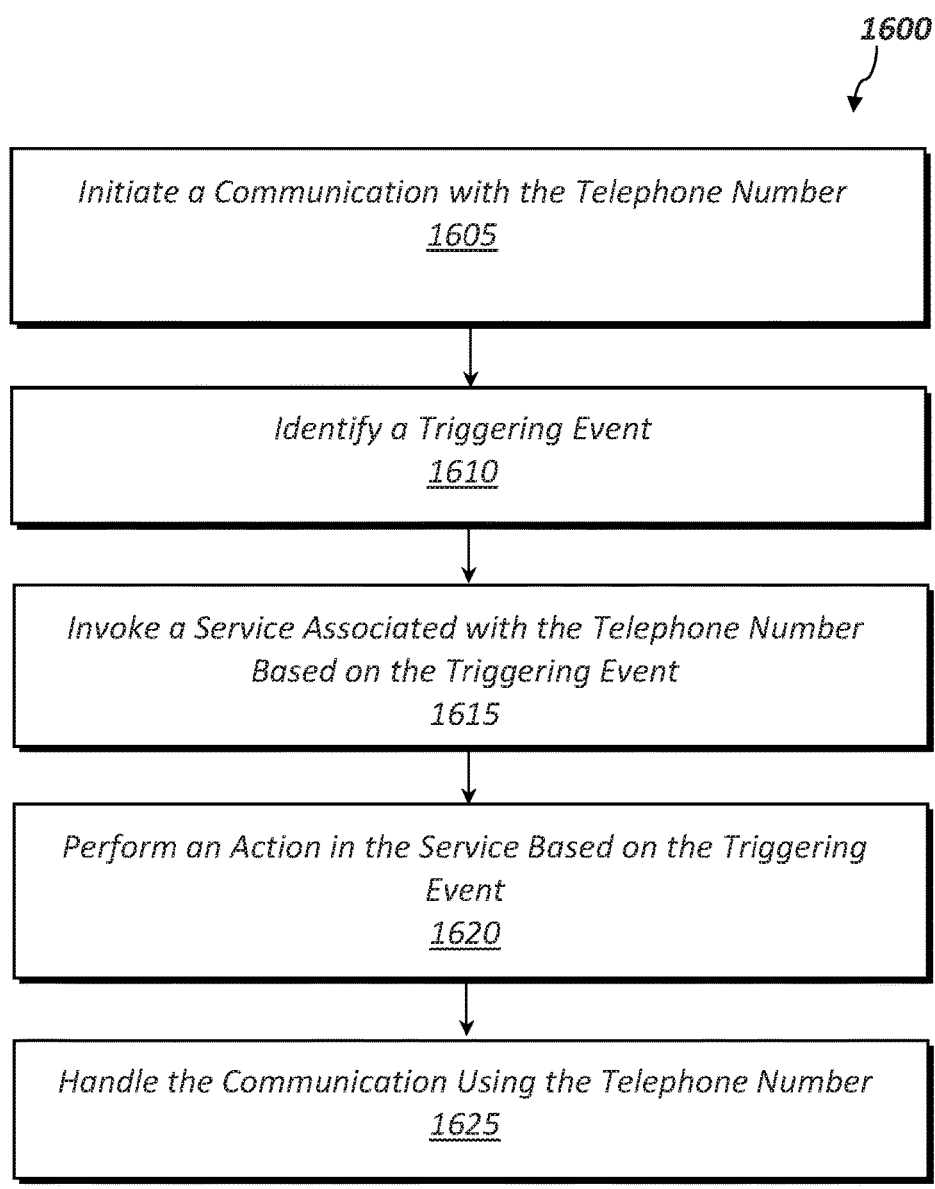
FIG. 16 illustrates another embodiment of a method for initiating a service for subscriber based on a triggering event.

In an embodiment, a service can be invoked based on a trigger associated with the telephone number of a client. Referring now to FIG. 16, an embodiment of a method 1600 for initiating a service for subscriber based on a triggering event is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In an embodiment, a subscriber may be provided with a first service by a first provider. The first service may be a telephone service and the subscriber may have a first telephone number associated with the telephone service. The first provider may be a telephone service provider. In this embodiment, communication or other incoming action may be associated with the telephone number of the subscriber (block 1605). For example, a message may be sent or received by a subscriber device, a call me be placed or received, a call may be ended, and/or a session may be initiated on the subscriber's device. Any action associated with the telephone number of the subscriber can be established as a trigger for an action. The unified services platform may be configured to receive a notification from a provider when this type of action occurs. The notification may include the relevant telephone number as well as a description of the type of action. Routing information may also be sent or requested for handling the communication or other incoming action.

When the action occurs, the action may result in activating a trigger (block 1610). The trigger may be associated with one or more services provided by application service providers through the unified service platform. It may be assumed for the purposes of this method that services have already been activated by the telephone service provider for use by the subscriber. Further, for purposes of this method, a single service may be described for clarity. The service associated with the trigger may be provided by an application service provider that is different than the telephone service provider. The second service may comprise any type of service or application described herein.

When the trigger is activated, the unified services platform may invoke the service associated with the trigger (block 1615). In an embodiment, the service can be started and the unified services platform can route the information applicable to the service to the associated application service provide to allow the service to perform its action(s). In some embodiments, the service can be invoked based on a message from the unified services platform, and the subsequent data, routing, and information may be exchanged directly between the application service provider and the first provider to perform the service. For example, the invocation of the service may result in a session of the service being established. The service session can be established between the first provider and the application service provider directly and/or through the unified services platform.

An action associated with the service may then be performed (block 1620). The action may be defined by the application service provider to occur in response to the trigger. For example, the service may perform an action based on the trigger and/or the communication using the telephone number. The action may occur before, after, during, or in parallel with the communication. For example, the action may be performed prior to allowing the communication to occur, and the service may provide data to the subscriber as part of the communication. In an embodiment, the communication may occur using the telephone number (block 1625). In some embodiments, a billing event message containing chargeable services data may be created and sent from the application service provider to the unified services platform and/or the provider to allow for billing of the services to occur. After block 1625, the method 1600 may end. It is noted that the method 1600 may be implemented in parallel for any number of services being invoked in response to one or more triggering events. This method may allow a service to be used automatically based on a triggering event previously established by the subscriber.

As an example of the method 1600, the subscriber may have activated customer relationship management (CRM) software for use with the telephone number. As part of the activation process, the subscriber may request that upon receiving a call, the calling number is used to lookup the name of the calling party and present the contact information for the calling party and an order history stored in the CRM software. In this embodiment, the triggering event may be defined as the receipt of a voice all on the subscriber device associated with the telephone number.

When a voice call is received on the telephone number of the subscriber, the incoming voice call may activate the trigger for the CRM software service. A message may be sent from the provider to the unified services platform indicating that the trigger event occurred. In some embodiments, a policy and rules engine may be integrated into the provider, and the message may not be sent to the unified services platform. In either event, a message may be sent to the CRM software service to activate the service for use in performing the contact information and order history lookup. The message may comprise the call details in order to identify the incoming call number (e.g., the calling party number). In response to receiving the message, the CRM software service may perform a contact information and order history lookup. The information may be provided back to the unified services platform and/or the provider for use with handling the call. The information may then be sent to a device associated with the telephone number for display to the subscriber. The voice call can be routed to the subscriber to allow the subscriber to view the relevant contact information and order history while handling the voice call from the customer. A billing record can be generated by the CRM software service and/or the unified services platform to allow the use of the CRM software service to be billed to the subscriber.

In some embodiments, more than one action may be performed by the same service or multiple services. The actions can be performed serially so that the services can build on each other and/or the services can be performed in parallel. The use of actions performed serially can be referred to as the chaining of services in some context and the use of actions performed in parallel can be referred to as multicasting in some contexts. The ability to perform many actions based on one triggering event may allow functionality to be combined amongst services in ways that were not previously considered. It can be noted that any particular triggering event may initiate a set of actions in both a chaining and multicasting manner.

Figure 17:
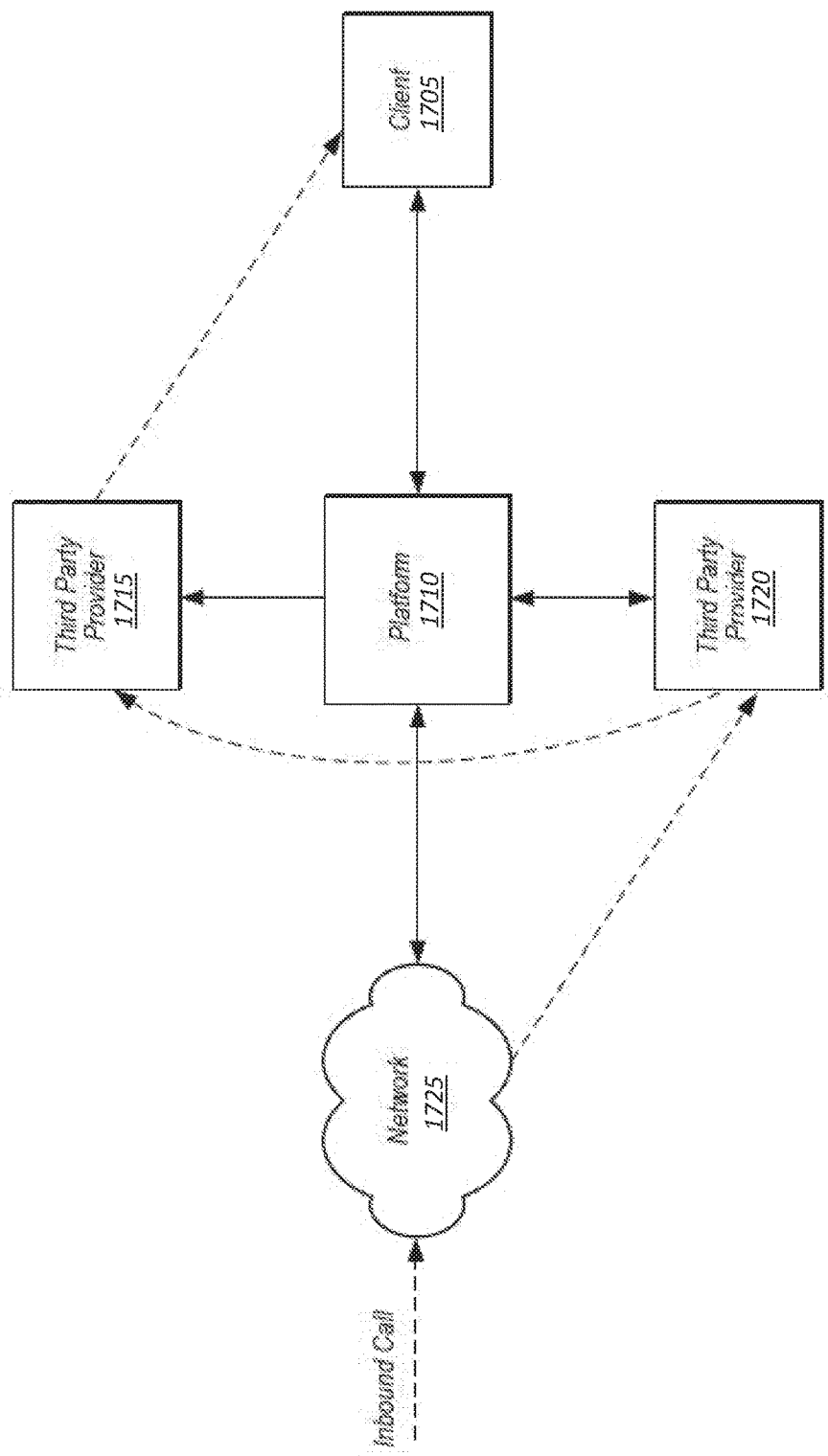
FIG. 17 illustrates a block diagram of an embodiment of chaining actions through third party provider communications.

Turning now to FIG. 17, a block diagram of an embodiment of chaining actions through third party provider communications is shown. The device 1705 may be coupled to the unified services platform 1710 to choose applications and services to associate with the telephone number. The device 1705 may use the unified services platform 1710 to activate services with one or more third party providers, such as the third party providers 1715 and 1720. While only two third party providers are shown in FIG. 17, any number of additional third party providers may also be coupled to the unified services platform 1710, and the device 1705 may subscribe to any number of services from these additional third party providers. The third party providers 1715 and 1720 are different providers from the primary provider of telephone service to the device 1705. In an embodiment, the primary provider of telephone service to device 1705 may be integrated with platform 1710. Alternatively, in another embodiment, the primary provider of telephone service to the device 1705 may be a separate entity from the unified services platform 1710.

In an embodiment, the device 1705 may use the platform 1710 to activate a first service from provider 1715 and a second service from provider 1720. The services may be activated based on triggering events, and the services may perform one or more specific actions based on the type of triggering event that occurs. Both the first and second services may be associated with the telephone number of device 1705.

An inbound call to the telephone number of device 1705 may be received over network 1725. Based on the actions associated with an incoming call established at the time the services are activated, the inbound call may be routed to the third party provider 1720 for processing. The network 1725 may be the network, PSTN, or other type of network. The inbound call is represented by a dashed line in FIG. 17. The third party provider 1720 may process the call using the service associated with the third party provider 1720 and then third party provider 1720 may route the call to the second third party provider 1715. In an embodiment, this routing of the call to the second third party provider 1715 from the third party provider 1720 may happen independently of the unified services platform 1710 or the primary provider of service to device 1705.

In some embodiments, the routing of the call may proceed through the unified services platform 1710, which may control the call routing and services associated with any triggers initiated by the call. Provider 1715 may then add processing associated with the service on top of the earlier processing by provider 1720. Next, the call may be routed to the device 1705, and the call may now include the additional functionality from the first and second services. In other embodiments, more than two third-party providers may add features and services to inbound or outbound calls for the device 1705. This interworking between multiple third-party providers may allow many applications and services to be applied to calls, messages, internet sessions, and the like received or sent from the telephone number of the device 1705. Once the services have been performed, billing messages can be provided to the appropriate third party services to allow each of the services to be charged to the appropriate subscriber.

The techniques described with respect to FIG. 17 may also be used in embodiments with more than two third-party providers. These techniques allow the telephone number of the device 1705 to become the common ID which is used between multiple services and applications. The telephone number is associated with the relevant interworking data which links all of the IDs and third-party applications and services associated with the telephone number. The telephone number allows for the creation of the interworking between all of the third-party applications. In other words, the telephone number is an ID that's used by a middleware layer to allow the functionality of the third-party applications to work with each other and to work on the primary provider's network.

As an example of the use of the chaining actions, the first third party provider 1720 may provide marketing software services that include contact matching, and the second third party provider 1715 may provide message logging services. In the context of FIG. 17, an incoming text message may be sent to the telephone number of the device 1705. It can be assumed that the subscriber has activated both services and established that the services are triggered by the receipt of an incoming text message. The policy and rules for the services may also establish that an incoming text message should first be sent to the first third party provider 1720 followed by sending the message to the second third party provider, which may then forward the message to the device 1705. In response to the triggering event of receiving a text message, the message may be forwarded from the network to the first third party provider. The marketing software services may perform a contact lookup and a related marketing region for the sender of the text message. This information may be appended to the text message as a data file. Once the information is appended to the text message, the message may be forwarded to the second third party provider 1715 where the message may be logged into a message logging and storage service. The service may categorize the text message and store the message in a segregated format for future access by the subscriber. The message logging service may access the data file to determine the identity of the sender and the marketing region. The text message can then be stored in a file associated with the appropriate marketing region, and the sender contact information and identity can be included as a text header before the message is stored. This may allow for the event log for a marketing region to be viewed by the subscriber or another person at a later time. Finally, the text message can be forwarded to the device with or without the information provided by the first third party provider 1720.

As illustrated by this example, the chaining of the services through a plurality of third party providers may not only provide incremental services, but may allow for the information from one third party provider to be used by a second third party provider to create a new functionality not offered by any one third party provider. As a result, this system may provide the subscriber the opportunity to create functionality by selectively ordering the third party provider services and establishing rules for the resulting services.

Figure 18:
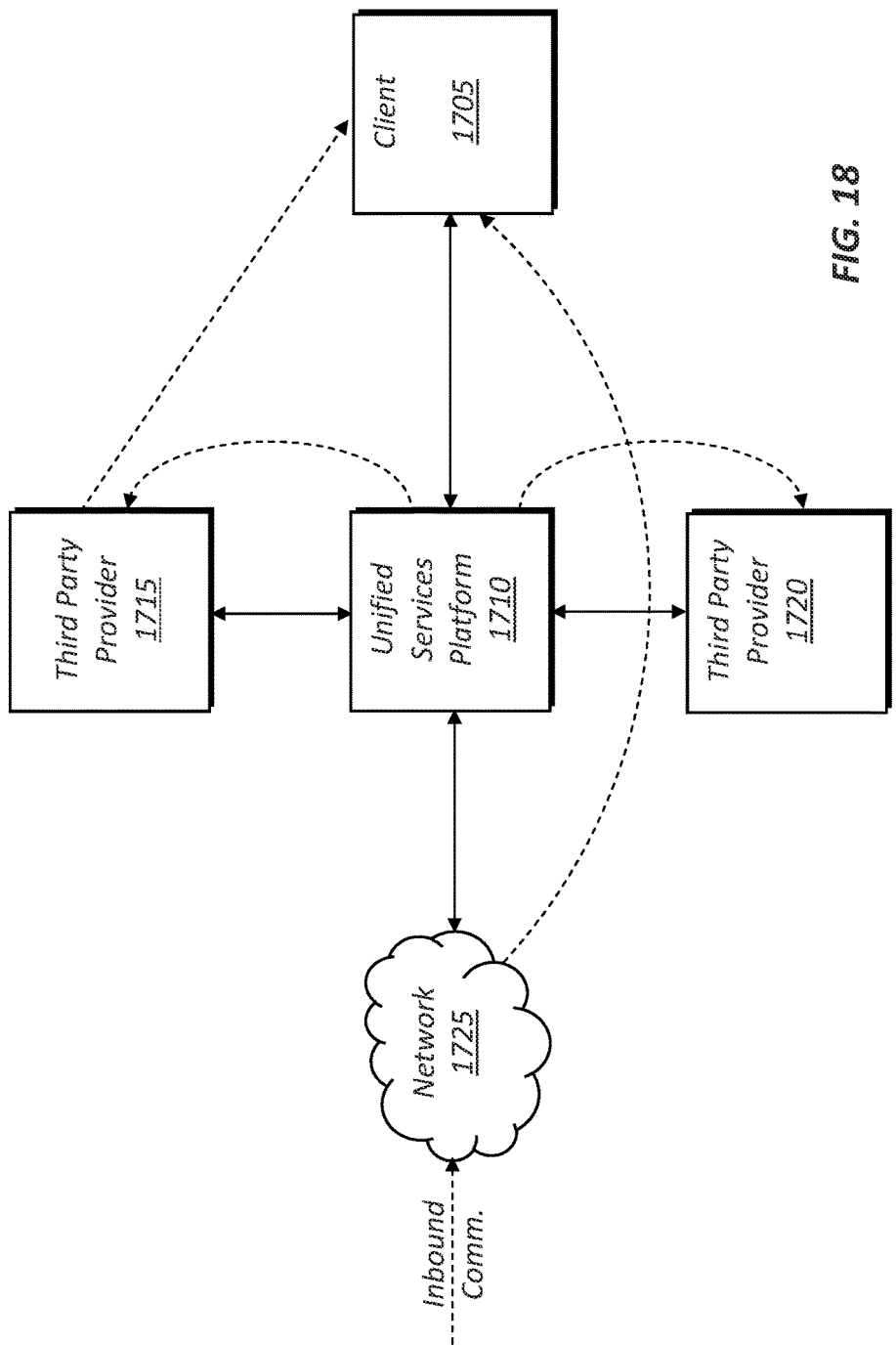
FIG. 18 illustrates a block diagram of an embodiment of multicasting actions through third party provider communications.

Turning now to FIG. 18, a block diagram of an embodiment of multicasting actions through third party provider communications is shown. The block diagram illustrated in FIG. 18 may comprise the same elements as shown in FIG. 17, but the routing of the call can be performed in a multicast manner. The elements previously described with respect to FIG. 17 will not be described again in the interest of brevity. The third party providers 1715 and 1720 are different providers from the primary provider of telephone service to the device 1705. In an embodiment, the device 1705 may use the platform 1710 to activate a first service from provider 1715 and a second service from provider 1720. In an embodiment, the services may be activated based on a single triggering event, and the services may perform one or more specific actions based on the type of triggering event that occurs. Both the first and second services may be associated with the telephone number of device 1705.

An inbound communication to the telephone number of device 1705 may be received over the network 1725, and the incoming communication may be routed to the device 1705. For example, an incoming voice call or text message may be routed to the device 1705. Based on the actions associated with an incoming call established at the time the services are activated, the inbound communication may also be routed to a plurality of third party providers 1715, 1720 in parallel. In an embodiment, the unified services platform 1710 may receive a copy of the incoming communication based on the triggering event of receiving the incoming call. Any of the triggering events described herein can be used to trigger the services. While described as being handled by the unified services platform 1710, the call routing and event handling may also be provided by the primary provider of service to device 1705. In an embodiment, this routing of the communication to the third party providers 1715, 1720 may happen independently of the unified services platform 1710 or the primary provider of service to device 1705.

In an embodiment, the unified services platform 1710 can perform the actions established for each of the third party services 1715, 1720 based on the triggering event. For example, a copy of the incoming communication or any portion thereof can be routed to the first third party provider 1720. A service can be performed using the incoming communication by the first third party provider 1720. At second copy of the incoming communication or any portion thereof can be sent to the second third party provider 1715, wherein a service can be performed. In some embodiments, one or more of the third party providers may also send information to the device 1705 based on the execution of the service. For example, the second third party provider 1715 may forward information related to the service to the device 1705. The techniques described with respect to FIG. 18 may also be used in embodiments with more than two third-party providers.

As an example of the use of the multicasting actions, the first third party provider 1720 may provide CRM software services that include contact matching and communication logging, and the second third party provider 1715 may provide voicemail and voice to text translation services. In the context of FIG. 18, an incoming voice call may be sent to the telephone number of the device 1705. It can be assumed that the subscriber has activated both services and established that the services are triggered by the receipt of an incoming voice call. The policy and rules for the services may also establish that an incoming voice call should be forwarded to the device 1705 initially, and then sent to the first third party provider 1720 and the second third party provider 1715 in parallel if the voice call is not answered. In this example, the triggering event may be the unanswered voice call by the device 1705. In response to the triggering event, the voice call may be forwarded to both the first third party provider 1720 and the second third party provider 1715. The CRM software service of the first third party provider 1720 may match the call to a contact if possible and log the call as unanswered within the software. The call log may be accessed by the subscriber or other person at a later time. The voicemail and voice to text translation services provided by the second third party service may receive the incoming call and allow the caller to leave a voicemail message. The third party provider may retain the voicemail message as well as convert the voice message into a text message. The third party provider service may be configured to forward the text version of the message along with a caller identification to the device 1705. The device 1705 may then be able to invoke the second third party services after the completion of the voice call to access the actual voicemail message and also obtain the voice to text translation on a device associated with the telephone number of the subscriber.

As illustrated by this example, the multicast routing of information and utilization of multiple services in parallel may allow more actions to occur in response to a triggering event than may be offered by a third party provider. As a result, this system may provide the subscriber the opportunity to select a desired suite of functionality in response to the available triggering events. This may present additional options over traditional single service options available for an account associated with a telephone number.

Overall, the third party services are enabled to work with a telephone company network using the common identifier, the methods and mechanisms described herein may also be used to enable external services and providers to work with one another. In this manner, multiple services may cooperate on the basis of a common identifier in ways not previously possible. Such cooperation may lead to the development of new services that may be provided to subscribers or other providers. For example, one external service may provide a first type of content while a different external service provides a second type of content. By utilizing the methods and mechanisms described herein, combinations of the first type of content and the second type of content may be created. Numerous such approaches are possible and are contemplated.

In various embodiments, one or more portions of the methods and mechanisms described herein may form part of a cloud computing environment. In such embodiments, resources may be provided over the network as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated. It is also noted that while a telephone number is used in the examples above as a common identifier, the methods and mechanisms described herein may also be used with identifiers other than a telephone number used as a common identifier.

Figure 19:
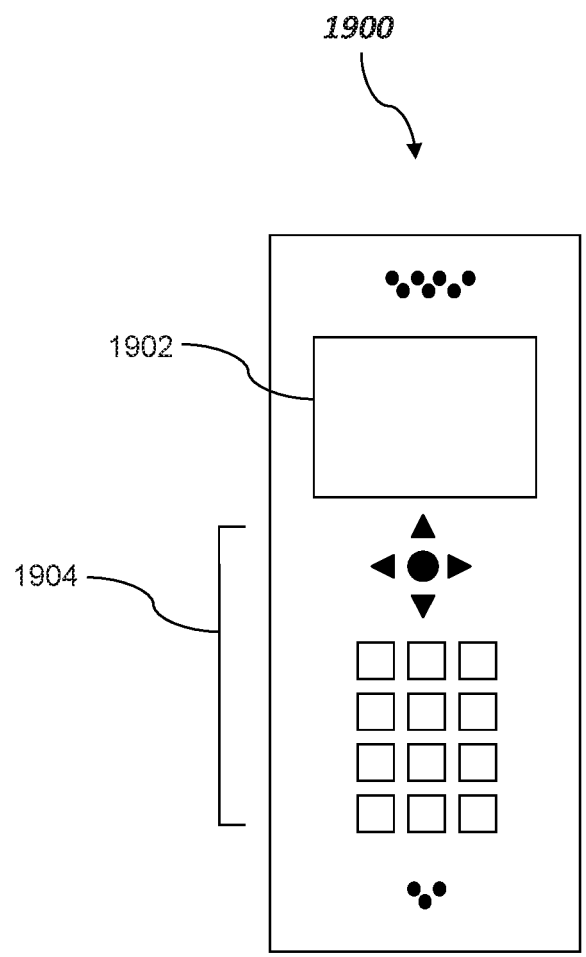
FIG. 19 schematically illustrates an embodiment of a mobile device.

In an embodiment, the device may comprise a device such as a laptop, mobile device, tablet, or the like. FIG. 19 depicts a mobile device 1900, which is operable for implementing aspects of the present disclosure, but the present disclosure should not be limited to these implementations. Though illustrated as a mobile phone, the mobile device 1900 may take various forms including a wireless handset, a pager, a personal digital assistant (PDA), a gaming device, or a media player. The mobile device 1900 includes a display 1902 and a touch-sensitive surface and/or keys 1904 for input by a user. The mobile device 1900 may present options for the user to select, controls for the user to actuate, and/or cursors or other indicators for the user to direct. The mobile device 1900 may further accept data entry from the user, including numbers to dial or various parameter values for configuring the operation of the handset. The mobile device 1900 may further execute one or more software or firmware applications in response to user commands. These applications may configure the mobile device 1900 to perform various customized functions in response to user interaction. Additionally, the mobile device 1900 may be programmed and/or configured over-the-air, for example from a wireless base station, a wireless access point, or a peer mobile device 1900. The mobile device 1900 may execute a web browser application which enables the display 1902 to show a web page. The web page may be obtained via wireless communications with a base transceiver station, a wireless network access node, a peer mobile device 1900 or any other wireless communication network or system.

Figure 20:
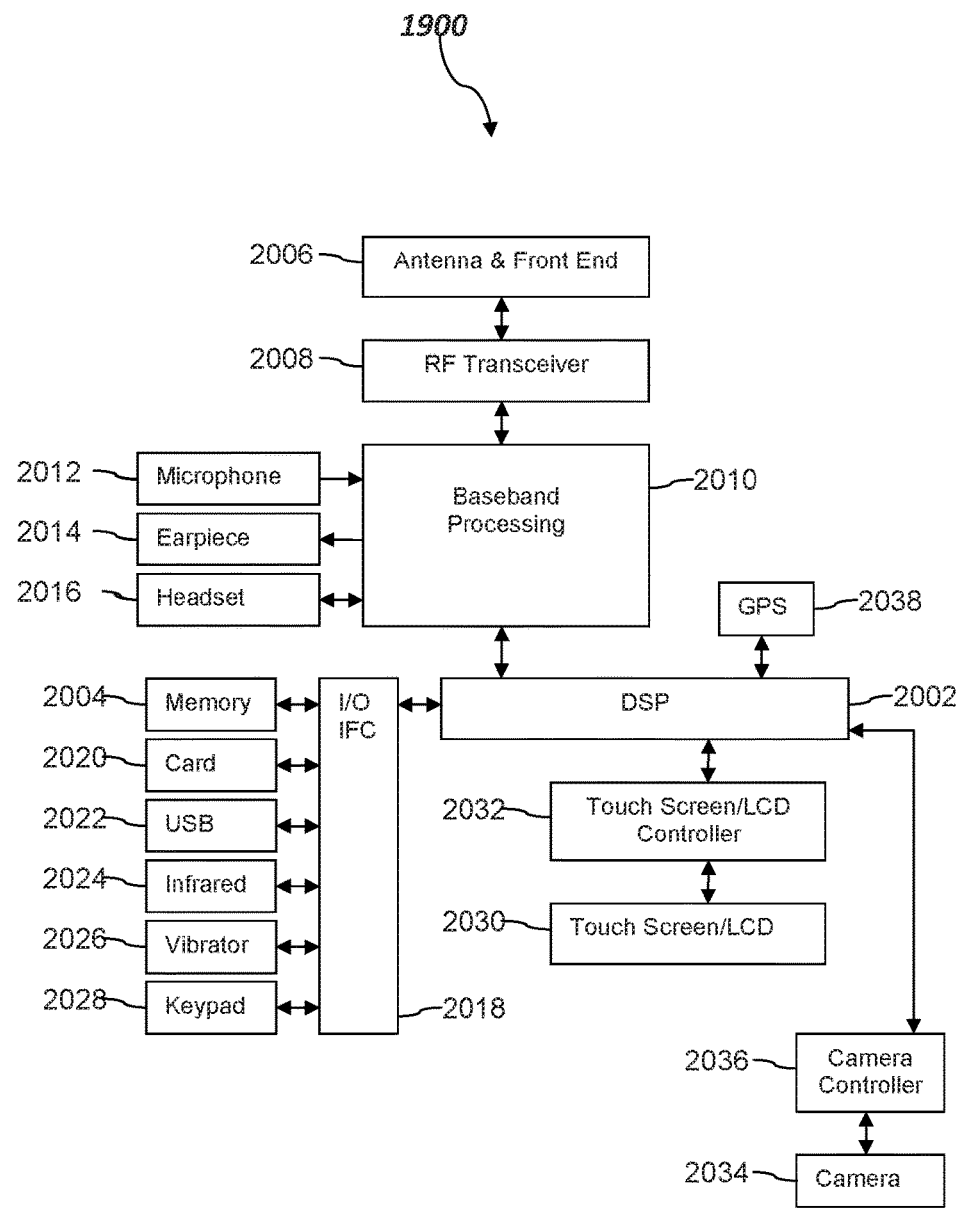
FIG. 20 illustrates a block diagram of an embodiment of a mobile device.

FIG. 20 shows a block diagram of the mobile device 1900. While a variety of known components of handsets are depicted, in an embodiment a subset of the listed components and/or additional components not listed may be included in the mobile device 1900. The mobile device 1900 includes a digital signal processor (DSP) 2002 and a memory 2004. As shown, the mobile device 1900 may further include an antenna and front end unit 2006, a radio frequency (RF) transceiver 2008, a baseband processing unit 2010, a microphone 2012, an earpiece speaker 2014, a headset port 2016, an input/output interface 2018, a removable memory card 2020, a universal serial bus (USB) port 2022, an infrared port 2024, a vibrator 2026, a keypad 2028, a touch screen liquid crystal display (LCD) with a touch sensitive surface 2030, a touch screen/LCD controller 2032, a camera 2034, a camera controller 2036, and a global positioning system (GPS) receiver 2038. In an embodiment, the mobile device 1900 may include another kind of display that does not provide a touch sensitive screen. In an embodiment, the DSP 2002 may communicate directly with the memory 2004 without passing through the input/output interface 2018. Additionally, in an embodiment, the mobile device 1900 may comprise other peripheral devices that provide other functionality.

The DSP 2002 or some other form of controller or central processing unit operates to control the various components of the mobile device 1900 in accordance with embedded software or firmware stored in memory 2004 or stored in memory contained within the DSP 2002 itself. In addition to the embedded software or firmware, the DSP 2002 may execute other applications stored in the memory 2004 or made available via information carrier media such as portable data storage media like the removable memory card 2020 or via wired or wireless network communications. The application software may comprise a compiled set of machine-readable instructions that configure the DSP 2002 to provide the desired functionality, or the application software may be high-level software instructions to be processed by an interpreter or compiler to indirectly configure the DSP 2002.

The DSP 2002 may communicate with a wireless network via the analog baseband processing unit 2010. In some embodiments, the communication may provide Internet connectivity, enabling a user to gain access to content on the Internet and to send and receive e-mail or text messages. The input/output interface 2018 interconnects the DSP 2002 and various memories and interfaces. The memory 2004 and the removable memory card 2020 may provide software and data to configure the operation of the DSP 2002. Among the interfaces may be the USB port 2022 and the infrared port 2024. The USB port 2022 may enable the mobile device 1900 to function as a peripheral device to exchange information with a personal computer or other computer system.

The infrared port 2024 and other optional ports such as a Bluetooth® interface or an IEEE 802.11 compliant wireless interface may enable the mobile device 1900 to communicate wirelessly with other nearby handsets and/or wireless base stations.

The keypad 2028 couples to the DSP 2002 via the input/output interface 2018 to provide one mechanism for the user to make selections, enter information, and otherwise provide input to the mobile device 1900. Another input mechanism may be the touch screen LCD 2030, which may also display text and/or graphics to the user. The touch screen LCD controller 2032 couples the DSP 2002 to the touch screen LCD 2030. The GPS receiver 2038 is coupled to the DSP 2002 to decode global positioning system signals, thereby enabling the mobile device 1900 to determine its position.

Figure 21A:
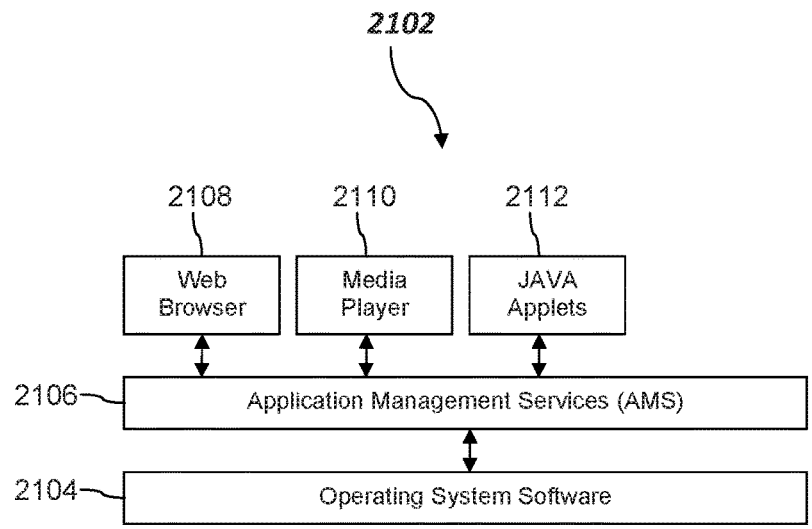
FIG. 21A illustrates an embodiment of a software environment.

FIG. 21A illustrates a software environment 2102 that may be implemented by the DSP 2002. The DSP 2002 executes operating system software 2104 that provides a platform from which the rest of the software operates. The operating system software 2104 may provide a variety of drivers for the handset hardware with standardized interfaces that are accessible to application software. The operating system software 2104 may be coupled to and interact with application management services (AMS) 2106 that transfer control between applications running on the mobile device 1900. Also shown in FIG. 21A are a web browser application 2108, a media player application 2110, and JAVA applets 2112. The web browser application 2108 may be executed by the mobile device 1900 to browse content and/or the Internet, for example when the mobile device 1900 is coupled to a network via a wireless link. The web browser application 2108 may permit a user to enter information into forms and select links to retrieve and view web pages. The media player application 2110 may be executed by the mobile device 1900 to play audio or audiovisual media. The JAVA applets 2112 may be executed by the mobile device 1900 to provide a variety of functionality including games, utilities, and other functionality.

Figure 21B:
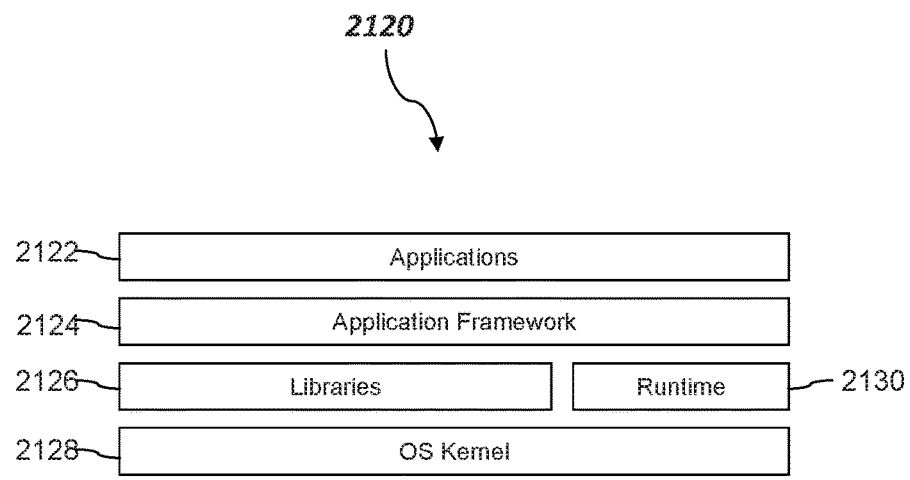
FIG. 21B illustrates an alternative software environment.

FIG. 21B illustrates an alternative software environment 2120 that may be implemented by the DSP 2002. The DSP 2002 executes operating system kernel (OS kernel) 2128 and an execution runtime 2130. The DSP 2002 executes applications 2122 that may execute in the execution runtime 2130 and may rely upon services provided by the application framework 2124. Applications 2122 and the application framework 2124 may rely upon functionality provided via the libraries 2126.

Figure 22:
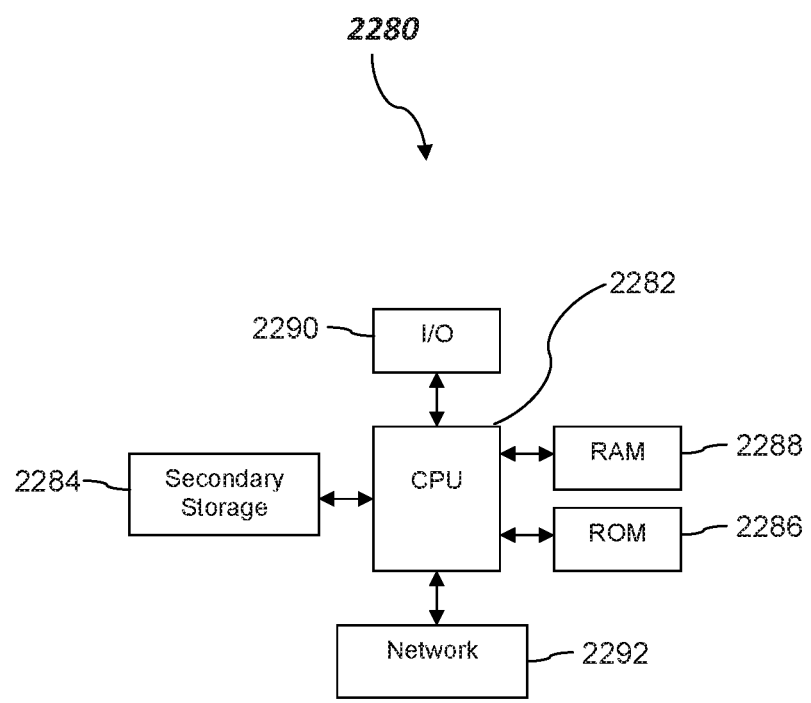
FIG. 22 schematically illustrates a computer system suitable for implementing one or more embodiments disclosed herein.

FIG. 22 illustrates a computer system 2280 suitable for implementing one or more embodiments disclosed herein. In an embodiment, the computer system 2280 may be representative of the server or systems forming the unified services platform, the provider, and/or the third party application service providers. The computer system 2280 includes a processor 2282 (which may be referred to as a central processor unit or CPU) that is in communication with memory devices including secondary storage 2284, read only memory (ROM) 2286, random access memory (RAM) 2288, input/output (I/O) devices 2290, and network connectivity devices 2292. The processor 2282 may be implemented as one or more CPU chips.

It is understood that by programming and/or loading executable instructions onto the computer system 2280, at least one of the CPU 2282, the RAM 2288, and the ROM 2286 are changed, transforming the computer system 2280 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 2284 is typically comprised of one or more disk drives or tape drives and is used for non-volatile storage of data and as an over-flow data storage device if RAM 2288 is not large enough to hold all working data. Secondary storage 2284 may be used to store programs which are loaded into RAM 2288 when such programs are selected for execution. The ROM 2286 is used to store instructions and perhaps data which are read during program execution. ROM 2286 is a non-volatile memory device which typically has a small memory capacity relative to the larger memory capacity of secondary storage 2284. The RAM 2288 is used to store volatile data and perhaps to store instructions. Access to both ROM 2286 and RAM 2288 is typically faster than to secondary storage 2284. The secondary storage 2284, the RAM 2288, and/or the ROM 2286 may be referred to in some contexts as computer readable storage media and/or non-transitory computer readable media.

I/O devices 2290 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 2292 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 2292 may enable the processor 2282 to communicate with the Internet or one or more intranets. With such a network connection, it is contemplated that the processor 2282 might receive information from the network, or might output information to the network in the course of performing the above-described method steps. Such information, which is often represented as a sequence of instructions to be executed using processor 2282, may be received from and outputted to the network, for example, in the form of a computer data signal embodied in a carrier wave.

Such information, which may include data or instructions to be executed using processor 2282 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 2282 executes instructions, codes, computer programs, scripts which it accesses from hard disk, floppy disk, optical disk (these various disk based systems may all be considered secondary storage 2284), ROM 2286, RAM 2288, or the network connectivity devices 2292. While only one processor 2282 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 2284, for example, hard drives, floppy disks, optical disks, and/or other device, the ROM 2286, and/or the RAM 2288 may be referred to in some contexts as non-transitory instructions and/or non-transitory information.

In an embodiment, the computer system 2280 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 2280 to provide the functionality of a number of servers that is not directly bound to the number of computers in the computer system 2280. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 2280, at least portions of the contents of the computer program product to the secondary storage 2284, to the ROM 2286, to the RAM 2288, and/or to other non-volatile memory and volatile memory of the computer system 2280. The processor 2282 may process the executable instructions and/or data structures in part by directly accessing the computer program product, for example by reading from a CD-ROM disk inserted into a disk drive peripheral of the computer system 2280. Alternatively, the processor 2282 may process the executable instructions and/or data structures by remotely accessing the computer program product, for example by downloading the executable instructions and/or data structures from a remote server through the network connectivity devices 2292. The computer program product may comprise instructions that promote the loading and/or copying of data, data structures, files, and/or executable instructions to the secondary storage 2284, to the ROM 2286, to the RAM 2288, and/or to other non-volatile memory and volatile memory of the computer system 2280.

In some contexts, the secondary storage 2284, the ROM 2286, and the RAM 2288 may be referred to as a non-transitory computer readable medium or a computer readable storage media. A dynamic RAM embodiment of the RAM 2288, likewise, may be referred to as a non-transitory computer readable medium in that while the dynamic RAM receives electrical power and is operated in accordance with its design, for example during a period of time during which the computer system 2280 is turned on and operational, the dynamic RAM stores information that is written to it. Similarly, the processor 2282 may comprise an internal RAM, an internal ROM, a cache memory, and/or other internal non-transitory storage blocks, sections, or components that may be referred to in some contexts as non-transitory computer readable media or computer readable storage media.

Having described several processes and systems herein, specific embodiments can include, but are not limited to:

In a first embodiment, a method of provisioning a plurality of applications from different application developer systems to a network provider system through a unified services platform comprises establishing a plurality of service accounts for a corresponding plurality of application service provider systems, wherein the plurality of application service provider systems provide services for use in association with a telephone number of a subscriber of telecommunication services; receiving, by a processor system, a plurality of API interfaces from the plurality of application service provider systems, wherein at least two of the API interfaces are different, integrating, by the processor system, each of the plurality of API interfaces with a unified services platform API interface; receiving a provider API interfaces for a network provider system; and integrating the provider API interface with the unified services platform API interface, wherein at least one of the plurality of API interfaces from the plurality of application service provider systems is not compatible with the provider API interface.

A second embodiment may include the method of the first embodiment, further comprising: receiving a definition of a service and a plan for each of the plurality of application service provider systems.

A third embodiment may include the method of the second embodiment, further comprising: receiving one or more definitions of actions for the service, wherein the actions comprise responses to triggering events occurring with a telephone number.

A fourth embodiment may include the method of the third embodiment, further comprising: publishing, after integrating each of the plurality of API interfaces with the unified services platform, the definition of the service, the definition of the plan, and the one or more definitions of actions for each application service provider in a provisioning catalog.

A fifth embodiment may include the method of the fourth embodiment, further comprising: receiving, from the network provider system, a selection of one or more services from the plurality of the application services provider systems; and publishing the selection of the one or more services in a services catalog, wherein the services catalog is accessible by one or more subscribers of the network provider system.

A sixth embodiment may include the method of the third embodiment, further comprising: receiving a request for associating at least one service from the plurality of application service provider systems with a telephone number of a subscriber; associating the telephone number with the at least one service; and invoking the at least one service in response to a communication event with the telephone number.

A seventh embodiment may include the method of any of the first to sixth embodiments, further comprising: receiving, at the unified services platform, billing routing information from the plurality of application service provider systems; and integrating the billing routing information with the network provider system.

In an eighth embodiment, a method of invoking a third party service during a communication event comprises: receiving, by a policy and rules engine executing on a processor system, a first indication of an incoming communication for a telephone number; identifying, by the policy and rules engine, a first triggering event associated with the incoming communication for the telephone number based on the first indication; invoking, by the policy and rules engine, a first service associated with the telephone number in response to the first triggering event, wherein the first service is provided by a first third party application service provider system; performing, in response to invoking the first service, a first action based on the first triggering event, wherein the first action is performed by the first third party application service provider system; receiving, by the policy and rules engine, a second indication of a second incoming communication for the telephone number; identifying, by the policy and rules engine, a second triggering event associated with the second incoming communication for the telephone number based on the second indication; invoking, by the policy and rules engine, a second service associated with the telephone number in response to the second triggering event, wherein the second service is provided by a second third party application service provider system, wherein the second third party application service provider system is different than the first third party application service provider system; performing, in response to invoking the second service, a second action based on the second triggering event, wherein the second action is performed by the second third party application service provider system; and handling the communication using the telephone number.

A ninth embodiment may include the method of the eighth embodiment, wherein the triggering event comprises a representational state transfer (REST) upon sending a message, a REST upon receiving a message, a REST before making a call, a REST after making a call, a REST before receiving a call, a REST after receiving a call, a Session Initiation Protocols (SIP) on receiving a call, a SIP on making a call, or any combination thereof.

A tenth embodiment may include the method of the eighth or ninth embodiment, wherein the action comprises transferring a message, transferring an image, transferring a document file, transferring a posting, generating a notification, obtaining contact information, obtaining customer information, or any combination thereof.

An eleventh embodiment may include the method of any of the eighth to tenth embodiments, wherein performing the action occurs before handling the communication.

A twelfth embodiment may include the method of any of the eighth to tenth embodiments, wherein performing the action occurs after handling the communication.

A thirteenth embodiment may include the method of any of the eighth to tenth embodiments, wherein performing the action occurs during handling the communication.

A fourteenth embodiment may include the method of any of the eighth to thirteenth embodiments, wherein handling the communication comprises routing the incoming communication to a device associated with the telephone number, wherein the communication comprises a voice call, a text message, an internet communication session, or any combination thereof.

A fifteenth embodiment may include the method of any of the eighth to fourteenth embodiments, wherein receiving the indication comprises: receiving the first indication at a unified services platform system; and wherein performing the action comprises routing incoming communication data from a network provider system to the third party application service provider system, wherein the network provider system supplies the telephone number.

In a sixteenth embodiment, a method of billing a customer for a third party service performed during a communication event comprises receiving, by a unified services platform system, an indication of an incoming communication for a telephone number from a network provider system; identifying, by a processor system, a triggering event associated with the incoming communication for the telephone number; invoking, by the processor system, a service associated with the telephone number in response to the triggering event, wherein the service is associated with a third party application service provider system; performing, in response to invoking the service, an action associated with the service based on the triggering event, wherein the action is performed by the third party application service provider system; receiving a billing message from the third party application service provider system, wherein the billing message comprises chargeable event data; and routing the billing message to the network provider system, wherein the network provider system bills a subscriber associated with the telephone number for the service performed by the third party application service provider system.

A seventeenth embodiment may include the method of the sixteenth embodiment, further comprising: receiving payment from the subscriber; and routing the payment from the network service provider system to the third party application service provider system.

An eighteenth embodiment may include the method of the sixteenth or seventeenth embodiment, wherein the billing message is generated in response to performing the action.

A nineteenth embodiment may include the method of any of the sixteenth to eighteenth embodiments, wherein the billing message is received by the network provider system.

A twentieth embodiment may include the method of the any of the sixteenth to nineteenth embodiments, further comprising: invoking a second service associated with the telephone number in response to the triggering event, wherein the service is associated with a second third party application service provider system; performing, in response to invoking the service, a second action associated with the second service based on the triggering event, wherein the action is performed by the second third party application service provider system; receiving a second billing message from the second third party application service provider system, wherein the second billing message comprises chargeable event data for performing the second action; and routing the second billing message to the network provider system, wherein the network provider system bills the subscriber associated with the telephone number for the service performed by the third party application service provider system and the second third party application service provider system.

In a twenty first embodiment, a method of creating a plurality of service actions in response to a communication event comprises receiving, by a processor system, an indication of an incoming communication for a telephone number, wherein the telephone number is provided by a network provider system, and wherein a plurality of services associated with a plurality of third party service systems are associated with the telephone number, wherein the plurality of services are invoked by at least one triggering event associated with the telephone number; identifying, by the processor system, a triggering event associated with the incoming communication for the telephone number; invoking a first service of the plurality of services in response to the triggering event; sending incoming communication information to the first service, wherein the incoming communication information comprises at least a portion of the information associated with the incoming communication, and wherein the first service generates first service data in response to the incoming communication information; routing the first service data to a second service of the plurality of services; and invoking the second service of the plurality of services in response to routing the first service data to the second service, wherein the second service generates second service data.

A twenty second embodiment may include the method of the twenty first embodiment, wherein the processor system forms a portion of a unified service platform system, wherein unified services platform system communicates with the plurality of third party service systems through a plurality of integrated interfaces, wherein the unified services platform system communicates with the network provider system through a provider integrated interface, and wherein one or more of the plurality of integrated interfaces are incompatible with the provider integrated interface.

A twenty third embodiment may include the method of the twenty first or twenty second embodiment, wherein the second service generates the second service data using at least a portion of the first service data.

A twenty fourth embodiment may include the method of the any of the twenty first to twenty fourth embodiments, further comprising: forwarding the first service data and the second service data to a device associated with the telephone number.

A twenty fifth embodiment may include the method of any of the twenty first to twenty fourth embodiments, wherein the services comprise one or more actions performed by social media software, customer relationship management software, call and message translation software, file sharing software, file management software, contact management software, voicemail software, messaging software, call recording software, contact matching software, messaging storage software, call notification software, or any combination thereof.

A twenty sixth embodiment may include the method of any of the twenty first to twenty fifth embodiments, further comprising: sending the incoming communication to the first service; routing the incoming communication from the first service to the second service; and routing the incoming communication to a device associated with the telephone number A twenty seventh embodiment may include the method of any of the twenty first to twenty sixth embodiments, wherein receiving the indication of the incoming communication comprises: receiving the indication at a unified services platform system from the network provider system.

A second embodiment may include the method of any of the twenty first to twenty seventh embodiments, further comprising: generating first billing information for the first service based on invoking the first service; generating second billing information for the second service based on invoking the second service; and routing the first billing information and the second billing information to the network provider system, wherein the network provider system bills a subscriber associated with the telephone number.

In a twenty ninth embodiment, a method of creating a plurality of service actions in response to a communication event comprises receiving, by a processor system, an indication of an communication for a telephone number, wherein the telephone number is provided by a network provider system, and wherein a plurality of service provided by a plurality of third party service systems are associated with the telephone number, wherein one or more of the plurality of services are invoked by at least one triggering event associated with the telephone number; identifying, by the processor system, a triggering event associated with the communication for the telephone number; invoking two or more services of the plurality of services in response to the triggering event; sending communication information to each of the two or more services, wherein the communication information comprises at least a portion of the information associated with the communication; receiving first service data from a first service of the two or more services; receiving second service data from a second service of the two or more services; and handling the communication.

A thirtieth embodiment may include the method of the twenty ninth embodiment, wherein the processor system forms a portion of a unified service platform system, wherein unified services platform system communicates with the plurality of third party service systems through a plurality of integrated interfaces, wherein the unified services platform system communicates with the network provider system through a provider integrated interface, and wherein one or more of the plurality of integrated interfaces are incompatible with the provider integrated interface.

A thirty first embodiment may include the method of the twenty ninth or thirtieth embodiment, wherein sending the communication information to each of the two or more services occurs in parallel.

A thirty second embodiment may include the method of any of the twenty ninth to thirty first embodiments, wherein handling the communication comprises routing the incoming communication to a device associated with the telephone number, and wherein the communication comprises an incoming voice call, an outgoing voice all, an incoming text message, an outgoing text message, an outgoing network connection request, or any combination thereof.

A thirty third embodiment may include the method of any of the twenty ninth to thirty second embodiments, further comprising combining the first service data and the second service data to form a combined data set; and sending the combined data set to a device associated with the telephone number.

A thirty fourth embodiment may include the method of any of the twenty ninth to thirty third embodiments, further comprising: routing the first service data to a third service of the plurality of services; and invoking the third service in response to routing the first service data to the third service, wherein the third service generates third service data.

A thirty fifth embodiment may include the method of any of the twenty ninth to thirty fourth embodiments, wherein the indication is received at a unified services platform system, and wherein the unified services platform system sends the communication information to each of the two or more services.

A thirty sixth embodiment may include the method of any of the twenty ninth to thirty fifth embodiments, further comprising: generating first billing information for the first service; generating second billing information for the second service; and routing the first billing information and the second billing information to the network provider system, wherein the network provider system bills a subscriber associated with the telephone number.

In an thirty seventh embodiment, a method of using a policy store to generate multiple events comprises generating, by a processor system, a policy store comprising a plurality of rules for invoking a plurality of services associated with a telephone number, wherein the rules define a relationship between a triggering event and one or more actions to be performed by a service, wherein the plurality of services are provided by third party application service provider systems, wherein the triggering event is based on a communication event provided by a network provider system, and where the policy store is generated by a unified services platform system in communication with the network provider system and the third party application service provider systems; receiving an indication of a first triggering event based on a communication event associated with the telephone number; matching, by the processor system, the first triggering event with one or more actions in the policy store; identifying, by the processor system, two or more services of the plurality of services based on the matching; generating routing information for each of the two or more services identified based on the matching; and routing communication event information to each of the two or more services of the plurality of services using the routing information.

A thirty eighth embodiment may include the method of the thirty seventh embodiment, wherein routing the communication event information comprises: routing the communication event information to a first service of the two or more services using the routing information, wherein the first service generates first service data based on the communication event information; and routing the first service data to a second service of the two or more services using the routing information, wherein the second service generates second service data based on the first service data.

A thirty ninth embodiment may include the method of the thirty eighth embodiment, further comprising: routing the communication event to the first service with the communication event information; routing the communication event to the second service with the first service data; and routing the communication event with the second service data to a communication device associated with the telephone number.

A fortieth embodiment may include the method of the thirty seventh embodiment, wherein routing the communication event information comprises: routing the communication event information to a first service of the two or more services using the routing information; and routing the communication event information to a second service of the two or more services using the routing information, wherein the communication information is routed to the first service and the second service in parallel.

In a forty first embodiment, a method of provisioning a service for use with a group plan comprises receiving, by a unified services platform system, a subscription request for a service for a group plan, wherein the group plan comprises a plurality of telephone numbers, wherein each telephone number of the plurality of telephone numbers is associated with a subscriber, and wherein the service is provided by a third party application service provider system; sending, by the unified services platform system, an activation request for the group plan to the third party application service provider system, receiving an activation response from the third party application service provider system; associating the service with each telephone number of the plurality of telephone numbers; providing access to the service for each telephone number based on the associating; receiving, by the unified services platform system, a subscription request for a second service from a subscriber associated with a first telephone number of the plurality of telephone numbers, wherein the second service is provided by a second third party application service provider system; sending, by the unified services platform system, a second activation request for the service to the second third party application service provider system; receiving a second activation response from the second third party application service provider system; associating the second service with the first telephone number; and providing access to the second service for the first telephone number based on the associating.

A forty second embodiment may include the method of the forty first embodiment, further comprising: receiving billing and settlement information associated with each of the telephone numbers.

A forty third embodiment may include the method of the forty second embodiment, wherein the billing and settlement information comprises routing information for routing charges incurred through use of the service, wherein the routing information routes the charges incurred to a group administrator for the group plan.

A forty fourth embodiment may include the method of any of the forty first to forth third embodiments, wherein an API of the third party application service provider system is incompatible with an API of the network provider system.

A forty fifth embodiment may include the method of the forth fourth embodiment, wherein the API of the third party application service provider system is integrated with the unified services platform system, and wherein API of the network provider system is integrated with the unified services platform system, and wherein the third party application communicates with the network provider system through the unified services platform system.

A forty sixth embodiment may include the method of any of the forty first to forth fifth embodiments, further comprising: receiving, by the unified services platform system, a second subscription request for a second service for the group plan, wherein the second service is provided by a second third party application service provider system, wherein an API of the third party application service provider system is incompatible with an API of the second third party application service provider system; sending, by the unified services platform system, a second activation request for the group plan to the third party application service provider system, receiving a second activation response from the third party application service provider system; associating the second service with each telephone number of the plurality of telephone numbers; and providing access to the second service for each telephone number based on the associating.

A forty seventh embodiment may include the method of any of the forty first to forth sixth embodiments, further comprising: invoking the service in response to a triggering event associated with a first telephone number of the plurality of telephone numbers.

In a forty eighth embodiment, a method of billing for a service provided to the members of a group comprises receiving, by a unified services platform system, a subscription request for a service associated with a group, wherein the group comprises a plurality of telephone numbers, wherein each telephone number of the plurality of telephone numbers is associated with a subscriber, wherein the telephone number is provided by a network provider system, and wherein the service is provided by a third party application service provider system; associating the service with each telephone number of the plurality of telephone numbers; receiving billing and settlement information from the third party application service provider system for each telephone number; generating billing routing information based on the billing and settlement information, wherein the routing information forwards billing charges for the services associated with the service to a group administrator; associating the billing routing information for the service with each telephone number of the plurality of telephone number; generating chargeable event data in response to a use of the service by one or more of the subscribers; forwarding the chargeable event data to the group administrator based on the billing routing information; associating a second service with a first telephone number of the plurality of telephone numbers, wherein the second service is not associated with the group, wherein the second service is provided by a second third party application service provider system; and routing billing charges for the second service to a first subscriber associated with the first telephone number.

A forty ninth embodiment may include the method of the forty eight embodiment, wherein the unified services platform system communicates with the third party service system through a first integrated interface, wherein the unified services platform system communications with the second third party service system through a second integrated interface, wherein the unified services platform system communicates with the network provider system through a provider integrated interface, and wherein the integrated interface and the second integrated interface are incompatible with the provider integrated interface.

A fiftieth embodiment may include the method of the forty eight or forty ninth embodiment, further comprising: associating a third service with the first telephone number of the plurality of telephone numbers, wherein the third service is associated with the group, and wherein the routing information forwards billing charges for the third service to the group administrator.

A fifty first embodiment may include the method of any of the forty eighth to fiftieth embodiments, wherein forwarding the chargeable event data to the group administrator based on the billing routing information comprises routing the chargeable event data to the unified services platform system, and forwarding the chargeable event data from the unified services platform system to the network provider system.

A fifty second embodiment may include the method of any of the forty eighth to fiftieth embodiments, wherein forwarding the chargeable event data to the group administrator based on the billing routing information comprises routing the chargeable event data from the third party application service provider system to the network provider system.

A fifty third embodiment may include the method of any of the forty eighth to fifty second embodiments, wherein generating the chargeable event data is based on a triggering event associated with a first telephone number of one or more of the subscribers.

In a fifty fourth embodiment, a method of using a rules engine to allocate usage of a service between personal and group accounts comprises receiving, by a unified services platform system, a subscription request for a service associated with a group, wherein the group comprises a plurality of telephone numbers, wherein each telephone number of the plurality of telephone numbers is associated with a subscriber, wherein the service is provided by a third party application service provider system, and wherein the telephone numbers are provided by a network provider system; associating the service with each telephone number of the plurality of telephone numbers; receiving billing and settlement information from the third party application service provider system for each telephone number; generating a billing policy store comprising a plurality of rules for charging for the service, wherein the rules define a relationship between a usage conditions of the service and payment by at least one of the subscriber or the group; generating billing routing information based on the billing and settlement information and the billing policy store, wherein the billing routing information forwards billing charges for the usage associated with the service to at least one of the subscriber or the group based on the usage conditions; generating a charge for the service in response to a use of the service under usage conditions by one or more of the subscribers; and routing the charges to at least one of the subscriber or the group using the billing routing information.

A fifty fifth embodiment may include the method of the fifty fourth embodiment, wherein the plurality of rules specify payment by the group when the service is used within a predefined usage condition, wherein the usage condition comprises a time of day, a day of the week, a month of the year, a holiday schedule, or any combination thereof.

A fifty sixth embodiment may include the method of the fifty fourth or fifty fifth embodiments, wherein the plurality of rules specify payment by the group when the service is used within a predefined usage condition, wherein the usage condition comprises a geographic location or a geographic area.

A fifty seventh embodiment may include the method of any of the fifty fourth to fifty sixth embodiments, wherein the plurality of rules specify payment by the group when the service is used within a predefined usage condition, wherein the usage condition comprises a type of network connection, a specific network interface point, or any combination thereof.

A fifty eighth embodiment may include the method of any of the fifty fourth to fifty seventh embodiments, wherein the plurality of rules specify payment by the group when the service is used within a predefined usage condition, wherein the usage condition comprises one or more predefined triggering events.

A fifty ninth embodiment may include the method of any of the fifty fourth to fifty eighth embodiments, wherein a first subscriber associated with a first telephone number of the plurality of telephone numbers is provided network services through the network provider system, wherein group is provided network services through a second network provider system, and wherein routing the charges to at least one of the subscriber or the group comprises routing the charges to at least one of the first subscriber through the network provider system or the group through the second network provider system.

A sixtieth embodiment may include the method of any of the fifty fourth to fifty ninth embodiments, further comprising: associating a second service with each telephone number of the plurality of telephone numbers, wherein the second service is provided by a second third party application service provider system; receiving second billing and settlement information from the second third party application service provider for each telephone number; and generating second billing routing information based on the second billing and settlement information and the billing policy store, wherein the second billing routing information forwards billing charges for the usage associated with the second service to at least one of the subscriber or the group based on a second set of usage conditions, wherein the second set of usage conditions are different than the usage conditions for the service.

In a sixty first embodiment, a method of combining partial functionality across a plurality of applications to create a new service comprises receiving, by a unified services platform system, a definition of a service for each of a plurality of application service provider systems; receiving one or more definitions of actions for each service for each of the plurality of application service provider systems, wherein the actions comprise responses to triggering events occurring for a telephone number; testing each triggering event and corresponding action in a test environment to generate a response; storing an indication of the triggering event, the corresponding action, and the response; identifying individual actions associated with each of the services associated with the plurality of application service provider systems; combining two or more individual actions from different services provided by different application service provider systems; and forming a new service based on the combining.

A sixty second embodiment may include the method of the sixty first embodiment, wherein the individual actions comprise one or more of transferring a message, transferring an image, transferring a document file, transferring a posting, generating a notification, obtaining contact information, obtaining customer information, or any combination thereof.

A sixty third embodiment may include the method of the sixty first or sixty second embodiment, wherein the triggering event comprises a representational state transfer (REST)

upon sending a message, a REST upon receiving a message, a REST before making a call, a REST after making a call, a REST before receiving a call, a REST after receiving a call, a Session Initiation Protocols (SIP) on receiving a call, a SIP on making a call, or any combination thereof.

A sixty fourth embodiment may include the method of any of the sixty first to sixty third embodiments, wherein combining the two or more individual actions comprises combining the two or more individual actions by the unified services platform system.

A sixty fifth embodiment may include the method of the sixty fourth embodiment, wherein combining the two or more individual actions further comprises: receiving, by the unified services platform system, a request from a subscriber associated with a telephone number to combine the two or more individual actions; generating, by the unified services platform system, routing and integration data for the two or more individual actions; and activating the new service for the subscriber, wherein the new service includes the routing and integration data generated by the unified services platform.

A sixty sixth embodiment may include the method of the sixty fifth embodiment, further comprising: publishing the new service in a catalog available to a plurality of subscribers.

A sixty seventh embodiment may include the method of any of the sixty first to sixty sixth embodiments, wherein the new service comprises a first individual action based on a first trigger and a second individual action based on a second trigger.

A sixty eighth embodiment may include the method of the sixty seventh embodiment, wherein the second trigger comprises a response generated by the first individual action.

A sixty ninth embodiment may include the method of any of the sixty first to sixty eighth embodiments, further comprising: publishing the individual actions in a catalog; and receiving a selection of the two or more of the individual actions, wherein combining the two or more individual actions from different services occurs in response to receiving the selection of the two or more individual actions.

In a seventieth embodiment, a method of identifying actions within services provided by a third party application service providers comprises establishing, on a unified services platform system, a plurality of service accounts for a corresponding plurality of application service providers; receiving a definition of a service for each of the plurality of application service providers, wherein the service comprises one or more actions, wherein the actions comprise responses to triggering events occurring for a telephone number; receiving one or more definitions of the one or more actions for each service for each of the plurality of application service provider systems; testing each triggering event and corresponding action in a test environment to generate a response; storing an indication of the triggering event, the corresponding action, and the response; identifying individual actions associated with each of the services associated with the plurality of application service provider systems.

A seventy first embodiment may include the method of the seventieth embodiment, wherein the individual actions comprise one or more of transferring a message, transferring an image, transferring a document file, transferring a posting, generating a notification, obtaining contact information, obtaining customer information, or any combination thereof.

A seventy second embodiment may include the method of the seventieth or seventy first embodiment, wherein the triggering events comprises one or more of a representational state transfer (REST) upon sending a message, a REST upon receiving a message, a REST before making a call, a REST after making a call, a REST before receiving a call, a REST after receiving a call, a Session Initiation Protocols (SIP) on receiving a call, a SIP on making a call, or any combination thereof.

A seventy third embodiment may include the method of any of the seventieth to seventy second embodiments, wherein two or more of the plurality of application service provider systems have different APIs, and wherein the different APIs are not compatible with each other.

A seventy fourth embodiment may include the method of the seventy third embodiment, further comprising: enabling two or more of the individual actions to work together by providing a common interface using the unified services platform system, wherein the two or more individual actions are provided by at least two different application service provider systems.

In a seventy fifth embodiment, a method of developing and testing a new application service through a unified services platform comprises establishing a plurality of service accounts for a corresponding plurality of application service provider systems; receiving a plurality of API interfaces from the plurality of application service provider systems, wherein at least two of the API interfaces are different, integrating each of the plurality of API interfaces with a unified services platform system API interface; receiving a definition of a service for each of the plurality of application service provider systems; receiving one or more definitions of actions for each service for each of the plurality of application service provider systems, wherein the actions comprise responses to triggering events occurring for a telephone number; testing each triggering event and corresponding action for each service in a test environment to generate a response; and providing access to each service within a working environment after performing the testing.

A seventy sixth embodiment may include the method of the seventy fifth embodiment, further comprising: publishing, after testing, the definition of the service, the definition of the plan, and the one or more definitions of actions for each application service provider in a provisioning catalog.

A seventy seventh embodiment may include the method of the seventy fifth or seventy sixth embodiment, further comprising: receiving an API interface for a network provider system; and integrating the API interface for the network provider system with the unified services platform system API interface, wherein at least one of the plurality of API interfaces from the plurality of application service provider systems is not compatible with the API interface for the network provider system.

A seventy eighth embodiment may include the method of the seventy seventh embodiment, further comprising: testing the integration of each of the plurality of API interfaces for the plurality of application service provider systems with the unified services platform system API interface in the test environment; and testing the integration of the API interface for the network provider system with the unified services platform system API interface in the test environment.

A seventy ninth embodiment may include the method of any of the seventy fifth to seventy eighth embodiments, further comprising: testing chargeable event data routing in the test environment, wherein the chargeable event data is generated in response to a performance of one or more actions.

An eightieth embodiment may include the method of any of the seventy fifth to seventy ninth embodiments, wherein the triggering event comprises a representational state transfer (REST) upon sending a message, a REST upon receiving a message, a REST before making a call, a REST after making a call, a REST before receiving a call, a REST after receiving a call, a Session Initiation Protocols (SIP) on receiving a call, a SIP on making a call, or any combination thereof.

This specification includes references to an embodiment". The appearance of the phrase in an embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

TERMINOLOGY

The following definitions and/or context are provided for terms found in this disclosure (including the appended claims). The term "comprising" is open-ended. As used in the appended claims, this term does not foreclose additional structure or steps. Consider a claim that recites: "A system comprising a server . . . " Such a claim does not foreclose the system from including additional components (e.g., network interface, memory, display). The term "configured to," when used to describe various units, circuits, or other components may be used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. As used herein, the terms "first," "second," etc. are used as labels for nouns that they precede, and do not imply any type of ordering (e.g., spatial, temporal, logical, etc.). For example, for a customer using five services, the terms "first" and "second" resellers can be used to refer to any two of the five services. As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of creating a plurality of service actions in response to a communication event, the method comprising:
   receiving, by a processor system, an indication of an incoming communication for a telephone number, wherein the telephone number is provided by a network provider system, and wherein a plurality of services associated with a plurality of third party service systems are associated with the telephone number, wherein the plurality of services are invoked by at least one triggering event associated with the telephone number;
   identifying, by the processor system, a triggering event associated with the incoming communication for the telephone number;
   invoking a first service of the plurality of services in response to the triggering event;
   sending incoming communication information to the first service, wherein the incoming communication information comprises at least a portion of the information associated with the incoming communication, and wherein the first service generates first service data in response to the incoming communication information;
   routing the first service data to a second service of the plurality of services; and
   invoking the second service of the plurality of services in response to routing the first service data to the second service, wherein the second service generates second service data.

2. The method of claim 1, wherein the processor system forms a portion of a unified service platform system, wherein unified services platform system communicates with the plurality of third party service systems through a plurality of integrated interfaces, wherein the unified services platform system communicates with the network provider system through a provider integrated interface, and wherein one or more of the plurality of integrated interfaces are incompatible with the provider integrated interface.

3. The method of claim 1, wherein the second service generates the second service data using at least a portion of the first service data.

4. The method of claim 1, further comprising:
   forwarding the first service data and the second service data to a device associated with the telephone number.

5. The method of claim 1, wherein the services comprise one or more actions performed by social media software, customer relationship management software, call and message translation software, file sharing software, file management software, contact management software, voicemail software, messaging software, call recording software, contact matching software, messaging storage software, call notification software, or any combination thereof.

6. The method of claim 1, further comprising:
sending the incoming communication to the first service;
routing the incoming communication from the first service to the second service; and
routing the incoming communication to a device associated with the telephone number.

7. The method of claim 1, wherein receiving the indication of the incoming communication comprises: receiving the indication at a unified services platform system from the network provider system.

8. The method of claim 1, further comprising:
generating first billing information for the first service based on invoking the first service;
generating second billing information for the second service based on invoking the second service; and
routing the first billing information and the second billing information to the network provider system, wherein the network provider system bills a subscriber associated with the telephone number.

9. A method of creating a plurality of service actions in response to a communication event, the method comprising:
receiving, by a processor system, an indication of an communication for a telephone number, wherein the telephone number is provided by a network provider system, and wherein a plurality of services provided by a plurality of third party service systems are associated with the telephone number, wherein one or more of the plurality of services are invoked by at least one triggering event associated with the telephone number,
wherein the processor system forms a portion of a unified service platform system, wherein unified services platform system communicates with the plurality of third party service systems through a plurality of integrated interfaces, wherein the unified services platform system communicates with the network provider system through a provider integrated interface, and wherein one or more of the plurality of integrated interfaces are incompatible with the provider integrated interface;
identifying, by the processor system, a triggering event associated with the communication for the telephone number;
invoking two or more services of the plurality of services in response to the triggering event;
sending communication information to each of the two or more services, wherein the communication information comprises at least a portion of the information associated with the communication;
receiving first service data from a first service of the two or more services;
receiving second service data from a second service of the two or more services; and
handling the communication.

10. The method of claim 9, wherein sending the communication information to each of the two or more services occurs in parallel.

11. The method of claim 9, wherein handling the communication comprises routing the incoming communication to a device associated with the telephone number, and wherein the communication comprises an incoming voice call, an outgoing voice all, an incoming text message, an outgoing text message, an outgoing network connection request, or any combination thereof.

12. The method of claim 9, further comprising combining the first service data and the second service data to form a combined data set; and sending the combined data set to a device associated with the telephone number.

13. The method of claim 9, further comprising:
routing the first service data to a third service of the plurality of services; and
invoking the third service in response to routing the first service data to the third service, wherein the third service generates third service data.

14. The method of claim 9, wherein the indication is received at a unified services platform system, and wherein the unified services platform system sends the communication information to each of the two or more services.

15. The method of claim 9, further comprising:
generating first billing information for the first service;
generating second billing information for the second service; and
routing the first billing information and the second billing information to the network provider system, wherein the network provider system bills a subscriber associated with the telephone number.

16. The method of claim 9, further comprising:
generating, by a processor system, a policy store comprising a plurality of rules for invoking the two or more services of the plurality of services, wherein the rules define a relationship between the triggering event and one or more actions to be performed by each service, wherein the triggering event is based on the communication provided by a network provider system, and where the policy store is generated by a unified services platform system in communication with the network provider system and the third party application service system;
wherein invoking the two or more services comprises:
matching, by the processor system, the triggering event with one or more actions in the policy store;
identifying, by the processor system, the two or more services of the plurality of services based on the matching;
generating routing information for each of the two or more services identified based on the matching; and
routing communication event information to each of the two or more services of the plurality of services using the routing information.

17. The method of claim 16, wherein routing the communication event information comprises:
routing the communication event information to a first service of the two or more services using the routing information, wherein the first service generates first service data based on the communication information; and
routing the first service data to a second service of the two or more services using the routing information, wherein the second service generates second service data based on the first service data.

18. The method of claim 17, further comprising:
routing the communication to the first service with the communication information; and
routing the communication to the second service with the first service data; and
routing the communication with the second service data to a communication device associated with the telephone number.

19. The method of claim 16, wherein routing the communication information comprises:

routing the communication information to a first service of the two or more services using the routing information; and routing the communication information to a second service of the two or more services using the routing information, wherein the communication information is routed to the first service and the second service in parallel.

* * * * *

UNITED STATES PATENT AND TRADEMARK OFFICE
CERTIFICATE OF CORRECTION

| | |
|---|---|
| PATENT NO. | : 10,015,321 B2 |
| APPLICATION NO. | : 15/094917 |
| DATED | : July 3, 2018 |
| INVENTOR(S) | : Evin A. Hunt et al. |

Page 1 of 1

It is certified that error appears in the above-identified patent and that said Letters Patent is hereby corrected as shown below:

In the Claims

Column 59, Line 65, cancel the text beginning with "11. The method of claim 9" to and ending with "or any combination thereof" and insert the following claim:
-- 11. The method of claim 9, wherein handling the communication comprises routing the incoming communication to a device associated with the telephone number, and wherein the communication comprises an incoming voice call, an outgoing voice call, an incoming text message, an outgoing text message, an outgoing network connection request, or any combination thereof. --

Signed and Sealed this
Twenty-fifth Day of September, 2018

Andrei Iancu
*Director of the United States Patent and Trademark Office*